United States Patent
Zhou et al.

(10) Patent No.: US 12,035,141 B2
(45) Date of Patent: Jul. 9, 2024

(54) POLICY CONTROL METHOD, DEVICE, AND SYSTEM

(71) Applicant: Huawei Technologies Co., Ltd., Shenzhen (CN)

(72) Inventors: Xiaoyun Zhou, Nanjing (CN); Shufeng Shi, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 256 days.

(21) Appl. No.: 17/583,786

(22) Filed: Jan. 25, 2022

(65) Prior Publication Data

US 2022/0150706 A1    May 12, 2022

Related U.S. Application Data

(63) Continuation of application No. PCT/CN2020/093959, filed on Jun. 2, 2020.

(30) Foreign Application Priority Data

Jul. 26, 2019 (CN) .......................... 201910684221.8

(51) Int. Cl.
  *H04W 12/37* (2021.01)
  *H04L 9/40* (2022.01)
  *H04W 28/08* (2023.01)

(52) U.S. Cl.
  CPC .......... *H04W 12/37* (2021.01); *H04L 63/0227* (2013.01); *H04W 28/0967* (2020.05)

(58) Field of Classification Search
  CPC ... H04W 12/37; H04W 28/0967; H04W 4/02; H04W 28/08; H04W 28/10; H04L 63/0227; H04L 45/306; H04L 47/20
  See application file for complete search history.

(56) References Cited

U.S. PATENT DOCUMENTS

| 2018/0192390 | A1  | 7/2018 | Li et al. |
| 2019/0158408 | A1* | 5/2019 | Li .......................... H04L 45/306 |
| 2019/0268232 | A1* | 8/2019 | Garcia Azorero ...... H04L 47/20 |

FOREIGN PATENT DOCUMENTS

| CN | 109660464 A | 4/2019 |
| CN | 110048873 A | 7/2019 |

(Continued)

OTHER PUBLICATIONS

"3rd Generation Partnership Project; Technical Specification Group Services and System Aspects; Procedures for the 5G System; Stage 2 (Release 16)," 3GPP TS 23.502 V16.0.2, Apr. 2019, 419 pages.

(Continued)

*Primary Examiner* — Benjamin M Thieu
(74) *Attorney, Agent, or Firm* — SLATER MATSIL, LLP

(57) ABSTRACT

A policy control method, a device, and a system, the method including receiving, by a session management network element, from a policy control network element, LAN traffic steering information corresponding to a first application, selecting one or more user plane network elements based on the LAN traffic steering information, determining policy rules corresponding to each user play network element of the user plane network elements, the policy rules being associated with steering data of the first application sent by an upstream network element, where the policy rules are further associated with sending data processed by the local application server for the first application in the target LAN to a downstream network element, and sending, by the session management network element, the corresponding policy rules to each user plane network element of the one or more user plane network elements.

20 Claims, 34 Drawing Sheets

(56) References Cited

FOREIGN PATENT DOCUMENTS

WO      2017167247 A    10/2017
WO      2019141169 A1    7/2019

OTHER PUBLICATIONS

"Correction to Traffic Steering Control," Source to WG: Huawei, HiSilicon, Source to TSG: SA2, Work Item Code: 5GS_Ph1, Category: F, Date: Oct. 17 2018, Release: Rel 15, 3GPP TSG-SA WG2 Meeting #129, S2-1811280, (revision of S2-1810763), Dongguan, China, Oct. 15-19, 2018, 9 Pages.

* cited by examiner

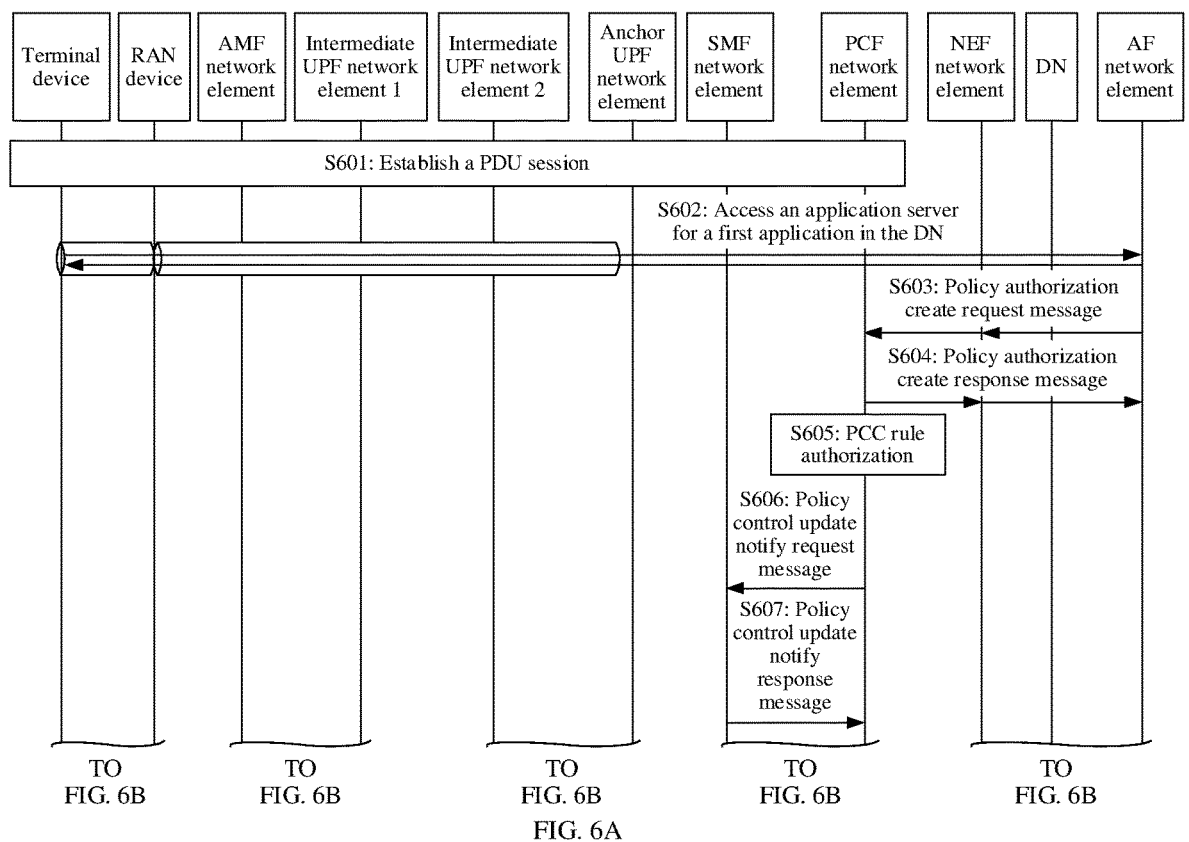

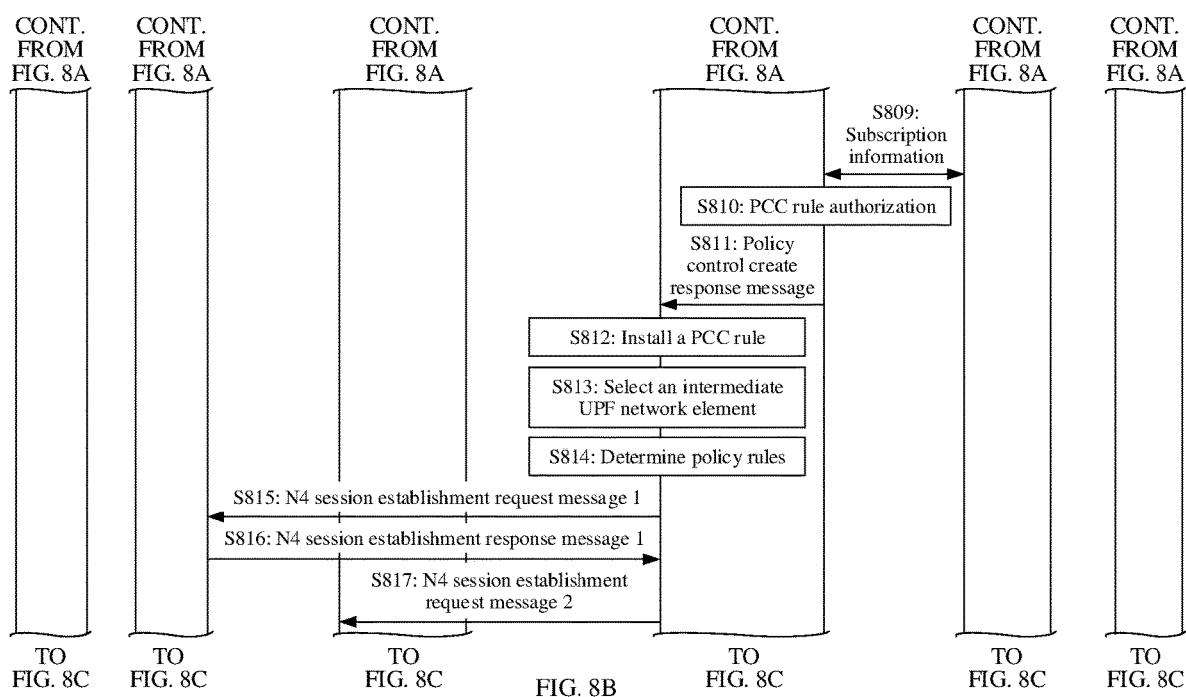

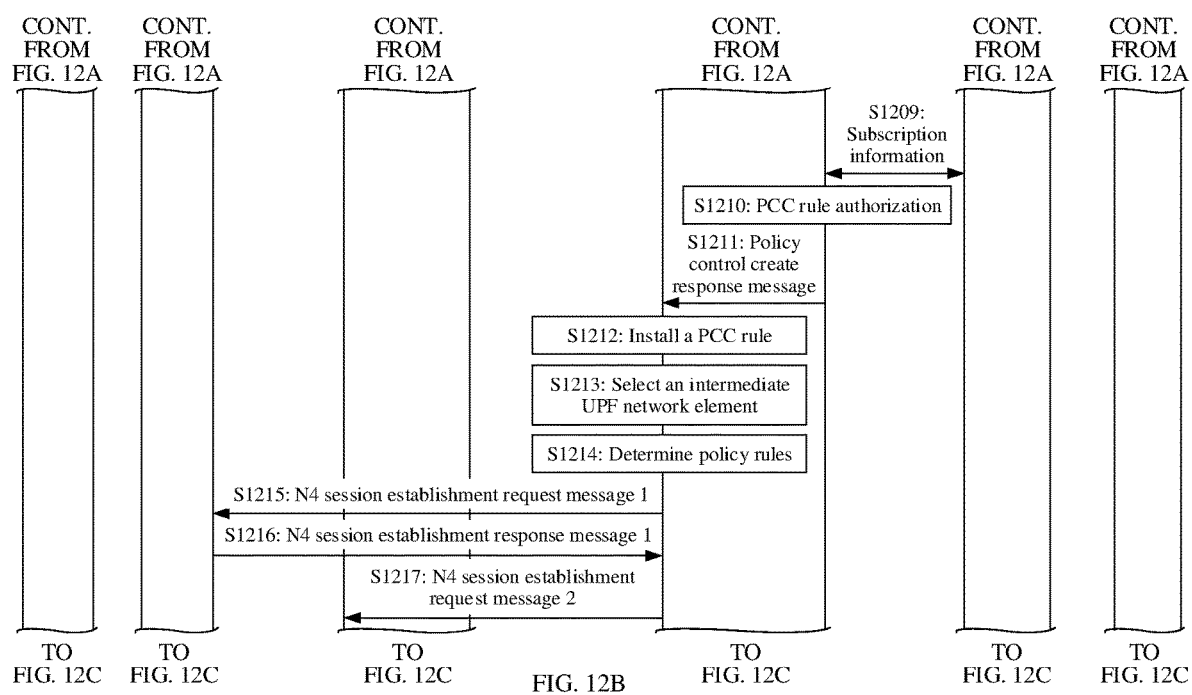

POLICY CONTROL METHOD, DEVICE, AND SYSTEM

CROSS-REFERENCE TO RELATED APPLICATIONS

This application is a continuation of International Application No. PCT/CN2020/093959, filed on Jun. 2, 2020, which claims priority to Chinese Patent Application No. 201910684221.8, filed on Jul. 26, 2019. The disclosures of the aforementioned applications are hereby incorporated by reference in their entireties.

TECHNICAL FIELD

This application relates to the field of communication technologies, and in particular, to a policy control method, a device, and a system.

BACKGROUND

In a 5th generation (5G) network, a terminal device establishes a protocol data unit (PDU) session after accessing the network, accesses an external data network (DN) by using the PDU session, and interacts with an application server deployed in the DN. As DNs accessed by a user are different, the network may select, according to a network policy, a user plane function (UPF) network element that accesses a DN as a PDU session anchor (PSA), and accesses the application server in the DN through an N6 interface of the PSA. The 5G network supports a scenario in which there are a plurality of PSAs for one PDU session, and application servers for a same application may be deployed at a plurality of locations. In this case, based on an access location of the terminal device, the network can select a PSA that is close to the terminal device and that can support the terminal device in accessing the DN. Therefore, route recurvation is reduced, and network latency is reduced.

As shown in FIG. 1, a new application scenario is provided currently. In this application scenario, application servers are deployed in few DN networks accessed by PSAs through N6 interfaces. In this case, service flows of terminal devices for accessing these application servers (for example, an application server 1 in a local area network in which a UPF network element 1 is deployed and an application server 2 in a local area network in which a UPF network element 2 is deployed) need to be processed by an application server in a local access network (LAN) in which intermediate UPF network elements (for example, the UPF network element 1 and the UPF network element 2 in FIG. 1) are deployed. These application servers are usually deployed in a mobile edge computing (MEC) environment. However, currently, there is no solution for performing policy control in this scenario.

SUMMARY

Embodiments of this application provide a policy control method, a device, and a system, to implement policy control when a service flow of a terminal device for accessing an application server in a DN needs to be processed by a local application server in a LAN in which an intermediate user plane network element is deployed.

To achieve the foregoing objective, the following technical solutions are used in the embodiments of this application.

According to a first aspect, a policy control method is provided. The method includes a session management network element receives local area network LAN traffic steering information corresponding to a first application from a policy control network element. The session management network element selects one or more user plane network elements based on the LAN traffic steering information, and determines policy rules corresponding to each of the one or more user plane network elements, where the policy rules are used to steer, to a local application server for the first application in a target LAN, data of the first application sent by an upstream network element, and used to send data processed by the local application server for the first application in the target LAN to a downstream network element, and the target LAN is a LAN corresponding to each user plane network element. The session management network element sends the corresponding policy rules to each user plane network element. Based on the policy control method, a proper user plane network element can be selected, so that the user plane network element steers, to the local application server for the first application in the target LAN, data of the first application sent by an upstream network element of the user plane network element, and sends data processed by the local application server for the first application in the target LAN to a downstream network element of the user plane network element.

In a possible design, the LAN traffic steering information includes one piece of steering location information, and the steering location information includes one or more pieces of application location information of the first application and traffic steering policy information corresponding to each piece of application location information, and that the session management network element selects one or more user plane network elements based on the LAN traffic steering information, and determines policy rules corresponding to each of the one or more user plane network elements includes the session management network element selects one user plane network element based on first application location information in the one or more pieces of application location information, and the session management network element determines, based on traffic steering policy information corresponding to the first application location information, policy rules corresponding to the selected user plane network element. Based on this solution, the session management network element can select one user plane network element and determine policy rules corresponding to the user plane network element.

In a possible design, the LAN traffic steering information includes a plurality of pieces of steering location information, and each of the plurality of pieces of steering location information includes a corresponding data network access identifier DNAI, one or more pieces of application location information of the first application, and traffic steering policy information corresponding to each piece of application location information, and that the session management network element selects one or more user plane network elements based on the LAN traffic steering information, and determines policy rules corresponding to each of the one or more user plane network elements includes the session management network element determines, based on the DNAI corresponding to each piece of steering location information, first steering location information corresponding to a first DNAI, the session management network element selects one user plane network element based on first application location information in one or more pieces of application location information that are of the first application and that are in the first steering location information, and the session management network element determines, based on traffic steering policy information corresponding to the first application location information in the first steering location information, policy rules corresponding to the selected user plane network element. Based on this solution, the session management network element can select one user plane network element and determine policy rules corresponding to the user plane network element.

In a possible design, the LAN traffic steering information includes one piece of steering location information, and the steering location information includes sequence indication information of a plurality of levels of local application servers for the first application, one or more pieces of application location information corresponding to a local application server at each level, and traffic steering policy information corresponding to each piece of application location information, and that the session management network element selects one or more user plane network elements based on the LAN traffic steering information, and determines policy rules corresponding to each of the one or more user plane network elements includes the session management network element selects a user plane network element at each level based on each level of first application location information, where each level of first application location information includes first application location information in the one or more pieces of application location information corresponding to the local application server at each level, and the session management network element determines, based on the sequence indication information and traffic steering policy information corresponding to each level of first application location information, policy rules corresponding to the user plane network element at each level. Based on this solution, the session management network element can select a plurality of user plane network elements, and determine policy rules corresponding to each of the plurality of user plane network elements.

In a possible design, the LAN traffic steering information includes a plurality of pieces of steering location information, and each of the plurality of pieces of steering location information includes a corresponding DNAI, sequence indication information of a plurality of levels of local application servers for the first application, one or more pieces of application location information corresponding to a local application server at each level, and traffic steering policy information corresponding to each piece of application location information, and that the session management network element selects one or more user plane network elements based on the LAN traffic steering information, and determines policy rules corresponding to each of the one or more user plane network elements includes the session management network element determines, based on the DNAI corresponding to each piece of steering location information, first steering location information corresponding to a first DNAI, the session management network element selects a user plane network element at each level based on the sequence indication information and each level of first application location information that are in the first steering location information, where each level of first application location information includes first application location information in one or more pieces of application location information that are in the first steering location information and that correspond to the local application server at each level, and the session management network element determines, based on the sequence indication information and traffic steering policy information corresponding to each level of first application location information that are in the first steering location information, policy rules corresponding to the user plane network element at each level. Based on this solution, the session management network element can select a plurality of user plane network elements, and determine policy rules corresponding to each of the plurality of user plane network elements.

In a possible design, the policy rules include a first packet detection rule PDR and a first forwarding action rule FAR associated with the first PDR, and that the policy rules are used to steer, to a local application server for the first application in a target LAN, data of the first application sent by an upstream network element includes the first PDR is used to identify the data of the first application sent by the upstream network element, and the first FAR is used to steer the data to the local application server for the first application in the target LAN, where the first FAR includes a first destination interface and a first forwarding policy, the first destination interface is a LAN, and the first forwarding policy includes the traffic steering policy information corresponding to the first application location information or the traffic steering policy information corresponding to each level of first application location information.

In a possible design, the policy rules include a second PDR and a second FAR associated with the second PDR, and that the policy rules are used to send data processed by the local application server for the first application in the target LAN to a downstream network element includes the second PDR is used to identify the data processed by the local application server for the first application in the target LAN, where the second PDR includes a second source interface, and the second source interface is a LAN, and the second FAR is used to send the data processed by the local application server for the first application in the target LAN to the downstream network element.

In a possible design, the application location information includes a user plane access identifier representing access to the target LAN in which the local application server for the first application is deployed, an identifier of the target LAN in which the local application server for the first application is deployed, an identifier of a user plane network element that supports access to the target LAN in which the local application server for the first application is deployed, or an identifier of the local application server for the first application.

In a possible design, the LAN traffic steering information further includes direction indication information, and the direction indication information is used to indicate to steer uplink data of the first application to the local application server for the first application in the target LAN, or the direction indication information is used to indicate to steer downlink data of the first application to the local application server for the first application in the target LAN.

In a possible design, if the data is uplink data, the upstream network element of the user plane network element includes an access network device, an intermediate user plane network element, or a user plane network element corresponding to an upper-level local server, and the downstream network element of the user plane network element includes an intermediate user plane network element, a user plane network element corresponding to a lower-level local server, or an anchor user plane network element.

In a possible design, if the data is downlink data, the upstream network element of the user plane network element includes an intermediate user plane network element, or a user plane network element or an anchor user plane network element corresponding to an upper-level local server, and the downstream network element of the first user plane network element includes an access network device, a user plane network element corresponding to a lower-level local server, or an intermediate user plane network element.

According to a second aspect, a policy control method is provided. The method includes a user plane network element receives policy rules from a session management network element. The user plane network element steers, to a local application server for a first application in a target local area network LAN according to the policy rules, data of the first application sent by an upstream network element of the user plane network element, and sends data processed by the local application server for the first application in the target LAN to a downstream network element of the user plane network element according to the policy rules, where the target LAN is a LAN corresponding to the user plane network element. Based on the policy control method, a user plane network element can steer, to the local application server for the first application in the target LAN, data of the first application sent by an upstream network element of the user plane network element, and send data processed by the local application server for the first application in the target LAN to a downstream network element of the user plane network element.

In a possible design, the policy rules include a first packet detection rule PDR and a first forwarding action rule FAR associated with the first PDR, and that the user plane network element steers, to a local application server for a first application in a target LAN according to the policy rules, data of the first application sent by an upstream network element of the user plane network element includes the user plane network element identifies, according to the first PDR, the data of the first application sent by the upstream network element of the user plane network element, and the user plane network element steers the data to the local application server for the first application in the target LAN according to the first FAR, where the first FAR includes a first destination interface and a first forwarding policy, the first destination interface is a LAN, and the first forwarding policy includes traffic steering policy information.

In a possible design, the policy rules include a second PDR and a second FAR associated with the second PDR, and that the user plane network element sends data processed by the local application server for the first application in the target LAN to a downstream network element of the user plane network element according to the policy rules includes the user plane network element identifies, according to the second PDR, the data processed by the local application server for the first application in the target LAN, where the second PDR includes a second source interface, and the second source interface is a LAN, and the user plane network element sends the data processed by the local application server for the first application in the target LAN to the downstream network element of the user plane network element according to the second FAR.

According to a third aspect, a communication apparatus is provided, and is configured to implement the foregoing methods. The communication apparatus may be the session management network element in the first aspect or the following eleventh aspect, or an apparatus including the session management network element, the communication apparatus may be the user plane network element in the second aspect or the following twelfth aspect, or an apparatus including the user plane network element, or the communication apparatus may be an anchor user plane network element in the following thirteenth aspect, or an apparatus including an anchor user plane network element. The communication apparatus includes a corresponding module, unit, or means for implementing the foregoing method. The module, unit, or means may be implemented by using hardware or software, or implemented by using hardware by executing corresponding software. The hardware or software includes one or more modules or units corresponding to the foregoing functions.

According to a fourth aspect, a communication apparatus is provided, and includes a processor and a memory. The memory is configured to store computer instructions. When the processor executes the instructions, the communication apparatus is enabled to perform the method according to any one of the foregoing aspects or the following aspects. The communication apparatus may be the session management network element in the first aspect or the following eleventh aspect, or an apparatus including the session management network element, the communication apparatus may be the user plane network element in the second aspect or the following twelfth aspect, or an apparatus including the user plane network element, or the communication apparatus may be an anchor user plane network element in the following thirteenth aspect, or an apparatus including an anchor user plane network element.

According to a fifth aspect, a communication apparatus is provided, and includes a processor. The processor is configured to: be coupled to a memory, read instructions in the memory, and then perform, according to the instructions, the method according to any one of the foregoing aspects or the following aspects. The communication apparatus may be the session management network element in the first aspect or the following eleventh aspect, or an apparatus including the session management network element, the communication apparatus may be the user plane network element in the second aspect or the following twelfth aspect, or an apparatus including the user plane network element, or the communication apparatus may be an anchor user plane network element in the following thirteenth aspect, or an apparatus including an anchor user plane network element.

According to a sixth aspect, a computer-readable storage medium is provided. The computer-readable storage medium stores instructions. When the instructions are run on a computer, the computer is enabled to perform the method according to any one of the foregoing aspects or the following aspects.

According to a seventh aspect, a computer program product including instructions is provided. When the computer program product runs on a computer, the computer is enabled to perform the method according to any one of the foregoing aspects or the following aspects.

According to an eighth aspect, a communication apparatus (for example, the communication apparatus may be a chip or a chip system) is provided. The communication apparatus includes a processor, configured to implement the functions according to any one of the foregoing aspects or the following aspects. In a possible design, the communication apparatus further includes a memory, and the memory is configured to store necessary program instructions and data. When the communication apparatus is a chip system, the chip system may include a chip, or include a chip and other discrete devices.

For technical effects brought by any one of the design manners of the third aspect to the eighth aspect, refer to technical effects brought by different design manners of the first aspect or the second aspect. Details are not described herein again.

According to a ninth aspect, a communication method is provided. The communication method includes a session management network element receives local area network LAN traffic steering information corresponding to a first application from a policy control network element. The session management network element selects one or more user plane network elements based on the LAN traffic steering information, and determines policy rules corresponding to each of the one or more user plane network elements. The session management network element sends the corresponding policy rules to each user plane network element. For any one of the one or more user plane network elements, the user plane network element receives policy rules from the session management network element, steers, to a local application server for the first application in a target local area network LAN according to the policy rules, data of the first application sent by an upstream network element of the user plane network element, and sends data processed by the local application server for the first application in the target LAN to a downstream network element of the user plane network element according to the policy rules, where the target LAN is a LAN corresponding to the user plane network element. Based on the communication method, a proper user plane network element can be selected, so that the user plane network element steers, to the local application server for the first application in the target LAN, data of the first application sent by an upstream network element of the user plane network element, and sends data processed by the local application server for the first application in the target LAN to a downstream network element of the user plane network element.

According to a tenth aspect, a communication system is provided. The communication system includes a session management network element and one or more user plane network elements. The session management network element is configured to receive local area network LAN traffic steering information corresponding to a first application from a policy control network element. The session management network element is further configured to: select one or more user plane network elements based on the LAN traffic steering information, and determine policy rules corresponding to each of the one or more user plane network elements. The session management network element is further configured to send the corresponding policy rules to each user plane network element. For any one of the one or more user plane network elements, the user plane network element is configured to: receive policy rules from the session management network element, steer, to a local application server for the first application in a target local area network LAN according to the policy rules, data of the first application sent by an upstream network element of the user plane network element, and send data processed by the local application server for the first application in the target LAN to a downstream network element of the user plane network element according to the policy rules, where the target LAN is a LAN corresponding to the user plane network element. Based on the communication system, a proper user plane network element can be selected, so that the user plane network element steers, to the local application server for the first application in the target LAN, data of the first application sent by an upstream network element of the user plane network element, and sends data processed by the local application server for the first application in the target LAN to a downstream network element of the user plane network element.

According to an eleventh aspect, a policy control method is provided. The method includes a session management network element receives LAN traffic steering information corresponding to a first application from a policy control network element. The session management network element selects, based on the LAN traffic steering information, one or more user plane network elements and an anchor user plane network element corresponding to each of the one or more user plane network elements. The session management network element determines policy rules corresponding to each user plane network element, where the policy rules are used to send, to an anchor user plane network element corresponding to the user plane network element, data of the first application sent by an upstream network element, and used to send data that is from the anchor user plane network element and that is processed by a local application server for the first application in a target LAN to a downstream network element. The session management network element further determines policy rules corresponding to the anchor user plane network element corresponding to each user plane network element, where the policy rules are used to steer data of the first application from the user plane network element corresponding to the anchor user plane network element to the local application server for the first application in the target LAN, and used to send data processed by the local application server for the first application in the target LAN to the user plane network element corresponding to the anchor user plane network element. The session management network element sends the corresponding policy rules to each user plane network element and sends the corresponding policy rules to the anchor user plane network element corresponding to each user plane network element.

Based on the policy control method, a proper user plane network element and an anchor user plane network element corresponding to the user plane network element can be selected, so that the user plane network element and the anchor user plane network element steer, to the local application server for the first application in the target LAN, data of the first application sent by an upstream network element of the user plane network element, and send data processed by the local application server for the first application in the target LAN to a downstream network element of the user plane network element.

According to a twelfth aspect, a policy control method is provided. The method includes a user plane network element receives policy rules from a session management network element. The user plane network element sends, to an anchor user plane network element corresponding to the user plane network element according to the policy rules, data of a first application sent by an upstream network element of the user plane network element, and passes, from the anchor user plane network element, through a target LAN. Based on the policy control method, the user plane network element can send, to the anchor user plane network element corresponding to the user plane network element, the data of the first application sent by the upstream network element of the user plane network element, and send the data that is from the anchor user plane network element and that is processed by the local application server for the first application in the target LAN to the downstream network element of the user plane network element.

According to a thirteenth aspect, a policy control method is provided. The method includes an anchor user plane network element receives policy rules from a session management network element. The anchor user plane network element steers, to a local application server for a first application in a target LAN according to the policy rules, data of the first application from a user plane network element corresponding to the anchor user plane network element, and sends data processed by the local application server for the first application in the target LAN to the user plane network element according to the policy rules. Based on the policy control method, the anchor user plane network element can steer, to the local application server for the first application in the target LAN, data of the first application sent by an upstream network element of the user plane network element corresponding to the anchor user plane network element, and send data processed by the local application server for the first application in the target LAN to the user plane network element, so that the user plane network element can send the data to a downstream network element of the user plane network element.

BRIEF DESCRIPTION OF THE DRAWINGS

FIG. 6A to FIG. 6C are a schematic flowchart 2 of a policy control method according to an embodiment of this application;

FIG. 8A to FIG. 8D are a schematic flowchart 4 of a policy control method according to an embodiment of this application;

FIG. 12A to FIG. 12D are a schematic flowchart 8 of a policy control method according to an embodiment of this application;

DETAILED DESCRIPTION OF ILLUSTRATIVE EMBODIMENTS

The following describes technical solutions in the embodiments of this application with reference to the accompanying drawings in the embodiments of this application. In the descriptions of this application, "/" indicates that associated objects are in an "or" relationship unless otherwise specified. For example, A/B may represent A or B.

In this application, "and/or" describes only an association relationship for describing associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may represent a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not constitute a limitation on a quantity or an execution sequence, and that the terms such as "first" and "second" do not indicate a definite difference. In addition, in the embodiments of this application, the term such as "example" or "for example" is used to represent giving an example, an illustration, or a description. Any embodiment or design scheme described as an "example" or with "for example" in the embodiments of this application should not be explained as being more preferred or having more advantages than another embodiment or design scheme. Exactly, use of the term such as "example" or "for example" is intended to present a relative concept in a specific manner for ease of understanding.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

Figure 2:
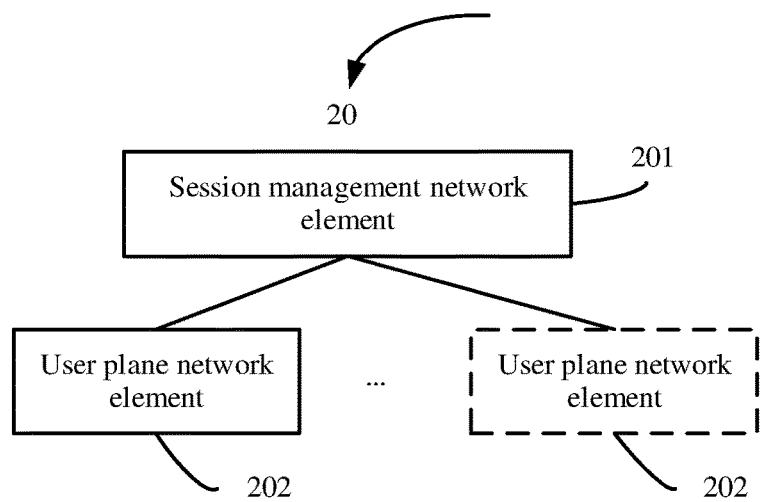
FIG. 2 is a schematic diagram of a structure of a communication system according to an embodiment of this application.

FIG. 2 shows a communication system 20 according to an embodiment of this application. The communication system 20 includes a session management network element 201 and one or more user plane network elements 202.

The session management network element 201 is configured to: receive LAN traffic steering information corresponding to a first application from a policy control network element, select one or more user plane network elements 202 based on the LAN traffic steering information, determine policy rules corresponding to each of the one or more user plane network elements 202, and then send corresponding policy rules to each user plane network element 202. Any user plane network element 202 is configured to: receive policy rules from the session management network element 201, steer, to a local application server for the first application in a target LAN according to the policy rules, data of the first application sent by an upstream network element of the user plane network element 202, and send data processed by the local application server for the first application in the target LAN to a downstream network element of the user plane network element 202, where the target LAN is a LAN corresponding to the user plane network element 202. A specific implementation of the foregoing solution is to be described in detail in subsequent method embodiments. Details are not described herein.

Figure 1:
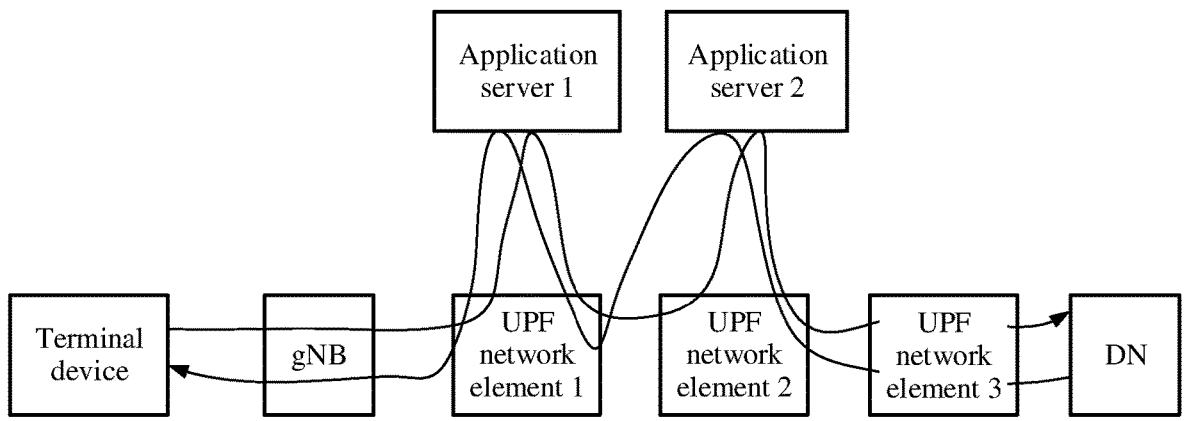
FIG. 1 is a schematic diagram of a currently provided new application scenario.

It should be noted that in this embodiment of this application, upstream and downstream mean topology locations that are of one network element relative to another network element and that are related to a data transmission direction. In an uplink transmission direction, an upstream network element of a user plane network element 202 may include, for example, an access network device or another intermediate user plane network element between the access network device and the user plane network element 202, and a downstream network element of the user plane network element 202 may include, for example, an anchor user plane network element or another intermediate user plane network element between the anchor user plane network element and the user plane network element 202. For example, in FIG. 1, a UPF network element 1 is an upstream network element of a UPF network element 2, a gNB is an upstream network element of the UPF network element 1, a UPF network element 3 is a downstream network element of the UPF network element 2, and the UPF network element 2 is a downstream network element of the UPF network element 1. In a downlink transmission direction, an upstream network element of a user plane network element 202 may include, for example, an anchor user plane network element or another intermediate user plane network element between the anchor user plane network element and the user plane network element 202, and a downstream network element of the user plane network element 202 may include, for example, an access network device or another intermediate user plane network element between the access network device and the user plane network element 202. For example, in FIG. 1, the UPF network element 2 is an upstream network element of the UPF network element 1, the UPF network element 3 is an upstream network element of the UPF network element 2, the UPF network element 2 is a downstream network element of the UPF network element 3, and the UPF network element 1 is a downstream network element of the UPF network element 2. Uniform descriptions are provided herein, and details are not described below again.

Optionally, the determining in this embodiment of this application may alternatively be understood as creating or generating. Uniform descriptions are provided herein. This is not specifically limited in this embodiment of this application.

Optionally, in this embodiment of this application, the session management network element 201 and the user plane network element 202 may directly communicate with each other, or may communicate with each other through forwarding via another device. This is not specifically limited in this embodiment of this application.

Based on the communication system provided in this embodiment of this application, a proper user plane network element can be selected, so that the user plane network element steers, to the local application server for the first application in the target LAN, data of the first application sent by an upstream network element of the user plane network element, and sends data processed by the local application server for the first application in the target LAN to a downstream network element of the user plane network element.

Optionally, the communication system 20 shown in FIG. 2 may be used in a currently discussed 5G network or another future network. This is not specifically limited in this embodiment of this application.

Figure 3:
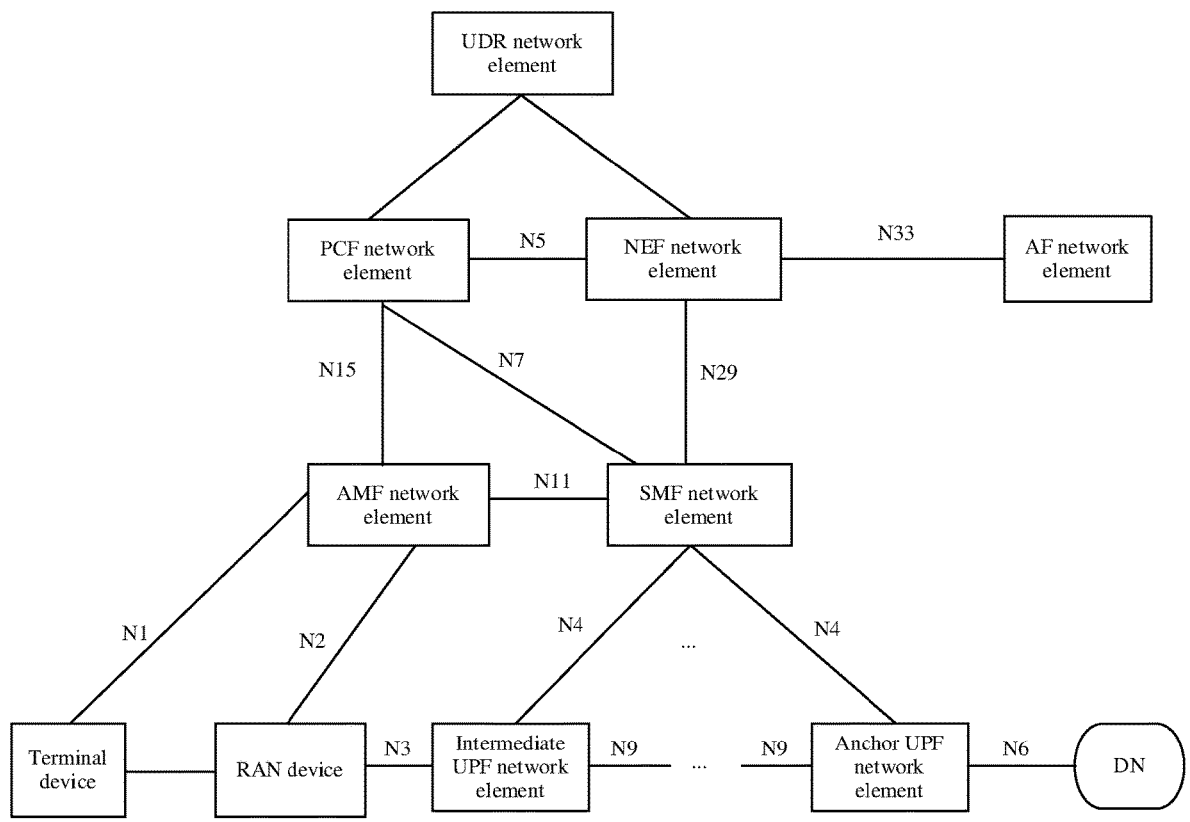
FIG. 3 is a schematic diagram of a 5G network architecture according to an embodiment of this application.

For example, it is assumed that the communication system 20 shown in FIG. 2 may be used in the currently discussed 5G network. As shown in FIG. 3, a network element or an entity corresponding to the session management network element 201 may be a session management function (SMF) network element in the 5G network, a network element or an entity corresponding to the user plane network element 202 may be an intermediate UPF network element in the 5G network, and there may be one or more intermediate UPF network elements.

In addition, as shown in FIG. 3, the 5G network may further include a radio access network (RAN) device, an access and mobility management function (AMF) network element, an anchor UPF network element, a policy control function (PCF) network element, a network exposure function (NEF) network element, a unified data repository (UDR) network element, and an application function (AF) network element.

As shown in FIG. 3, a terminal device communicates with the AMF network element through a next generation network (NG) 1 interface (N1), the RAN device communicates with the AMF network element through an N2 interface (N2), and the RAN device communicates with an intermediate UPF network element through an N3 interface (N3), different intermediate UPF network elements communicate with each other through an N9 interface, and an intermediate UPF network element communicates with the anchor UPF network element through an N9 interface, the anchor UPF network element communicates with a DN through an N6 interface (N6), the AMF network element communicates with the SMF network element through an N11 interface (N11), the SMF network element communicates with the intermediate UPF network element or the anchor UPF network element through an N4 interface (N4), the AMF network element communicates with the PCF network element through an N15 interface (N15), the SMF network element communicates with the NEF network element through an N29 interface (N29), and the SMF network element communicates with the PCF network element through an N7 interface (N7), and the NEF network element communicates with the AF network element through an N33 interface (N33), and the NEF network element communicates with the PCF network element through an N5 interface (N5).

Figure 15:
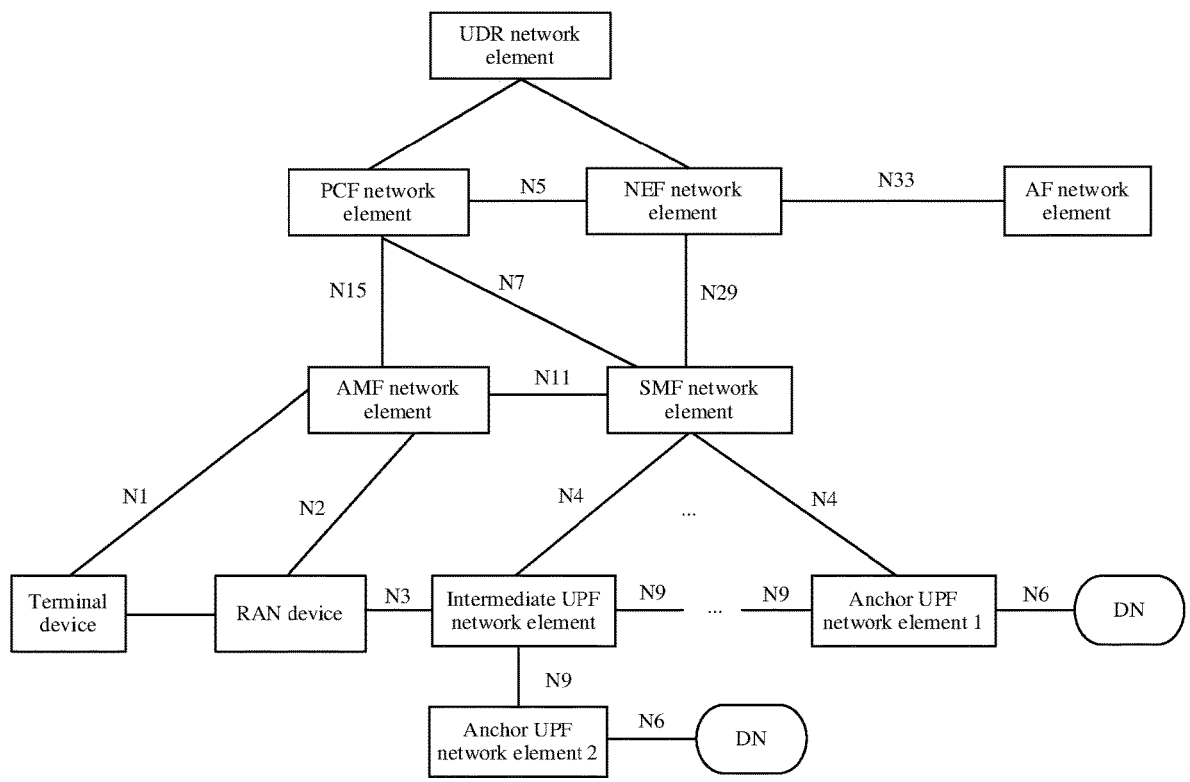
FIG. 15 is a schematic diagram of a 5G network architecture according to an embodiment of this application.

FIG. 15 is a schematic diagram of still another system architecture when the communication system 20 shown in FIG. 2 is used in a 5G network. Differences between this architecture and the architecture in FIG. 3 are as follows. An intermediate UPF network element has a traffic steering function, the intermediate UPF network element separately communicates with an anchor UPF network element 1 and an anchor UPF network element 2 through an N9 interface. The anchor UPF network element 1 may be understood as the anchor UPF network element in FIG. 3, and the anchor UPF network element 1 and the anchor UPF network element 2 each communicate with a DN through an N6 interface.

Optionally, in this embodiment of this application, an intermediate UPF network element has a traffic steering function, which may be understood as the intermediate UPF network element can steer a service flow to a local route, or steer a service flow to a remote route.

Optionally, the local route means that the intermediate UPF network element steers the service flow to the anchor UPF network element 2 and the anchor UPF network element 2 sends the service flow to a LAN (referred to as a local LAN below) to which the anchor UPF network element 2 belongs. Optionally, the service flow may be further sent to the DN (referred to as a local DN below) that communicates with the anchor UPF network element 2.

Optionally, the remote route means that the intermediate UPF network element steers the service flow to the anchor UPF network element 1 and the anchor UPF network element 1 sends the service flow to the DN (referred to as a central DN below) that communicates with the anchor UPF network element 1.

It may be understood that the intermediate UPF network element in FIG. 3 may be considered as integrating a function of the anchor UPF network element 2 in FIG. 15, or it may be understood as that the intermediate UPF network element in FIG. 3 and the anchor UPF network element 2 are co-located.

Optionally, the AF network element in this embodiment of this application may be specifically an application server. Uniform descriptions are provided herein, and details are not described below again.

Optionally, the terminal device in this embodiment of this application may be a device configured to implement a wireless communication function, for example, a terminal, or a chip that may be used in the terminal. The terminal may be user equipment (UE), an access terminal, a terminal unit, a terminal station, a mobile station, a mobile console, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, or another processing device connected to a wireless modem, a vehicle-mounted device, or a wearable device, a virtual reality (VR) terminal device, an augmented reality (AR) terminal device, a wireless terminal in industrial control, a wireless terminal in self driving, a wireless terminal in remote medical, a wireless terminal in a smart grid (smart grid), a wireless terminal in transportation safety, a wireless terminal in a smart city, a wireless terminal in a smart home, or the like. The terminal may be mobile or fixed.

Optionally, in this embodiment of this application, the RAN device is a device that accesses a core network. For example, the RAN device may be a base station, a broadband network gateway (BNG), an aggregation switch, or a non-3rd generation partnership project (3GPP) access device. There may be base stations in various forms, for example, a macro base station, a micro base station (also referred to as a small cell), a relay station, and an access point.

Optionally, in this embodiment of this application, the user plane network element or the session management network element may alternatively be referred to as a communication apparatus. The communication apparatus may be a general-purpose device or a dedicated device. This is not specifically limited in this embodiment of this application.

Optionally, in this embodiment of this application, a related function of the session management network element or the user plane network element may be implemented by one device, or may be jointly implemented by a plurality of devices, or may be implemented by one or more functional modules in one device. This is not specifically limited in this embodiment of this application. It may be understood that the foregoing function may be a network element in a hardware device, or may be a software function running on dedicated hardware, or a combination of hardware and software, or a virtualization function instantiated on a platform (for example, a cloud platform).

Figure 4:
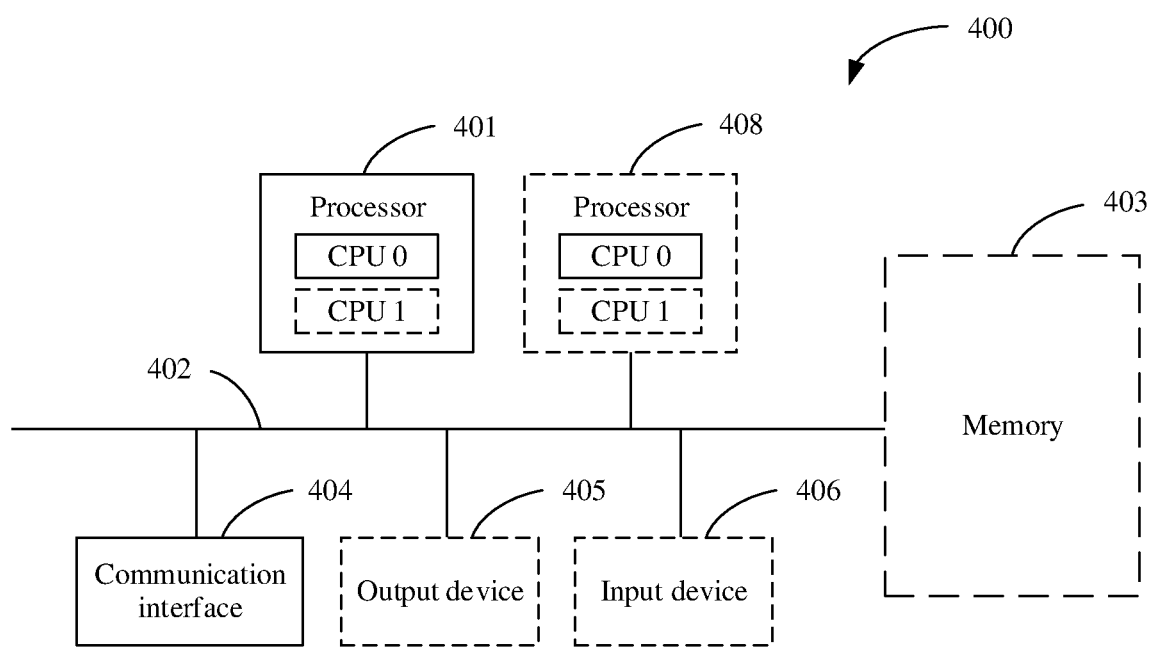
FIG. 4 is a schematic diagram of a structure of a communication device according to an embodiment of this application.

For example, in this embodiment of this application, a related function of the session management network element or the user plane network element may be implemented by a communication device 400 in FIG. 4. FIG. 4 is a schematic diagram of a structure of a communication device 400 according to an embodiment of this application. The communication device 400 includes one or more processors 401, a communication line 402, and at least one communication interface (in FIG. 4, descriptions are provided by merely using an example in which the communication device 400 includes one communication interface 404 and one processor 401). Optionally, the communication device 400 may further include a memory 403.

The processor 401 may be a general-purpose central processing unit (CPU), a microprocessor, an application-specific integrated circuit (ASIC), or one or more integrated circuits configured to control execution of a program in the solutions of this application.

The communication line 402 may include a path for connecting different components.

The communication interface 404 may be a transceiver module, configured to communicate with another device or a communication network, such as the Ethernet, a RAN, or a wireless local area network (WLAN). For example, the transceiver module may be an apparatus such as a transceiver or a transceiver machine. Optionally, the communication interface 404 may alternatively be a transceiver circuit located in the processor 401, to implement signal input and signal output of the processor.

The memory 403 may be an apparatus having a storage function. For example, the memory 403 may be a read-only memory (ROM) or another type of static storage device that can store static information and instructions, or a random access memory (RAM) or another type of dynamic storage device that can store information and instructions. The memory 403 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), or a magnetic disk storage medium or another magnetic storage device, or any other medium that can be used to carry or store expected program code in an instruction form or a data structure form and that can be accessed by a computer. However, the memory 403 is not limited thereto. The memory may exist independently, and is connected to the processor by using the communication line 402. The memory may alternatively be integrated with the processor.

The memory 403 is configured to store computer-executable instructions for executing the solutions in this application, and the processor 401 controls the execution. The processor 401 is configured to execute the computer-executable instructions stored in the memory 403, to implement a policy control method provided in the embodiments of this application.

Optionally, in this embodiment of this application, the processor 401 may perform processing-related functions in the policy control method provided in the following embodiments of this application. The communication interface 404 is responsible for communicating with another device or another communication network. This is not specifically limited in this embodiment of this application.

Optionally, the computer-executable instructions in this embodiment of this application may also be referred to as application program code. This is not specifically limited in this embodiment of this application.

During specific implementation, in an embodiment, the processor 401 may include one or more CPUs, for example, a CPU 0 and a CPU 1 in FIG. 4.

During specific implementation, in an embodiment, the communication device 400 may include a plurality of processors, for example, the processor 401 and a processor 408 in FIG. 4. Each of these processors may be a single-core (single-core) processor or a multi-core (multi-core) processor. The processor herein may be one or more devices, circuits, and/or processing cores configured to process data (for example, computer program instructions).

During specific implementation, in an embodiment, the communication device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (cathode ray tube, CRT) display device, or a projector. The input device 406 communicates with the processor 401, and may receive an input of a user in a plurality of manners. For example, the input device 406 may be a mouse, a keyboard, a touchscreen device, or a sensor device.

The communication device 400 may alternatively be referred to as a communication apparatus sometimes, and may be a general-purpose device or a dedicated device. For example, the communication device 400 may be a desktop computer, a portable computer, a network server, a palmtop computer, a mobile phone, a tablet computer, a wireless terminal device, an embedded device, the foregoing terminal device, the foregoing network device, or a device having a structure similar to the structure in FIG. 4. A type of the communication device 400 is not limited in this embodiment of this application.

A policy control method provided in the embodiments of this application is described below in detail with reference to FIG. 1 to FIG. 4.

It should be noted that a name of a message between network elements or a name of each parameter in a message in the following embodiments of this application is merely an example, and may alternatively be another name during specific implementation. This is not specifically limited in this embodiment of this application.

Figure 5A:
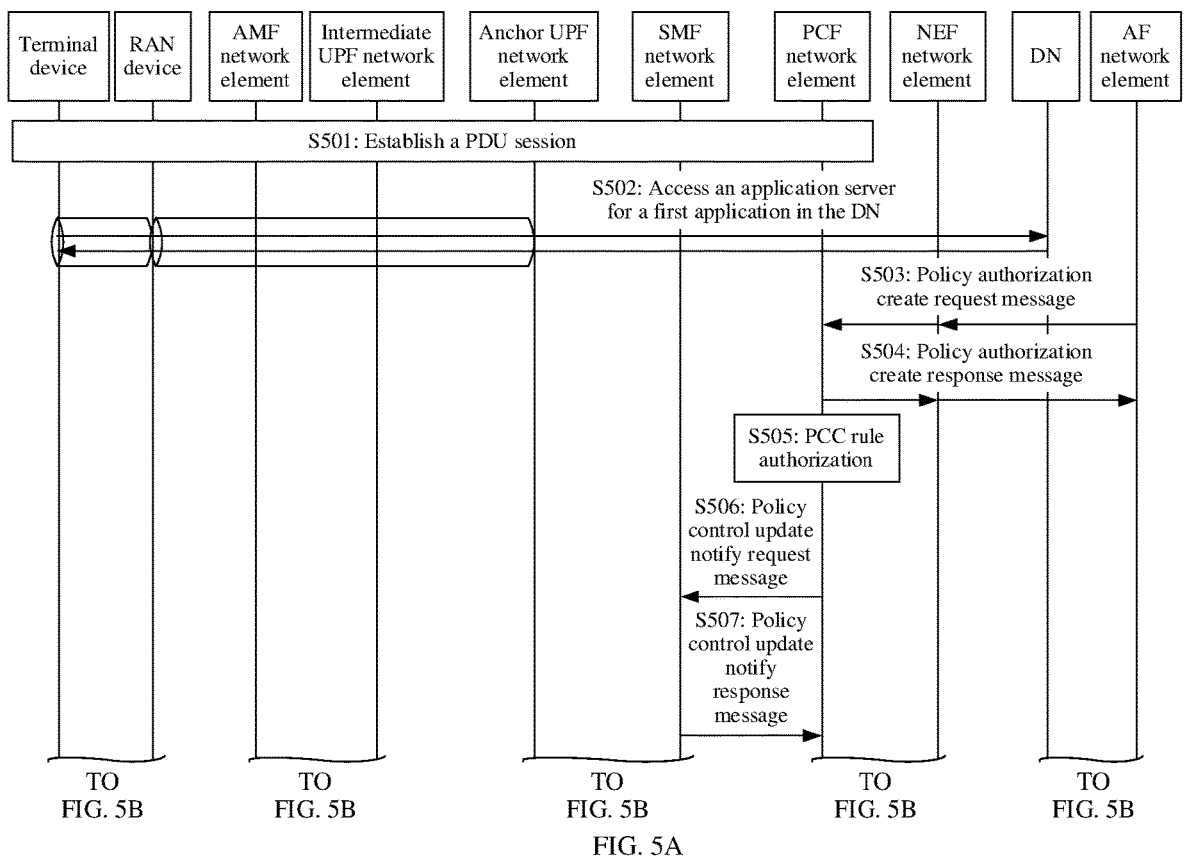
FIG. 5A to FIG. 5C are a schematic flowchart 1 of a policy control method according to an embodiment of this application.
Figure 5B:
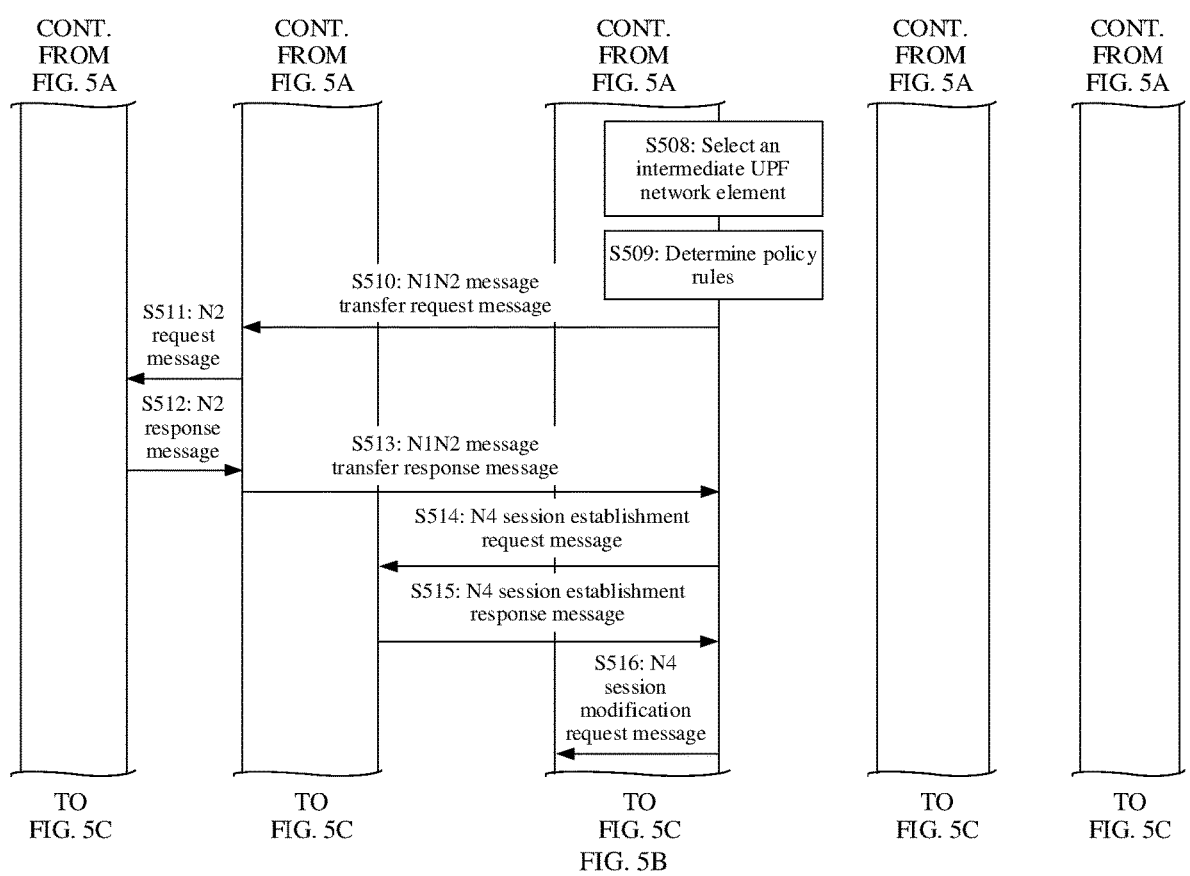
Figure 5C:
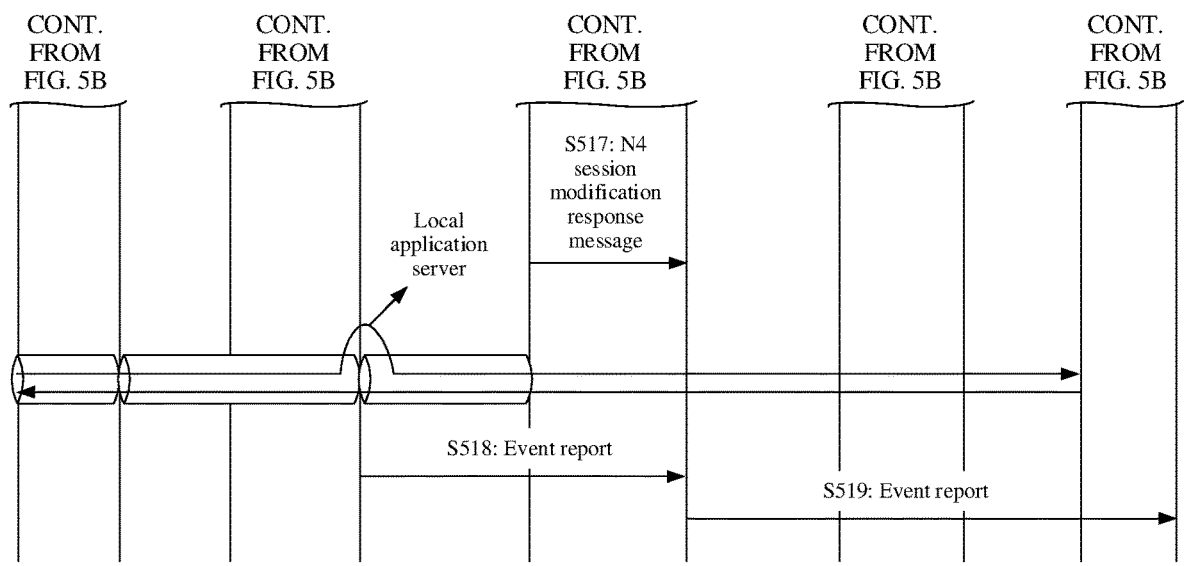

For example, the communication system shown in FIG. 2 is used in the 5G network shown in FIG. 3, and an SMF network element selects one intermediate UPF network element. FIG. 5A to FIG. 5C show a policy control method according to an embodiment of this application. The method describes: In a process in which a terminal device accesses an application server for a first application in a DN, the application server requests to steer a service flow in an uplink direction to one local application server for processing and then send a processed service flow to the application server for the first application in the DN. The method includes the following steps.

S501: The terminal device establishes a PDU session.

In a process in which the terminal device establishes the PDU session, an SMF network element selects an anchor UPF network element for the PDU session, and allocates an internet protocol (IP) address addr to the terminal device. In addition, core network (CN) tunnel information sent by the SMF network element to a RAN device includes an IP address 1 and a tunnel endpoint identifier (TEID) 1 for the anchor UPF network element to receive uplink data. RAN tunnel information received by the SMF network element includes an IP address 2 and a TEID 2 for the RAN device to receive downlink data. N4 information sent by the SMF network element to the anchor UPF network element includes a packet detection rule (packet detection rule, PDR) 1 and a forwarding action rule (FAR) 1 associated with the PDR 1, a PDR 2, and a FAR 2 associated with the PDR 2. The PDR 1 and the FAR associated with the PDR 1 are used to receive uplink data from the RAN device and send the uplink data to the DN. The PDR 2 and the FAR 2 associated with the PDR 2 are used to receive downlink data from the DN and send the downlink data to the RAN device. Packet detection information (PDI) including the PDR is shown in Table 1. The FAR 1 associated with the PDR is shown in Table 2. PDI including the PDR 2 is shown in Table 3. The FAR 2 associated with the PDR 2 is shown in Table 4.

TABLE 1

| Parameter | Value | Description |
| --- | --- | --- |
| Source interface (source interface) | Access network (access), indicating an uplink data direction | This parameter is mandatory. |
| Local (local) full qualified TEID (full qualified, F-TEID) | Including the IP address 1 and the TEID 1 | This parameter is conditionally mandatory, and is not carried when a traffic endpoint ID is included. |
| IP address of the terminal device | addr | This parameter is conditionally mandatory, and is not carried when a traffic endpoint ID is included. |
| Traffic endpoint ID (traffic endpoint) | Identifying a traffic endpoint, and including the IP address 1 and the TEID 1 allocated to the RAN device and the IP address addr allocated to the terminal device | This parameter is optional, and is carried when PDI optimization is supported. |

TABLE 2

| Parameter | Value |
| --- | --- |
| Apply action (apply action) | Forwarding a data packet |
| Forwarding parameters (forwarding parameters) | A destination interface is a core network, indicating an uplink data direction |

TABLE 3

| Parameter | Value | Description |
| --- | --- | --- |
| Source interface | Core network (core), indicating a downlink data direction | This parameter is mandatory. |
| IP address of the terminal device | addr | This parameter is conditionally mandatory, and is not carried when a traffic endpoint ID is included. |
| Traffic endpoint ID | Identifying a traffic endpoint, and including the IP address addr allocated to the terminal device | This parameter is optional, and is carried when PDI is supported. |

TABLE 4

| Apply action | Forwarding a data packet |
|---|---|
| Forwarding parameters | A destination interface is access, "outer header creation (outer header creation)" includes an F-TEID, and the F-TEID includes an IP address 2 and a TEID 2. The forwarding parameter indicates that the data packet is encapsulated by using a general packet radio service (general packet radio service, GPRS) tunneling protocol user plane (GPRS tunneling protocol user plane, GTP-U) and then sent to the RAN device. |

Optionally, in this embodiment of this application, the SMF network element may further receive data routing information, where the data routing information may include a first data network access identifier (DNAI). Then, the SMF network element may select the anchor UPF network element for the terminal device based on the first DNAI. This is not specifically limited in this embodiment of this application.

S502: The terminal device accesses the application server for the first application in the DN by using the established PDU session.

It should be noted that, in this embodiment of this application, the application server for the first application in the DN may alternatively be referred to as a central (central) application server or a remote application server for the first application. Uniform descriptions are provided herein. This is not specifically limited in this embodiment of this application.

S503: An AF network element corresponding to the application server for the first application in the DN determines that a service flow of the first application that is being accessed by the terminal device needs to be processed by a local application server. These local application servers are deployed in a MEC environment, and the MEC environment is deployed in a LAN to which some UPF network elements belong. Further, the AF network element sends a policy authorization create request message to a PCF network element. Correspondingly, the PCF network element receives the policy authorization create request message from the AF network element. The policy authorization create request message includes LAN traffic steering information 1.

Optionally, the LAN traffic steering information 1 and the following LAN traffic steering information 2 in this embodiment of this application are used to select an intermediate UPF network element and determine a policy corresponding to the intermediate UPF network element. The LAN traffic steering information 1 or the LAN traffic steering information 2 may include one or more pieces of steering location information. Each piece of steering location information may include data description information of the first application, one or more pieces of application location information of the first application, and traffic steering policy information corresponding to each piece of application location information.

For example, in this embodiment of this application, the data description information of the first application may include, for example, a 5-tuple of application data and an application identifier of the first application. The 5-tuple of the application data includes an address and a port number of the terminal device, an address and a port number of a server, and a transport layer protocol.

For example, in this embodiment of this application, the application location information may include, for example, a user plane access identifier (LAN access identifier, LANAI) or a LANAI list representing access to a target LAN in which the local application server for the first application is deployed, an identifier of the target LAN in which the local application server for the first application is deployed, an identifier of a user plane network element that supports access to the target LAN in which the local application server for the first application is deployed, or an identifier of the local server for the first application.

In this embodiment of this application, the traffic steering policy information is information that can identify a traffic steering policy. For example, the traffic steering policy information may include a data routing profile identifier (traffic steering profile ID), a traffic steering policy ID, the ID of the local application server, or a destination address and a port number used for data encapsulation. This is not specifically limited in this embodiment of this application.

Optionally, in this embodiment of this application, each piece of steering location information may further include a spatial validity condition and/or a temporal validity condition. The spatial validity condition indicates a location of the terminal device to which the steering location information is applied. The time validity condition indicates time at which the steering location information is applied, where the time is usually a time interval.

Optionally, in this embodiment of this application, each piece of steering location information may further include one or more of a corresponding DNAI, direction information of the service flow of the first application, and notification information. The DNAI indicates a DNAI supported by an anchor UPF network element to which the steering location information is applied. If the steering location information is applicable to a plurality of DNAIs, this parameter is a DNAI list. The direction information of the service flow of the first application indicates a direction of the service flow to which the traffic steering policy information is applied, and the direction information herein indicates an uplink direction. Certainly, if the data description information of the first application can uniquely indicate a service flow in an uplink direction, this parameter may not be carried. The notification information indicates a notification message to be sent before or after LAN traffic steering is performed.

In conclusion, content of each piece of steering location information may be shown in Table 5.

TABLE 5

| Data description information | For example, 5-tuple of application data and application identifier of the first application (mandatory) |
|---|---|
| Application location information | LANAI or LANAI list representing access to the target LAN in which the local application server for the first application is deployed, identifier of the target LAN in which the local application server for the first application is deployed, identifier of a user plane network element that supports access to the target LAN in which the local application server for the first application is deployed, or identifier of the local application server for the first application (mandatory) |

TABLE 5-continued

| | |
|---|---|
| Traffic steering policy information | Traffic steering policy corresponding to a LAN configured on an intermediate UPF (mandatory) |
| Spatial validity condition | Indicating a location of the terminal device to which the steering location information is applied (optional) |
| Temporal validity condition | Indicating time at which the steering location information is applied, where the time is usually a time interval (optional) |
| DNAI | Indicating a DNAI supported by an anchor UPF to which the steering location information is applied (optional) |
| Direction information | Indicating a direction of the service flow to which the traffic steering policy information is applied, where the direction information herein indicates an uplink direction (optional) |
| Notification information | Indicating a notification message to be sent before or after LAN traffic steering is performed (optional) |

It should be noted that, in this embodiment of this application, the AF network element may directly send the policy authorization create request message to the PCF network element, or the AF network element may first send the policy authorization create request message to an NEF network element, and the NEF network element sends the policy authorization create request message to the PCF network element. This is not specifically limited in this embodiment of this application.

Optionally, in this embodiment of this application, the AF network element and the application server for the first application in the DN may be independently deployed, or may be co-deployed. This is not specifically limited in this embodiment of this application. In FIG. 5A to FIG. 5C, descriptions are provided by merely using an example in which the AF network element and the application server for the first application in the DN are independently deployed. Uniform descriptions are provided herein, and details are not described below again.

S504: The PCF network element sends a policy authorization create response message to the AF network element. Correspondingly, the AF network element receives the policy authorization create response message from the PCF network element.

Optionally, in this embodiment of this application, if the AF network element may directly send the policy authorization create request message to the PCF network element, the PCF network element may directly send the policy authorization create response to the AF network element. Otherwise, the AF network element first sends the policy authorization create response message to the NEF network element, and the NEF network element sends the policy authorization create response message to the AF network element. Uniform descriptions are provided herein, and details are not described below again.

S505: The PCF network element performs PCC rule authorization based on the LAN traffic steering information 1. When the spatial validity condition and/or the temporal validity condition are/is included, PCC rule authorization is performed only when the condition is met.

A PCC rule in this embodiment of this application includes the LAN traffic steering information 2. The LAN traffic steering information 2 includes one or more pieces of steering location information. Content of each piece of steering location information may be shown in Table 6.

TABLE 6

| | |
|---|---|
| Data description information | For example, 5-tuple of application data and application identifier of the first application (mandatory) |
| Application location information | LANAI or LANAI list representing access to the target LAN in which the local application server for the first application is deployed, identifier of the target LAN in which the local application server for the first application is deployed, identifier of a user plane network element that supports access to the target LAN in which the local application server for the first application is deployed, or identifier of the local application server for the first application (mandatory) |
| Traffic steering policy information | Traffic steering policy corresponding to a LAN configured on an intermediate UPF (mandatory) |
| DNAI | Indicating a DNAI supported by an anchor UPF to which the steering location information is applied (optional) |
| Direction information | Indicating a direction of the service flow to which the traffic steering policy information is applied, where the direction information herein indicates an uplink direction (optional) |
| Notification information | Indicating a notification message to be sent before or after LAN traffic steering is performed (optional) |

A difference between Table 6 and Table 5 is as follows the steering location information in the LAN traffic steering information 2 does not include a spatial validity condition and/or a temporal validity condition. Therefore, when the steering location information in the LAN traffic steering information 1 does not include the spatial validity condition or the temporal validity condition, the LAN traffic steering information 1 is the same as the LAN traffic steering information 2 in this embodiment of this application. Uniform descriptions are provided herein, and details are not described below again.

S506: The PCF network element sends a policy control update notify request message to the SMF network element. Correspondingly, the SMF network element receives the policy control update notify request message from the PCF network element. The policy control update notify request message includes a PCC rule, and the PCC rule includes the LAN traffic steering information 2.

S507: After installing the PCC rule, the SMF network element sends a policy control update notify response message to the PCF network element. Correspondingly, the PCF network element receives the policy control update notify response message from the SMF network element.

S508: The SMF network element selects one intermediate UPF network element based on the LAN traffic steering information 2.

In a possible implementation, the LAN traffic steering information 2 includes one piece of steering location information. In this case, correspondingly, that the SMF network element selects one intermediate UPF network element based on the LAN traffic steering information 2 may specifically include the SMF network element selects one intermediate UPF network element based on first application location information in one or more pieces of application location information that are of the first application and that are included in the steering location information. For example, when there are a plurality of pieces of application location information for the first application, the first application location information may be, for example, a piece of application location information of a location closest to a current access location of the terminal device in the plurality of pieces of application location information, or the intermediate UPF network element selected based on the first application location information ensures that a path on which data of the terminal device passes through the intermediate UPF network element to the anchor UPF network element is optimal.

Alternatively, in another possible implementation, the LAN traffic steering information 2 includes a plurality of pieces of steering location information. In this case, correspondingly, that the SMF network element selects one intermediate UPF network element based on the LAN traffic steering information 2 may specifically include: In step S501, the SMF network element selects the anchor UPF network element based on the first DNAI, and the SMF network element selects first steering location information corresponding to the first DNAI from the plurality of pieces of steering location information, and the SMF network element selects one intermediate UPF network element based on first application location information in one or more pieces of application location information that are of the first application and that are in the first steering location information. For related descriptions of the first application location information, refer to the descriptions in the foregoing embodiment. Details are not described herein again.

It should be noted that in this embodiment of this application, when selecting the intermediate UPF network element, the SMF network element needs to consider a current location of the terminal device and a location of the anchor UPF network element, to avoid route recurvation. Uniform descriptions are provided herein, and details are not described below again.

In addition, in this embodiment of this application, core network tunnel information that is allocated by the SMF network element to the intermediate UPF network element for receiving the uplink data from the RAN device includes an IP address 3 and a TEID 3, and N9 tunnel information that is allocated by the SMF network element to the intermediate UPF network element for receiving downlink data from the anchor UPF network element includes an IP address 4 and a TEID 4.

S509: The SMF network element determines, based on the LAN traffic steering information 2, policy rules corresponding to the intermediate UPF network element, where the policy rules are used to steer, to the local application server for the first application in the target LAN, uplink data of the first application sent by an upstream network element of the intermediate UPF network element, and used to send uplink data processed by the local application server for the first application in the target LAN to a downstream network element of the intermediate UPF network element. For related descriptions of the upstream network element and the downstream network element, refer to the descriptions in the part for the communication system. Details are not described herein again.

Optionally, in this embodiment of this application, the SMF network element may determine an uplink data flow based on data description information or direction information in steering location information or first steering location information, that is, determine that the uplink data processed by the local application server for the first application in the target LAN needs to be sent to the downstream network element of the intermediate UPF network element.

Optionally, in this embodiment of this application, the policy rules corresponding to the intermediate UPF network element include a first PDR and a first FAR associated with the first PDR. That the policy rules are used to steer, to the local application server for the first application in the target LAN, uplink data of the first application sent by an upstream network element of the intermediate UPF network element includes the first PDR is used to identify the uplink data of the first application sent by the upstream network element of the intermediate UPF network element, and the first FAR is used to steer the uplink data to the local application server for the first application in the target LAN, where the first FAR includes a first destination interface and a first forwarding policy, the first destination interface is a LAN, and the first forwarding policy includes traffic steering policy information corresponding to the first application location information.

Optionally, in this embodiment of this application, the policy rules corresponding to the intermediate UPF network element further include a second PDR and a second FAR associated with the second PDR. That the policy rules are used to send uplink data processed by the local application server for the first application in the target LAN to a downstream network element of the intermediate UPF network element includes the second PDR is used to identify the uplink data processed by the local application server for the first application in the target LAN, where the second PDR includes a second source interface, and the second source interface is a LAN, and the second FAR is used to send the uplink data processed by the local application server for the first application in the target LAN to the downstream network element of the intermediate UPF network element.

For example, it is assumed that the first PDR may be denoted as a PDR 3, the first FAR may be denoted as a FAR 3, the second PDR may be denoted as a PDR 4, the second FAR may be denoted as a FAR 4, the upstream network element of the intermediate UPF network element is the RAN device, and the downstream network element of the intermediate UPF network element is the anchor UPF network element. The PDR 3 and the FAR 3 associated with the PDR 3 are used to receive the uplink data from the RAN device, and steer the uplink data to the local application server for the first application in the target LAN. The PDR 4 and the FAR 4 associated with the PDR 4 are used to receive the uplink data processed by the local application server for the first application in the target LAN, and send the uplink data to the anchor UPF network element. In addition, the policy rules corresponding to the intermediate UPF network element may further include a PDR 5 and a FAR 5 associated with the PDR 5. The PDR 5 and the FAR 5 associated with the PDR 5 are used to receive downlink data from the anchor UPF network element, and send the downlink data to the RAN device. This is not specifically limited in this embodiment of this application. PDI including the PDR 3 is shown in Table 7. The FAR 3 associated with the PDR 3 is shown in Table 8. PDI including the PDR 4 is shown in Table 9. The FAR 4 associated with the PDR 4 is shown in Table 10. PDI including the PDR 5 is shown in Table 11. The FAR 5 associated with the PDR 5 is shown in Table 12.

TABLE 7

| Parameter | Value | Description |
| --- | --- | --- |
| Source interface | Access, indicating an uplink data direction | This parameter is mandatory. |

TABLE 7-continued

| Parameter | Value | Description |
| --- | --- | --- |
| Local F-TEID | Including an IP address 3 and a TEID 3 | This parameter is conditionally mandatory, and is not carried when a traffic endpoint ID is included. |
| IP address of the terminal device | addr | This parameter is conditionally mandatory, and is not carried when a traffic endpoint ID is included. |
| Traffic endpoint ID | Identifying a traffic endpoint, and including an IP address 3, a TEID 3, and an IP address addr allocated to the terminal device | This parameter is optional, and is carried when PDI optimization is supported. |
| Service data flow (SDF) filter | IP packet filter generated when the terminal device accesses the first application | This parameter is determined based on data identification information |
| Application identifier (application ID) | Application identifier corresponding to the first application accessed by the terminal device | This parameter is determined based on data identification information |
| Ethernet packet filter | Ethernet packet filter generated when the terminal device accesses the first application | This parameter is determined based on data identification information |

TABLE 8

| Parameter | Value |
| --- | --- |
| Apply action Forwarding parameters | Forwarding a data packet A destination interface is a LAN or an intermediate LAN. A forwarding policy includes traffic steering policy information, for example, a traffic steering profile ID. The forwarding parameter indicates that the data packet is processed by using a local policy corresponding to the traffic steering profile ID and then sent to the destination interface. |

TABLE 9

| Parameter | Value | Description |
| --- | --- | --- |
| Source interface | LAN or intermediate LAN, indicating that data is from a LAN to which the intermediate UPF belongs | This parameter is mandatory. |
| IP address of the terminal device | addr | This parameter is conditionally mandatory, and is not carried when a traffic endpoint ID is included. |
| Traffic endpoint ID | Identifying a traffic endpoint, and including the IP address addr allocated to the terminal device | This parameter is optional, and is carried when PDI optimization is supported. |
| SDF filter | IP packet filter generated when the terminal device accesses the first application | This parameter is determined based on data identification information |
| Application ID | Application identifier corresponding to the first application accessed by the terminal device | This parameter is determined based on data identification information |
| Ethernet packet filter | Ethernet packet filter generated when the terminal device accesses the first application | This parameter is determined based on data identification information |

TABLE 10

| Parameter | Value |
| --- | --- |
| Apply action Forwarding parameters | Forwarding a data packet A destination interface is core, "outer header creation" includes an F-TEID, and the F-TEID includes an IP address 1 and a TEID 1. The forwarding parameter indicates that the data packet is encapsulated by using a GTP-U packet header and then sent to the anchor UPF network element. |

TABLE 11

| Parameter | Value | Description |
| --- | --- | --- |
| Source interface | Core, indicating a downlink data direction | This parameter is mandatory. |
| Local F-TEID | Including an IP address 4 and a TEID 4 | This parameter is conditionally mandatory, and is not carried when a traffic endpoint ID is included. |
| IP address of the terminal device | addr | This parameter is conditionally mandatory, and is not carried when a traffic endpoint ID is included. |
| Traffic endpoint ID | Identifying a traffic endpoint, and including the IP address 4, the TEID 4, and the IP address addr allocated to the terminal device | This parameter is optional, and is carried when PDI optimization is supported. |
| SDF filter | IP packet filter generated when the terminal device accesses the first application | This parameter is optional. |
| Application ID | Application identifier corresponding to the first application accessed by the terminal device | This parameter is optional. |
| Ethernet packet filter | Ethernet packet filter generated when the terminal device accesses the first application | This parameter is optional. |

TABLE 12

| Parameter | Value |
| --- | --- |
| Apply action | Forwarding a data packet |
| Forwarding parameters | A destination interface is access, "outer header creation" includes an F-TEID, and the F-TEID includes an IP address 2 and a TEID 2. The forwarding parameter indicates that the data packet is encapsulated by using a GTP-U and then sent to the RAN device. |

S510: The SMF network element sends an N1N2 message transfer request message to an AMF network element. Correspondingly, the AMF network element receives the N1N2 message transfer request message from the SMF network element. The N1N2 message transfer request message includes the core network tunnel information that is used by the intermediate UPF network element to receive the uplink data from the RAN device.

S511: The AMF network element sends an N2 request message to the RAN device. Correspondingly, the RAN device receives the N2 request message from the AMF network element. The N2 request message includes the core network tunnel information that is used by the intermediate UPF network element to receive the uplink data from the RAN device.

S512: The RAN device sends an N2 response message to the AMF network element. Correspondingly, the AMF network element receives the N2 response message from the RAN device.

S513: The AMF network element sends an N1N2 message transfer response message to the SMF network element. Correspondingly, the SMF network element receives the N1N2 message transfer response message from the AMF network element.

S514: The SMF network element sends an N4 session establishment request message to the intermediate UPF network element. Correspondingly, the intermediate UPF network element receives the N4 session establishment request message from the SMF network element. The N4 session establishment request message includes the policy rules such as the PDR 3, the FAR 3 associated with the PDR 3, the PDR 4, the FAR 4 associated with the PDR 4, the PDR 5, and the FAR 5 associated with the PDR 5 corresponding to the intermediate UPF network element.

Optionally, in this embodiment of this application, the intermediate UPF network element may determine a corresponding traffic steering policy based on the traffic steering policy information in the FAR 3, and then process the uplink data of the first application by using the traffic steering policy. This is not specifically limited in this embodiment of this application.

It should be noted that, in this embodiment of this application, step S510 and step S514 are not performed in a necessary sequence. Step S510 may be performed before step S514, step S514 may be performed before step S510, or step S510 and step S514 may be simultaneously performed. This is not specifically limited in this embodiment of this application.

S515: The intermediate UPF network element sends an N4 session establishment response message to the SMF network element. Correspondingly, the SMF network element receives the N4 session establishment response message from the intermediate UPF network element.

S516: The SMF network element sends an N4 session modification request message to the anchor UPF network element. Correspondingly, the anchor UPF network element receives the N4 session modification request message from the SMF network element. The N4 session modification request message includes an updated FAR 2, and the updated FAR 2 is used to send the downlink data from the DN to the intermediate UPF network element.

For example, the updated FAR 2 may be shown in Table 13.

TABLE 13

| Apply action | Forwarding a data packet |
|---|---|
| Forwarding parameters | A destination interface is access, "outer header creation" information includes an F-TEID, and the F-TEID includes an IP address 4 and a TEID 4. The forwarding parameter indicates that the data packet is encapsulated by using a GTP-U and then sent to the intermediate UPF network element. |

S517: The anchor UPF network element sends an N4 session modification response message to the SMF network element. Correspondingly, the SMF network element receives the N4 session modification response message from the anchor UPF network element.

S518: After steering the service flow to the target LAN, the intermediate UPF network element sends an event report to the SMF network element. The SMF network element receives the event report from the intermediate UPF network element. The event report is used to notify the application server for the first application in the DN that data has been processed by the local application server, and the application server for the first application in the DN may perform corresponding adjustment.

S519: The SMF network element sends the event report to the AF network element. Correspondingly, the AF network element receives the event report from the SMF network element.

Based on the policy control method provided in this embodiment of this application, a proper intermediate UPF network element can be selected, so that the intermediate UPF network element steers uplink data of the first application to a local application server for the first application in a target LAN, and sends uplink data processed by the local application server for the first application in the target LAN to a downstream network element of the intermediate UPF network element.

The actions of the SMF network element, the intermediate UPF network element, the PCF network element, or the AF network element in steps S501 to S519 may be performed by the processor 401 in the communication device 400 in FIG. 4 by invoking the application program code stored in the memory 403. This is not limited in this embodiment of this application.

It may be understood that the communication system shown in FIG. 2 is also used in a 5G network shown in FIG. 15. In a process in which a terminal device accesses an application server for a first application located in a central DN, in a scenario in which the application server requests to steer a service flow in an uplink direction to one local application server for processing and then send a processed service flow to the application server for the first application in the central DN, assuming that an SMF network element selects one intermediate UPF network element, a policy control method provided in an embodiment of this application is similar to the method shown in FIG. 5A to FIG. 5C. For example, differences are as follows:

First, the intermediate UPF network element selected by the SMF network element has a traffic steering function. In addition, the SMF network element further selects a new anchor UPF network element (referred to as an anchor UPF network element 2 below), and the anchor UPF network element 2 has a function of steering a data flow from the intermediate UPF network element to a local LAN.

Optionally, a manner for the SMF network element to select the anchor UPF network element 2 is similar to a manner for the SMF network element to select the intermediate UPF network element in the embodiment shown in FIG. 5A to FIG. 5C. The SMF network element may first select the anchor UPF network element 2, and then select the intermediate UPF network element. Certainly, the SMF network element may alternatively first select the intermediate UPF network element, and then select the anchor UPF network element 2. A sequence of selecting the intermediate UPF network element and the anchor UPF network element 2 by the SMF network element is not specifically limited in this embodiment of this application.

Second, the SMF network element determines policy rules corresponding to the intermediate UPF network element and policy rules corresponding to the anchor UPF network element 2.

The policy rules corresponding to the intermediate UPF network element are used to send, to the anchor UPF network element 2, uplink data of the first application sent by an upstream network element of the intermediate UPF network element, and used to send uplink data that is from the anchor UPF network element 2 and that is processed by a local application server for the first application in a target LAN to a downstream network element of the intermediate UPF network element.

The policy rules corresponding to the anchor UPF network element 2 are used to steer uplink data from the intermediate UPF network element to the local application server for the first application in the target LAN, and used to send uplink data processed by the local application server for the first application in the target LAN to the intermediate UPF network element. Further, the SMF network element sends the policy rules corresponding to the intermediate UPF network element to the intermediate UPF network element, and sends the policy rules corresponding to the anchor UPF network element 2 to the anchor UPF network element 2.

Based on the policy control method provided in this embodiment of this application, a proper intermediate UPF network element and an anchor UPF network element communicating with the intermediate UPF network element can be selected, so that the anchor UPF network element steers uplink data of the first application to a local application server for the first application in a target LAN, and sends uplink data processed by the local application server for the first application in the target LAN to the intermediate UPF network element, and the intermediate UPF network element sends the processed uplink data to a downstream network element of the intermediate UPF network element.

Figure 6B:
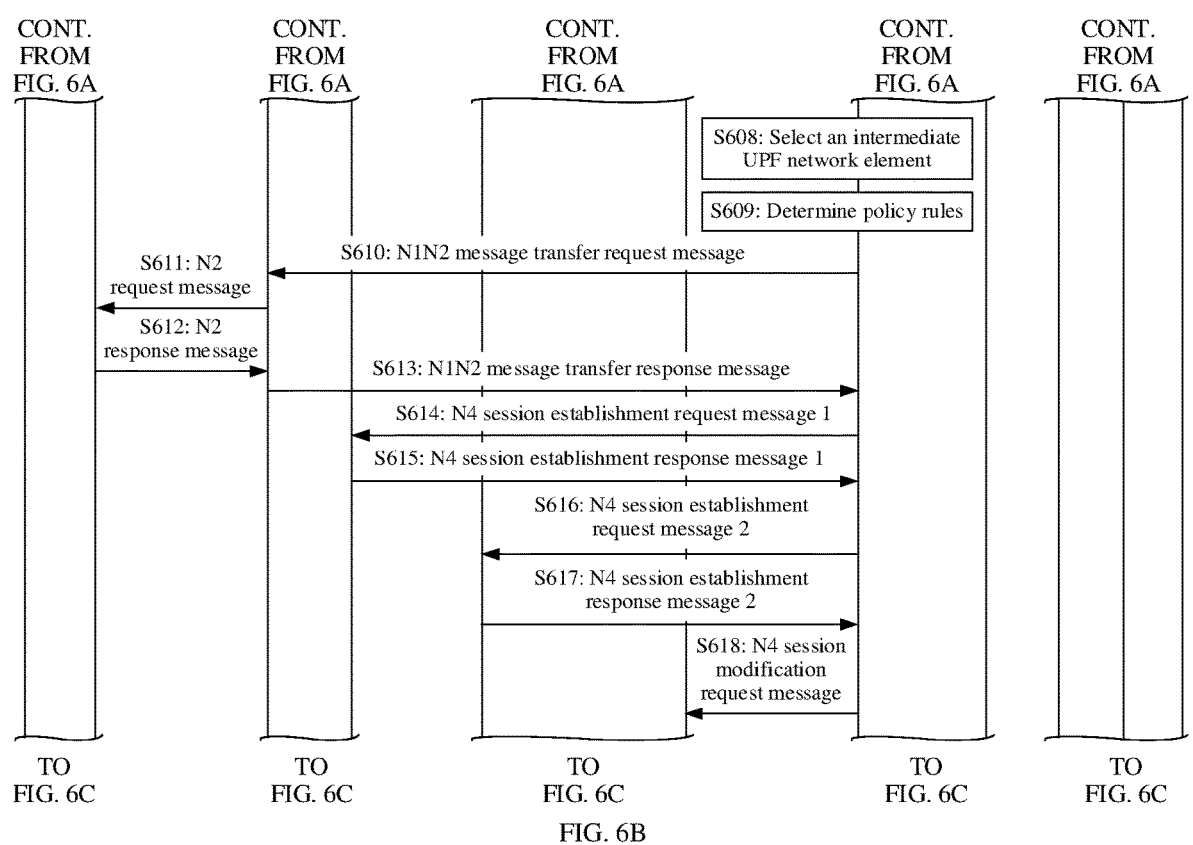
Figure 6C:
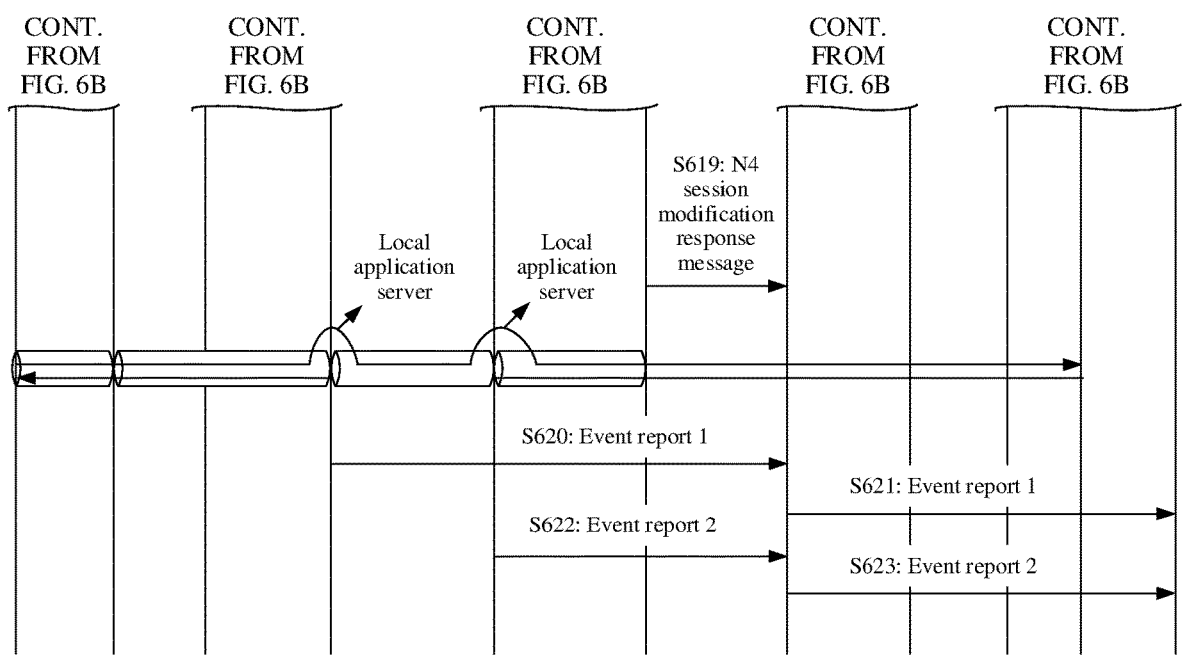
Figure 7A:
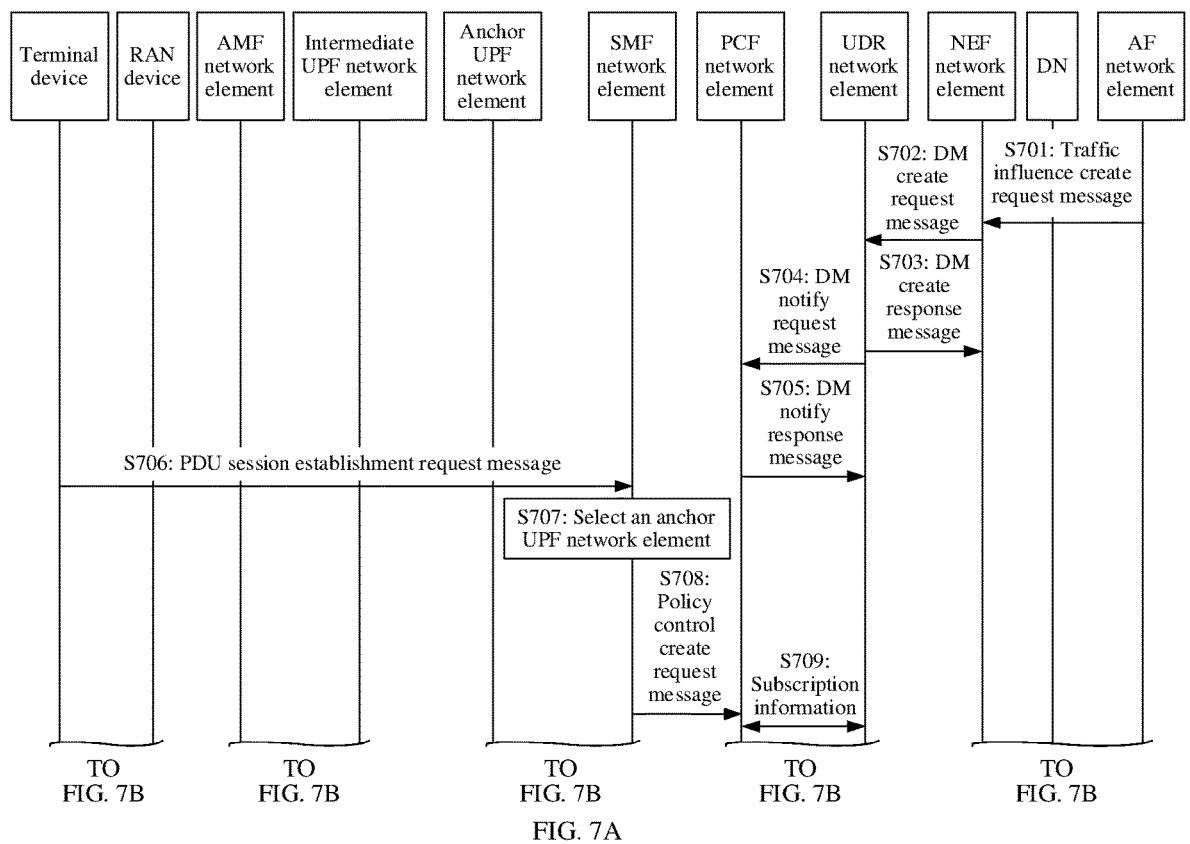
FIG. 7A to FIG. 7D are a schematic flowchart 3 of a policy control method according to an embodiment of this application.
Figure 7B:
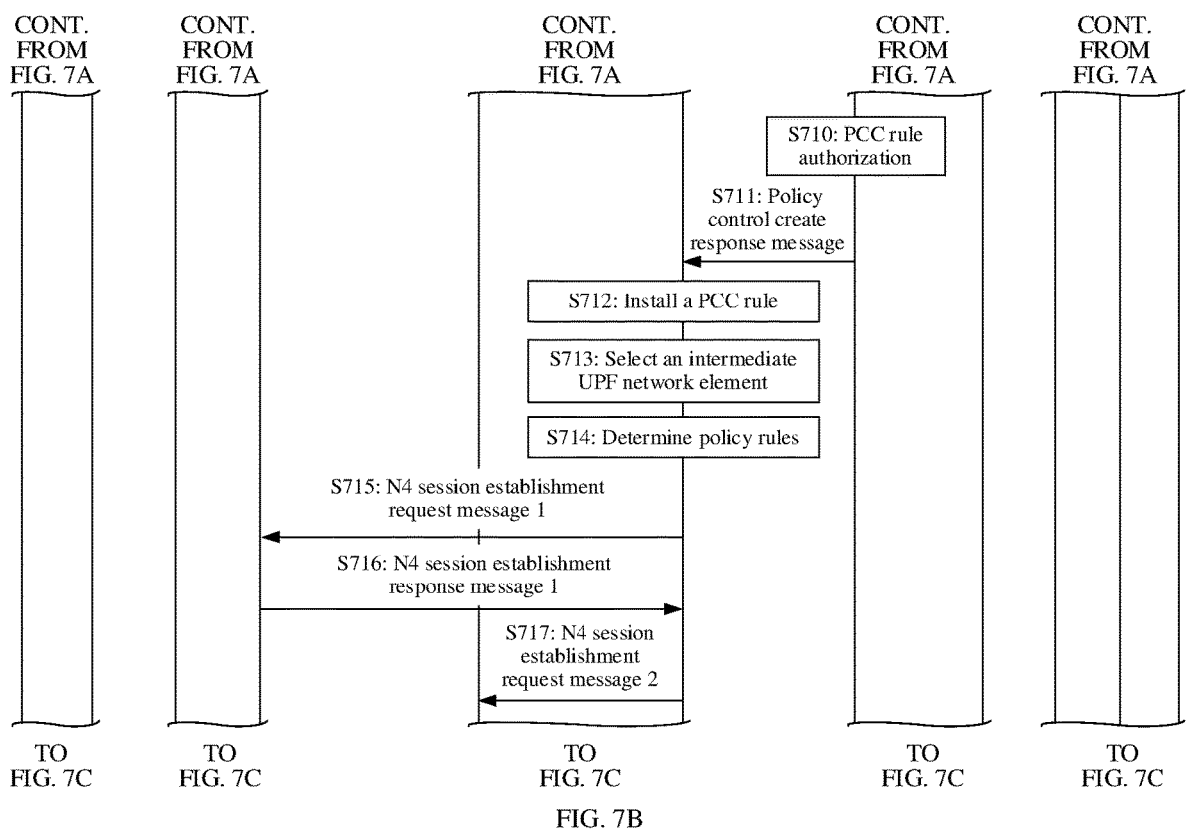
Figure 7C:
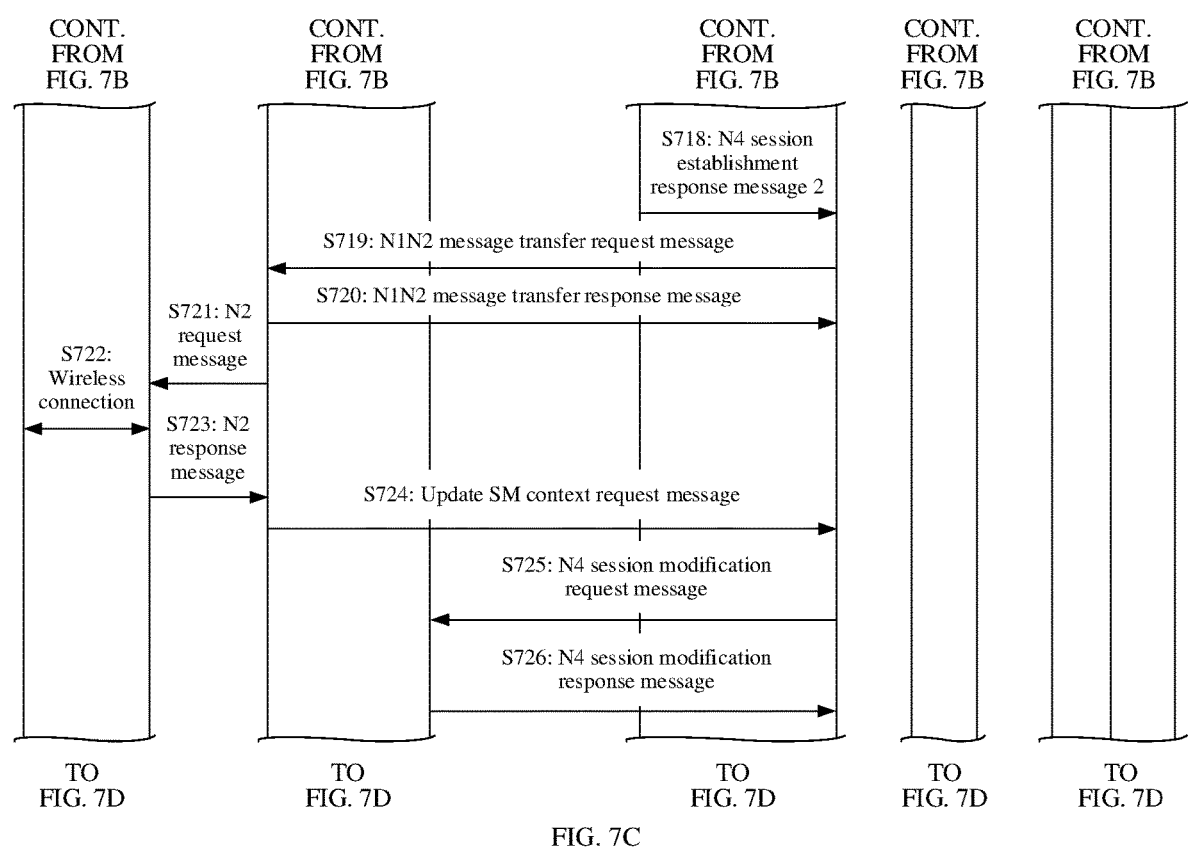
Figure 7D:
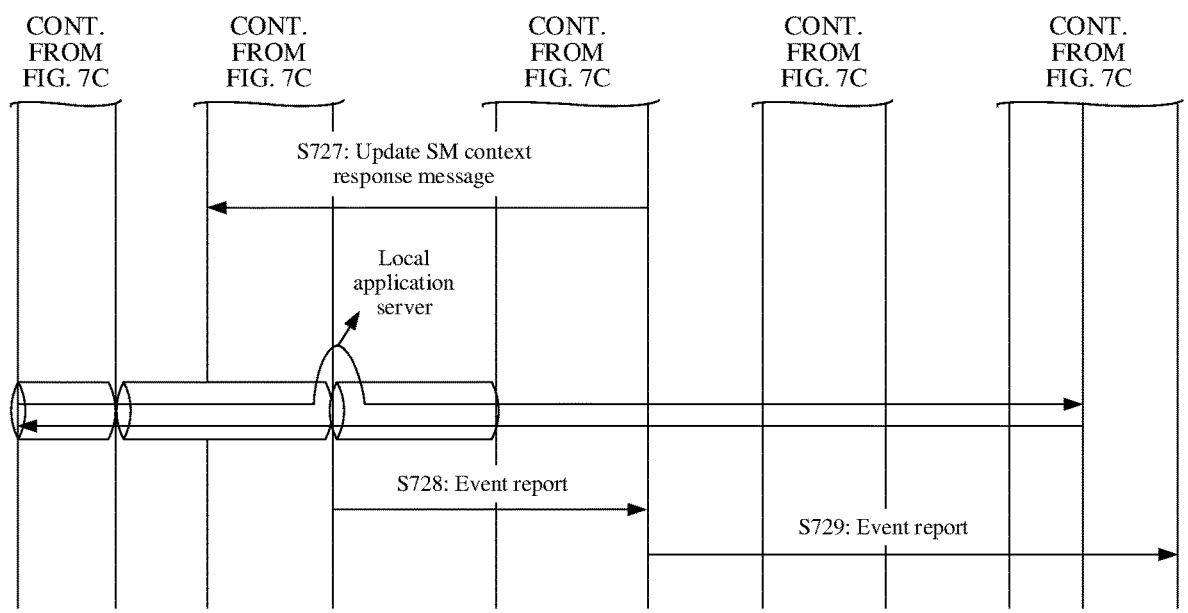
Figure 8A:
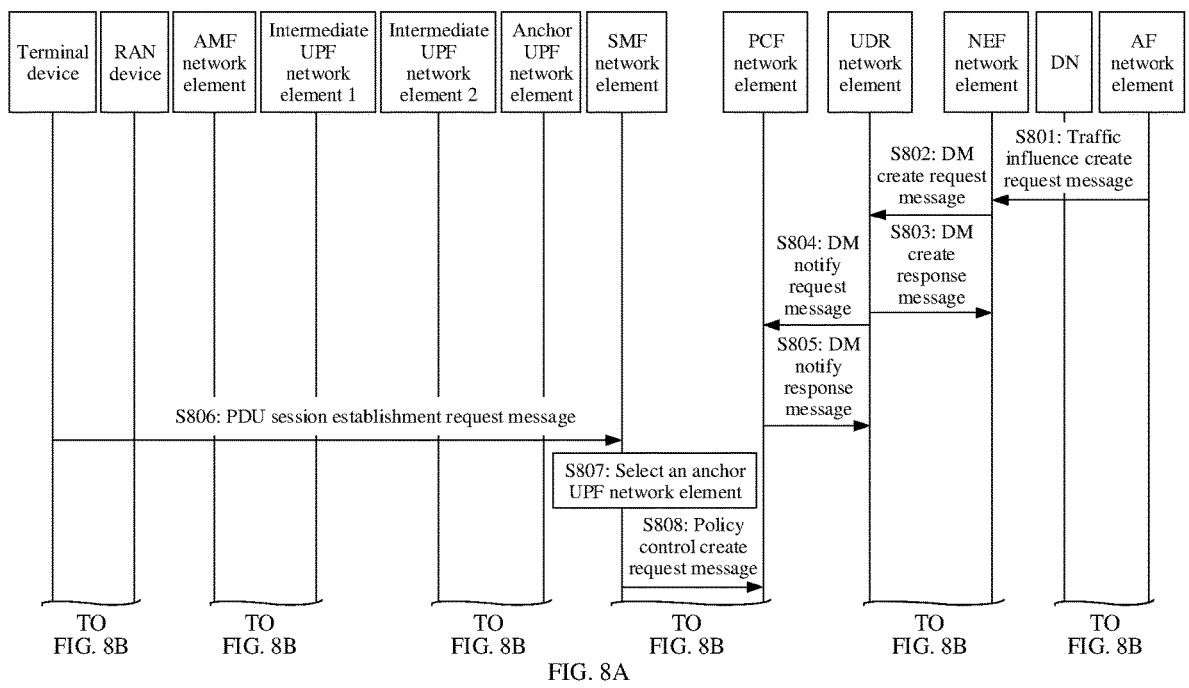
Figure 8C:
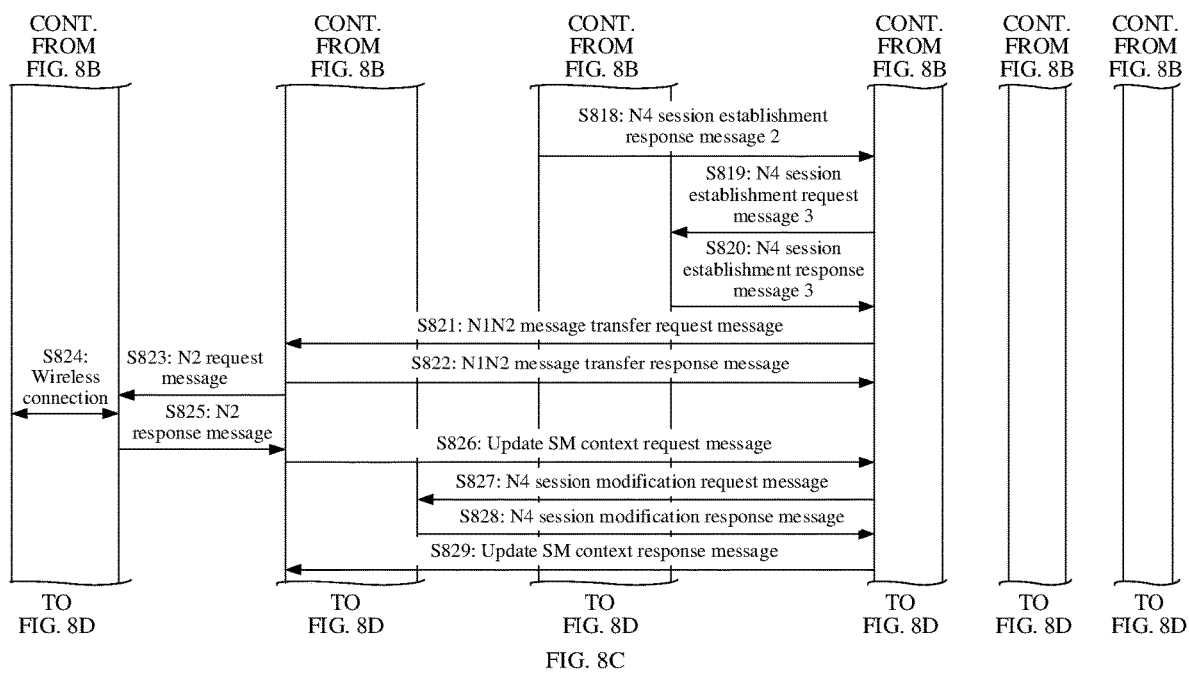
Figure 8D:
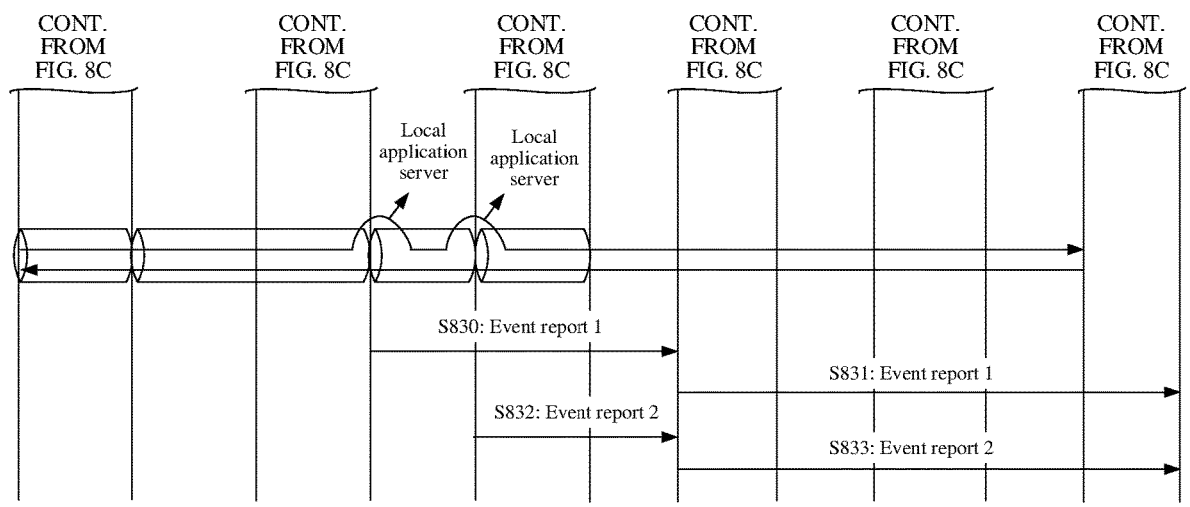

Alternatively, for example, the communication system shown in FIG. 2 is used in the 5G network shown in FIG. 3, and an SMF network element selects a plurality of intermediate UPF network elements. FIG. 6A to FIG. 6C show a policy control method according to an embodiment of this application. The method describes: In a process in which a terminal device accesses an application server for a first application in a DN, the application server requests to steer a service flow in an uplink direction to a plurality of local application servers for processing and then send a processed service flow to the application server for the first application in the DN. The method includes the following steps.

S601 to S607: Steps S601 to S607 are similar to steps S501 to S507 in the embodiment shown in FIG. 5A to FIG. 5C. For example, a difference is as follows: In this embodiment of this application, each piece of steering location information in the LAN traffic steering information 1 and the LAN traffic steering information 2 includes data description information of the first application, sequence indication information of a plurality of levels of local application servers for the first application, one or more pieces of application location information corresponding to a local application server at each level, and traffic steering policy information corresponding to each piece of application location information. Optionally, each piece of steering location information may further include one or more of a spatial validity condition, a temporal validity condition, a corresponding DNAI, direction information of a service flow of the first application, and notification information. For other related descriptions, refer to the descriptions in the embodiment shown in FIG. 5A to FIG. 5C. Details are not described herein again.

In this embodiment of this application, the sequence indication information of the plurality of levels of local application servers for the first application indicates a sequence of processing the service flow by the local application servers. When the service flow needs to be processed by only one local application server, this parameter may not be carried, as described in the embodiment shown in FIG. 5A to FIG. 5C.

It should be noted that, in this embodiment of this application, the sequence indication information of the plurality of levels of local application servers for the first application may also be understood as a processing sequence of performing a plurality of types of processing on the service flow of the first application. For example, the first application needs to undergo network address translation (NAT) processing, decryption processing, and compression processing, and a processing sequence of the three types of processing is decryption processing→compression processing→NAT processing. In this case, the sequence indication information of the plurality of levels of local application servers for the first application is used to indicate the sequence of the types of processing. Correspondingly, in this case, the plurality of levels of local application servers for the first application may be understood as local application servers corresponding to different types of processing. Alternatively, in this embodiment of this application, the sequence indication information of the plurality of levels of local application servers for the first application may be understood as a sequence of processing the service flow of the first application by an operator at different levels. For example, the first application needs to be processed by application servers in different areas at three levels: a provincial level, a municipal level, and a district level. In this case, the sequence indication information of the plurality of levels of local application servers for the first application is used to indicate a sequence of the processing at the levels. Correspondingly, the plurality of levels of local application servers for the first application may be understood as local application servers corresponding to different levels of areas. The sequence indication information of the plurality of levels of local application servers for the first application is not specifically limited in this embodiment of this application. Uniform descriptions are provided herein, and details are not described below again.

For example, in this embodiment of this application, content of each piece of steering location information in the LAN traffic steering information 1 may be shown in Table 14, and content of each piece of steering location information in the LAN traffic steering information 2 may be shown in Table 15.

TABLE 14

| | |
|---|---|
| Data description information | For example, 5-tuple of application data and application identifier of the first application (mandatory) |
| Spatial validity condition | Indicating a location of the terminal device to which the steering location information is applied (optional) |
| Temporal validity condition | Indicating time at which the steering location information is applied, where the time is usually a time interval (optional) |

Local application at each level includes the following information:

| | |
|---|---|
| Application location information | LANAI or LANAI list representing access to the target LAN in which the local application server for the first application is deployed, identifier of the target LAN in which the local application server for the first application is deployed, identifier of a user plane network element that supports access to the target LAN in which the local application server for the first application is deployed, or identifier of the local application server for the first application (mandatory) |
| Traffic steering policy information | Traffic steering policy corresponding to a LAN configured on an intermediate UPF (mandatory) |
| Sequence indication information | Indicating a sequence of processing the service flow by local application servers (mandatory) |
| DNAI | Indicating a DNAI supported by an anchor UPF to which the steering location information is applied (optional) |
| Direction information | Indicating a direction of the service flow to which the traffic steering policy information is applied, where the direction information herein indicates an uplink direction (optional) |
| Notification information | Indicating a notification message to be sent before or after LAN traffic steering is performed (optional) |

TABLE 15

| | |
|---|---|
| Data description information | For example, 5-tuple of application data and application identifier of the first application (mandatory) |

Local application at each level includes the following information:

| | |
|---|---|
| Application location information | LANAI or LANAI list representing access to the target LAN in which the local application server for the first application is deployed, identifier of the target LAN in which the local application server for the first application is deployed, identifier of a user plane network element that supports access to the target LAN in which the local application server for the first application is deployed, or identifier of the local application server for the first application (mandatory) |
| Traffic steering policy information | Traffic steering policy corresponding to a LAN configured on an intermediate UPF (mandatory) |
| Sequence indication information | Indicating a sequence of processing the service flow by local application servers (mandatory) |
| DNAI | Indicating a DNAI supported by an anchor UPF to which the steering location information is applied (optional) |

TABLE 15-continued

| | |
|---|---|
| Direction information | Indicating a direction of the service flow to which the traffic steering policy information is applied, where the direction information herein indicates an uplink direction (optional) |
| Notification information | Indicating a notification message to be sent before or after LAN traffic steering is performed (optional) |

S608: The SMF network element selects a plurality of intermediate UPF network elements based on the LAN traffic steering information 2.

In a possible implementation, the LAN traffic steering information 2 includes one piece of steering location information. In this case, correspondingly, that the SMF network element selects a plurality of intermediate UPF network elements based on the LAN traffic steering information 2 may specifically include the SMF network element selects an intermediate UPF network element at each level based on each level of first application location information, where each level of first application location information includes first application location information in one or more pieces of application location information corresponding to the local application server at each level. For example, assuming that the sequence indication information indicates that a data flow needs to be processed by two levels of local applications, the SMF network element may select an intermediate UPF network element 1 based on a first level of application location information, and select an intermediate UPF network element 2 based on a second level of application location information. For related descriptions of the first application location information, refer to the descriptions in the embodiment shown in FIG. 5A to FIG. 5C. Details are not described herein again.

Alternatively, in another possible implementation, the LAN traffic steering information 2 includes a plurality of pieces of steering location information. In this case, correspondingly, that the SMF network element selects a plurality of intermediate UPF network elements based on the LAN traffic steering information 2 may specifically include the SMF network element determines, based on a DNAI corresponding to each of the plurality of pieces of steering location information, first steering location information corresponding to a first DNAI, and the SMF network element selects an intermediate UPF network element at each level based on the sequence indication information and each level of first application location information that are in the first steering location information, where each level of first application location information includes first application location information in one or more pieces of application location information that are in the first steering location information and that correspond to the local application server at each level. For example, assuming that the sequence indication information indicates that a data flow needs to be processed by two levels of local applications, the SMF network element may select an intermediate UPF network element 1 based on a first level of application location information in the first steering location information, and select an intermediate UPF network element 2 based on a second level of application location information in the first steering location information. For related descriptions of the first application location information, refer to the descriptions in the embodiment shown in FIG. 5A to FIG. 5C. Details are not described herein again.

It should be noted that in this embodiment of this application, when selecting the intermediate UPF network element, the SMF network element needs to consider a current location of the terminal device and a location of the anchor UPF network element, to avoid route recurvation. Uniform descriptions are provided herein, and details are not described below again.

In addition, in this embodiment of this application, assuming that the plurality of intermediate UPF network elements include the intermediate UPF network element 1 and the intermediate UPF network element 2, core network tunnel information that is allocated by the SMF network element to the intermediate UPF network element 1 for receiving uplink data from a RAN device includes an IP address 5 and a TEID 5, N9 tunnel information that is allocated by the SMF network element to the intermediate UPF network element 1 for receiving downlink data from the intermediate UPF network element 2 includes an IP address 6 and a TEID 6, N9 tunnel information that is allocated by the SMF network element to the intermediate UPF network element 2 for receiving uplink data from the intermediate UPF network element 1 includes an IP address 7 and a TEID 7, and N9 tunnel information that is allocated by the SMF network element to the intermediate UPF network element 2 for receiving downlink data from an anchor UPF network element includes an IP address 8 and a TEID 8.

S609: The SMF network element determines, based on the LAN traffic steering information 2, policy rules corresponding to each intermediate UPF network element.

For related descriptions of the policy rules corresponding to each intermediate UPF network element, refer to the descriptions in the embodiment shown in FIG. 5A to FIG. 5C. Details are not described herein again.

Optionally, in this embodiment of this application, the SMF network element may determine an uplink data flow based on data description information or direction information in steering location information or first steering location information, that is, determine that uplink data processed by a local application server for the first application in a target LAN needs to be sent to a downstream network element of each intermediate UPF network element.

In a possible implementation, the LAN traffic steering information 2 includes one piece of steering location information. In this case, correspondingly, that the SMF network element determines, based on the LAN traffic steering information 2, policy rules corresponding to each intermediate UPF network element includes the SMF network element determines, based on the sequence indication information and traffic steering policy information corresponding to each level of first application location information, policy rules corresponding to the intermediate UPF network element at each level.

Alternatively, in another possible implementation, the LAN traffic steering information 2 includes a plurality of pieces of steering location information. In this case, correspondingly, that the SMF network element determines, based on the LAN traffic steering information 2, policy rules corresponding to each intermediate UPF network element includes the SMF network element determines, based on the sequence indication information and traffic steering policy information corresponding to each level of first application location information that are in the first steering location information, policy rules corresponding to the intermediate UPF network element at each level.

For example, it is assumed that the plurality of intermediate UPF network elements include the intermediate UPF network element 1 and the intermediate UPF network element 2, an upstream network element of the intermediate UPF network element 1 is the RAN device, a downstream network element of the intermediate UPF network element 1 is the intermediate UPF network element 2, an upstream network element of the intermediate UPF network element 2 is the intermediate UPF network element 1, and a downstream network element of the intermediate UPF network element 2 is the anchor UPF network element. In this case, policy rules corresponding to the intermediate UPF network element 1 may include a PDR 6, a FAR 6 associated with the PDR 6, a PDR 7, and a FAR 7 associated with the PDR 7, and policy rules corresponding to the intermediate UPF network element 2 may include a PDR 8, a FAR 8 associated with the PDR 8, a PDR 9, and a FAR 9 associated with the PDR 9. The PDR 6 and the FAR 6 associated with the PDR 6 are used to steer, to a local application server for the first application in a target LAN corresponding to the intermediate UPF network element 1, uplink data of the first application sent by the RAN device. The PDR 7 and the FAR 7 associated with the PDR 7 are used to send uplink data processed by the local application server for the first application in the target LAN corresponding to the intermediate UPF network element 1 to the intermediate UPF network element 2. The PDR 8 and the FAR 8 associated with the PDR 8 are used to steer, to a local application server for the first application in a target LAN corresponding to the intermediate UPF network element 2, uplink data of the first application sent by the intermediate UPF network element 1. The PDR 9 and the FAR 9 associated with the PDR 9 are used to send uplink data processed by the local application server for the first application in the target LAN corresponding to the intermediate UPF network element 2 to the anchor UPF network element. In addition, the policy rules corresponding to the intermediate UPF network element 1 may further include a PDR 10 and a FAR 10 associated with the PDR 10. The PDR 10 and the FAR 10 associated with the PDR 10 are used to receive the downlink data from the intermediate UPF network element 2 and send the downlink data to the RAN device. The policy rules corresponding to the intermediate UPF network element 2 may further include a PDR 11 and a FAR 11 associated with the PDR 11. The PDR 11 and the FAR 11 associated with the PDR 11 are used to receive downlink data from the anchor UPF network element and send the downlink data to the intermediate UPF network element 1. This is not specifically limited in this embodiment of this application. PDI including the PDR 6 is shown in Table 16. The FAR 6 associated with the PDR 6 is shown in Table 17. PDI including the PDR 7 is shown in Table 18. The FAR 7 associated with the PDR 7 is shown in Table 19. PDI including the PDR 8 is shown in Table 20. The FAR 8 associated with the PDR 8 is shown in Table 21. PDI including the PDR 9 is shown in Table 22. The FAR 9 associated with the PDR 9 is shown in Table 23. PDI including the PDR 10 is shown in Table 24. The FAR 10 associated with the PDR 10 is shown in Table 25. PDI including the PDR 11 is shown in Table 26. The FAR 11 associated with the PDR 11 is shown in Table 27.

TABLE 16

| Parameter | Value | Description |
| --- | --- | --- |
| Source interface | Access, indicating an uplink data direction | This parameter is mandatory. |
| Local F-TEID | Including an IP address 5 and a TEID 5 | This parameter is conditionally mandatory, and is not carried when a traffic endpoint ID is included. |

TABLE 16-continued

| Parameter | Value | Description |
| --- | --- | --- |
| IP address of the terminal device | addr | This parameter is conditionally mandatory, and is not carried when a traffic endpoint ID is included. |
| Traffic endpoint ID | Identifying a traffic endpoint, and including the IP address 5, the TEID 5, and the IP address addr allocated to the terminal device | This parameter is optional, and is carried when PDI optimization is supported. |
| SDF filter | IP packet filter generated when the terminal device accesses the first application | This parameter is determined based on data identification information |
| Application ID | Application identifier corresponding to the first application accessed by the terminal device | This parameter is determined based on data identification information |
| Ethernet packet filter | Ethernet packet filter generated when the terminal device accesses the first application | This parameter is determined based on data identification information |

TABLE 17

| Parameter | Value |
| --- | --- |
| Apply action | Forwarding a data packet |
| Forwarding parameters | A destination interface is a LAN or an intermediate LAN. A forwarding policy includes traffic steering policy information, for example, a traffic steering profile ID. The forwarding parameter indicates that the data packet is processed by using a local policy corresponding to the traffic steering profile ID and then sent to the destination interface. |

TABLE 18

| Parameter | Value | Description |
| --- | --- | --- |
| Source interface | LAN or intermediate LAN, indicating that data is from a LAN to which the intermediate UPF belongs | This parameter is mandatory. |
| IP address of the terminal device | addr | This parameter is conditionally mandatory, and is not carried when a traffic endpoint ID is included. |
| Traffic endpoint ID | Identifying a traffic endpoint, and including the IP address addr allocated to the terminal device | This parameter is optional, and is carried when PDI optimization is supported. |
| SDF filter | IP packet filter generated when the terminal device accesses the first application | This parameter is determined based on data identification information |
| Application ID | Application identifier corresponding to the first application accessed by the terminal device | This parameter is determined based on data identification information |
| Ethernet packet filter | Ethernet packet filter generated when the terminal device accesses the first application | This parameter is determined based on data identification information |

TABLE 19

| Parameter | Value |
| --- | --- |
| Apply action | Forwarding a data packet |
| Forwarding parameters | A destination interface is core, "outer header creation" includes an F-TEID, and the F-TEID includes an IP address 7 and a TEID 7. The forwarding parameter indicates that the data packet is encapsulated by using a GTP-U packet header and then sent to the intermediate UPF network element 2. |

TABLE 20

| Parameter | Value | Description |
| --- | --- | --- |
| Source interface | Access, indicating an uplink data direction | This parameter is mandatory. |
| Local F-TEID | Including an IP address 7 and a TEID 7 | This parameter is conditionally mandatory, and is not carried when a traffic endpoint ID is included. |
| IP address of the terminal device | addr | This parameter is conditionally mandatory, and is not carried when a traffic endpoint ID is included. |
| Traffic endpoint ID | Identifying a traffic endpoint, and including the IP address 7, the TEID 7, and the IP address addr allocated to the terminal device | This parameter is optional, and is carried when PDI optimization is supported. |
| SDF filter | IP packet filter generated when the terminal device accesses the first application | This parameter is determined based on data identification information |
| Application ID | Application identifier corresponding to the first application accessed by the terminal device | This parameter is determined based on data identification information |
| Ethernet packet filter | Ethernet packet filter generated when the terminal device accesses the first application | This parameter is determined based on data identification information |

TABLE 21

| Parameter | Value |
| --- | --- |
| Apply action | Forwarding a data packet |
| Forwarding parameters | A destination interface is a LAN or an intermediate LAN. A forwarding policy includes traffic steering policy information, for example, a traffic steering profile ID. The forwarding parameter indicates that the data packet is processed by using a local policy corresponding to the traffic steering profile ID and then sent to the destination interface. |

TABLE 22

| Parameter | Value | Description |
| --- | --- | --- |
| Source interface | LAN or intermediate LAN, indicating that data is from a LAN to which the intermediate UPF belongs | This parameter is mandatory. |
| IP address of the terminal device | addr | This parameter is conditionally mandatory, and is not carried when a traffic endpoint ID is included. |

TABLE 22-continued

| Parameter | Value | Description |
| --- | --- | --- |
| Traffic endpoint ID | Identifying a traffic endpoint, and including the IP address addr allocated to the terminal device | This parameter is optional, and is carried when PDI optimization is supported. |
| SDF filter | IP packet filter generated when the terminal device accesses the first application | This parameter is determined based on data identification information |
| Application ID | Application identifier corresponding to the first application accessed by the terminal device | This parameter is determined based on data identification information |
| Ethernet packet filter | Ethernet packet filter generated when the terminal device accesses the first application | This parameter is determined based on data identification information |

TABLE 23

| Parameter | Value |
| --- | --- |
| Apply action Forwarding parameters | Forwarding a data packet A destination interface is core, "outer header creation" includes an F-TEID, and the F-TEID includes an IP address 1 and a TEID 1. The forwarding parameter indicates that the data packet is encapsulated by using a GTP-U packet header and then sent to the anchor UPF network element. |

TABLE 24

| Parameter | Value | Description |
| --- | --- | --- |
| Source interface | Core, indicating a downlink data direction | This parameter is mandatory. |
| Local F-TEID | Including an IP address 6 and a TEID 6 | This parameter is conditionally mandatory, and is not carried when a traffic endpoint ID is included. |
| IP address of the terminal device | addr | This parameter is conditionally mandatory, and is not carried when a traffic endpoint ID is included. |
| Traffic endpoint ID | Identifying a traffic endpoint, and including the IP address 6, the TEID 6, and the IP address addr allocated to the terminal device | This parameter is optional, and is carried when PDI optimization is supported. |
| SDF filter | IP packet filter generated when the terminal device accesses the first application | This parameter is optional. |
| Application ID | Application identifier corresponding to the first application accessed by the terminal device | This parameter is optional. |
| Ethernet packet filter | Ethernet packet filter generated when the terminal device accesses the first application | This parameter is optional. |

TABLE 25

| Apply action Forwarding parameters | Forwarding a data packet A destination interface is access, "outer header creation" includes an F-TEID, and the F-TEID includes an IP address 2 and a TEID 2. The forwarding parameter indicates that the data packet is encapsulated by using a GTP-U and then sent to the RAN device. |
| --- | --- |

TABLE 26

| Parameter | Value | Description |
| --- | --- | --- |
| Source interface | Core, indicating a downlink data direction | This parameter is mandatory. |
| Local F-TEID | Including an IP address 8 and a TEID 8 | This parameter is conditionally mandatory, and is not carried when a traffic endpoint ID is included. |
| IP address of the terminal device | addr | This parameter is conditionally mandatory, and is not carried when a traffic endpoint ID is included. |
| Traffic endpoint ID | Identifying a traffic endpoint, and including the IP address 8, the TEID, and the IP address addr allocated to the terminal device | This parameter is optional, and is carried when PDI optimization is supported. |
| SDF filter | IP packet filter generated when the terminal device accesses the first application | This parameter is optional. |
| Application ID | Application identifier corresponding to the first application accessed by the terminal device | This parameter is optional. |
| Ethernet packet filter | Ethernet packet filter generated when the terminal device accesses the first application | This parameter is optional. |

TABLE 27

| Apply action Forwarding parameters | Forwarding a data packet A destination interface is access, "outer header creation" includes an F-TEID, and the F-TEID includes an IP address 6 and a TEID 6. The forwarding parameter indicates that the data packet is encapsulated by using a GTP-U and then sent to the intermediate UPF network element 1. |
| --- | --- |

Assuming that the plurality of intermediate UPF network elements in this embodiment of this application include the intermediate UPF network element 1 and the intermediate UPF network element 2, the policy control method provided in this embodiment of this application further includes the following steps.

S610: The SMF network element sends an N1N2 message transfer request message to an AMVF network element. Correspondingly, the AMVF network element receives the N1N2 message transfer request message from the SMF network element. The N1N2 message transfer request message includes the core network tunnel information that is used by the intermediate UPF network element 1 to receive the uplink data from the RAN device.

S611: The AMF network element sends an N2 request message to the RAN device. Correspondingly, the RAN device receives the N2 request message from the AMF network element. The N2 request message includes the core network tunnel information that is used by the intermediate UPF network element 1 to receive the uplink data from the RAN device.

S612: The RAN device sends an N2 response message to the AMF network element. Correspondingly, the AMF network element receives the N2 response message from the RAN device.

S613: The AMF network element sends an N1N2 message transfer response message to the SMF network element. Correspondingly, the SMF network element receives the N1N2 message transfer response message from the AMF network element.

S614: The SMF network element sends an N4 session establishment request message 1 to the intermediate UPF network element 1. Correspondingly, the intermediate UPF network element 1 receives the N4 session establishment request message 1 from the SMF network element. The N4 session establishment request message 1 includes the policy rules such as the PDR 6, the FAR 6 associated with the PDR 6, the PDR 7, the FAR 7 associated with the PDR 7, the PDR 10, and the FAR 10 associated with the PDR 10 corresponding to the intermediate UPF network element 1.

Optionally, in this embodiment of this application, the intermediate UPF network element 1 may determine a corresponding traffic steering policy based on the traffic steering policy information in the FAR 6, and then process the uplink data of the first application by using the traffic steering policy. This is not specifically limited in this embodiment of this application.

S615: The intermediate UPF network element 1 sends an N4 session establishment response message 1 to the SMF network element. Correspondingly, the SMF network element receives the N4 session establishment response message 1 from the intermediate UPF network element 1.

S616: The SMF network element sends an N4 session establishment request message 2 to the intermediate UPF network element 2. Correspondingly, the intermediate UPF network element 2 receives the N4 session establishment request message 2 from the SMF network element. The N4 session establishment request message 2 includes the policy rules such as the PDR 8, the FAR 8 associated with the PDR 8, the PDR 9, the FAR 9 associated with the PDR 9, the PDR 11, and the FAR 11 associated with the PDR 11 corresponding to the intermediate UPF network element 2.

Optionally, in this embodiment of this application, the intermediate UPF network element 2 may determine a corresponding traffic steering policy based on the traffic steering policy information in the FAR 8, and then process the uplink data of the first application by using the traffic steering policy. This is not specifically limited in this embodiment of this application.

S617: The intermediate UPF network element 2 sends an N4 session establishment response message 2 to the SMF network element. Correspondingly, the SMF network element receives the N4 session establishment response message 2 from the intermediate UPF network element.

It should be noted that, in this embodiment of this application, step S610, step S614, and step S616 are not performed in a necessary sequence. Any one of the steps may be performed first, and then remaining one or two steps are performed, any two of the steps may be performed first, and then remaining one step is performed, or the three steps may be simultaneously performed. This is not specifically limited in this embodiment of this application.

S618: The SMF network element sends an N4 session modification request message to the anchor UPF network element. Correspondingly, the anchor UPF network element receives the N4 session modification request message from the SMF network element. The N4 session modification request message includes an updated FAR 2.

For example, the updated FAR 2 may be shown in Table 28.

TABLE 28

| Apply action | Forwarding a data packet |
|---|---|
| Forwarding parameters | A destination interface is access, "outer header creation" includes an F-TEID, and the F-TEID includes an IP address 8 and a TEID 8. The forwarding parameter indicates that the data packet is encapsulated by using a GTP-U and then sent to the intermediate UPF network element 2. |

S619: The anchor UPF network element sends an N4 session modification response message to the SMF network element. Correspondingly, the SMF network element receives the N4 session modification response message from the anchor UPF network element.

S620: After steering the service flow to the target LAN, the intermediate UPF network element 1 sends an event report 1 to the SMF network element. The SMF network element receives the event report 1 from the intermediate UPF network element 1.

S621: The SMF network element sends the event report 1 to the AF network element. Correspondingly, the AF network element receives the event report 1 from the SMF network element. The event report 1 carries first application location information corresponding to the intermediate UPF network element 1. The event report 1 is used to notify the application server for the first application in the DN that data has been processed by a local application server corresponding to the intermediate UPF network element 1, and the application server for the first application in the DN may perform corresponding adjustment.

S622: After steering the service flow to the target LAN, the intermediate UPF network element 2 sends an event report 2 to the SMF network element. The SMF network element receives the event report 2 from the intermediate UPF network element 2.

S623: The SMF network element sends the event report 2 to the AF network element. Correspondingly, the AF network element receives the event report 2 from the SMF network element. The event report 1 carries first application location information corresponding to the intermediate UPF network element 2. The event report 1 is used to notify the application server for the first application in the DN that data has been processed by a local application server corresponding to the intermediate UPF network element 2, and the application server for the first application in the DN may perform corresponding adjustment.

Based on the policy control method provided in this embodiment of this application, a proper intermediate UPF network element can be selected, so that the intermediate UPF network element steers uplink data of the first application to a local application server for the first application in a target LAN, and sends uplink data processed by the local application server for the first application in the target LAN to a downstream network element of the intermediate UPF network element.

The actions of the SMF network element, the intermediate UPF network element 1, the intermediate UPF network element 2, the PCF network element, or the AF network element in steps S601 to S623 may be performed by the processor 401 in the communication device 400 in FIG. 4 by invoking the application program code stored in the memory 403. This is not limited in this embodiment of this application.

It may be understood that the communication system shown in FIG. 2 is also used in a 5G network shown in FIG. 15. In a process in which a terminal device accesses an application server for a first application located in a central DN, in a scenario in which the application server requests to steer a service flow in an uplink direction to a plurality of local application servers for processing and then send a processed service flow to the application server for the first application in the central DN, assuming that an SMF network element selects an intermediate UPF network element 1 and an intermediate UPF network element 2 in a plurality of intermediate UPF network elements, a policy control method provided in an embodiment of this application is similar to the method shown in FIG. 6A to FIG. 6C. For example, differences are as follows:

First, the intermediate UPF network element 1 and the intermediate UPF network element 2 that are selected by the SMF network element each have a traffic steering function. In addition, the SMF network element further selects anchor UPF network elements 2. In this scenario, the anchor UPF network elements 2 include an anchor UPF network element 21 communicating with the intermediate UPF network element 1 and an anchor UPF network element 22 communicating with the intermediate UPF network element 2. The anchor UPF network element 21 has a function of steering a data flow from the intermediate UPF network element 1 to a local LAN to which the anchor UPF network element 21 belongs. The anchor UPF network element 22 has a function of steering a data flow from the intermediate UPF network element 2 to a local LAN to which the anchor UPF network element 22 belongs.

Optionally, a manner for the SMF network element to select the anchor UPF network element 21 and the anchor UPF network element 22 is similar to a manner for the SMF network element to select the intermediate UPF network element 1 and the intermediate UPF network element 2 in the embodiment shown in FIG. 6A to FIG. 6C.

Second, the SMF network element determines policy rules corresponding to each intermediate UPF network element and policy rules corresponding to the anchor UPF network elements 2.

For example, based on the foregoing example, policy rules corresponding to the intermediate UPF network element 1 are used to send, to the anchor UPF network element 21, uplink data of the first application sent by an upstream network element of the intermediate UPF network element 1, and used to send uplink data that is from the anchor UPF network element 21 and that is processed by a local application server for the first application in a target LAN to a downstream network element of the intermediate UPF network element 1, for example, the intermediate UPF network element 2.

Policy rules corresponding to the anchor UPF network element 21 are used to steer uplink data from the intermediate UPF network element 1 to the local application server for the first application in the target LAN, and used to send uplink data processed by the local application server for the first application in the target LAN to the intermediate UPF network element 1.

Policy rules corresponding to the intermediate UPF network element 2 are used to send, to the anchor UPF network element 22, uplink data of the first application sent by an upstream network element of the intermediate UPF network element 2, and used to send uplink data that is from the anchor UPF network element 22 and that is processed by a local application server for the first application in a target LAN to a downstream network element of the intermediate UPF network element 2.

Policy rules corresponding to the anchor UPF network element 22 are used to steer uplink data from the intermediate UPF network element 2 to the local application server for the first application in the target LAN, and used to send uplink data processed by the local application server for the first application in the target LAN to the intermediate UPF network element 2.

Further, the SMF network element sends corresponding policy rules to each intermediate UPF network element in a plurality of intermediate user plane network elements. For example, the SMF network element sends the policy rules corresponding to the intermediate UPF network element 1 to the intermediate UPF network element 1, and sends the policy rules corresponding to the intermediate UPF network element 2 to the intermediate UPF network element 2. The SMF network element further sends policy rules corresponding to each of a plurality of anchor UPF network elements to each anchor UPF network element. For example, the SMF network element sends the policy rules corresponding to the anchor UPF network element 21 to the anchor UPF network element 21, and sends the policy rules corresponding to the anchor UPF network element 22 to the anchor UPF network element 22.

Based on the policy control method provided in this embodiment of this application, a proper intermediate UPF network element and an anchor UPF network element communicating with the intermediate UPF network element can be selected, so that the anchor UPF network element steers uplink data of the first application to a local application server for the first application in a target LAN, and sends uplink data processed by the local application server for the first application in the target LAN to the intermediate UPF network element, and the intermediate UPF network element sends the processed uplink data to a downstream network element of the intermediate UPF network element.

Alternatively, for example, the communication system shown in FIG. 2 is used in the 5G network shown in FIG. 3, and an SMF network element selects one intermediate UPF network element. FIG. 7A to FIG. 7D show a policy control method for a service flow in an uplink direction according to an embodiment of this application. The method describes an application server for a first application in a DN requests to steer, for a group of terminal devices or all terminal devices, a service flow accessed by each terminal device to one local application server for processing and then send a processed service flow to the application server for the first application in the DN. The method includes the following steps.

S701: An AF network element corresponding to the application server for the first application in the DN determines that the service flow for accessing the first application needs to be processed by local application servers. These local application servers are deployed in a MEC environment, and the MEC environment is deployed in a LAN to which some UPF network elements belong. Further, the AF network element sends a traffic influence create request message to an NEF network element. Correspondingly, the NEF network element receives the traffic influence create request message from the AF network element. The traffic influence create request message includes LAN traffic steering information 3.

For related descriptions of the LAN traffic steering information 3, refer to the descriptions of the LAN traffic steering information 1 in step S503 in the embodiment shown in FIG.

5A to FIG. 5C. For example, a difference is as follows: In this embodiment of this application, steering location information in the LAN traffic steering information 3 further includes information about target terminal devices. The information about the target terminal devices may include, for example, an external group identifier (external group ID) or an indication of any terminal device. This is not specifically limited herein. In addition, in this embodiment of this application, data description information of the first application may include, for example, a 3-tuple of application data and an application identifier of the first application. The 3-tuple of the application data includes an address and a port number of a server, and a transport layer protocol. For other related descriptions, refer to the descriptions in step S503 in the embodiment shown in FIG. 5A to FIG. 5C. Details are not described herein again.

S702: The NEF network element sends a data management (DM) create request message to a UDR network element. Correspondingly, the UDR network element receives the DM create request message from the NEF network element. The DM create request message includes LAN traffic steering information 4.

For related descriptions of the LAN traffic steering information 4, refer to the descriptions of the LAN traffic steering information 3. For example, a difference is as follows the NEF network element changes, through mapping, the external group identifier to an internal group identifier (internal group ID). For other related descriptions, refer to the descriptions of the LAN traffic steering information 3. Details are not described herein again.

S703: After storing the LAN traffic steering information 4, the UDR network element sends a DM create response message to the NEF network element. Correspondingly, the NEF network element receives the DM create response message from the UDR network element.

S704: The UDR network element sends a DM notify request message to all PCF network elements that have subscribed to a LAN traffic steering information change or all PCF network elements that have subscribed to a LAN traffic steering information change of an internal user group (in FIG. 7A to FIG. 7D, one PCF network element is used as an example for description). Correspondingly, the PCF network element receives the DM notify request message from the UDR network element. The DM notify request message includes the LAN traffic steering information 4.

S705: After storing the LAN traffic steering information 4, the PCF network element sends a DM notify response message to the UDR network element. Correspondingly, the UDR network element receives the DM notify response message from the PCF network element.

S706: Any terminal device in the target terminal devices sends a PDU session establishment request message to the SMF network element. Correspondingly, the SMF network element receives the PDU session establishment request message from the terminal device. The PDU session establishment request message is used to request to establish a PDU session.

S707: The SMF network element selects an anchor UPF network element for the PDU session, and allocates an IP address addr to the terminal device.

S708: The SMF network element sends a policy control create request message to the PCF network element. Correspondingly, the PCF network element receives the policy control create request message from the SMF network element. The policy control create request message carries an identifier of the terminal device, an address of the terminal device, an internal group identifier list corresponding to the terminal device, and the like.

S709: The PCF network element interacts with the UDR network element to obtain subscription information of the terminal device.

S710: If the PCF network element determines that the LAN traffic steering information 4 needs to be used for the PDU session, the PCF network element performs PCC rule authorization based on the LAN traffic steering information 4. When a spatial validity condition and/or a temporal validity condition are/is included, PCC rule authorization is performed only when the condition is met.

In this embodiment of this application, if the internal group identifier list corresponding to the terminal device includes the internal group identifier in the LAN traffic steering information 4, or if the LAN traffic steering information 4 is applicable to any terminal device, the PCF network element may determine that the LAN traffic steering information 4 needs to be used for the PDU session.

A PCC rule in this embodiment of this application includes LAN traffic steering information 5. The LAN traffic steering information 5 includes one or more pieces of steering location information. Content of each piece of steering location information is similar to content in Table 6 in the embodiment shown in FIG. 5A to FIG. 5C. For example, a difference is as follows: In this embodiment of this application, data description information of the first application may include, for example, a 3-tuple of application data and an application identifier of the first application. The 3-tuple of the application data includes an address and a port number of a server, and a transport layer protocol. For other related descriptions, refer to the descriptions in Table 6 in the embodiment shown in FIG. 5A to FIG. 5C. Details are not described herein again.

S711: The PCF network element sends a policy control create response message to the SMF network element. Correspondingly, the SMF network element receives the policy control create response message from the PCF network element. The policy control create response message includes a PCC rule, and the PCC rule includes the LAN traffic steering information 5.

S712: The SMF network element installs the PCC rule.

S713: The SMF network element selects one intermediate UPF network element based on the LAN traffic steering information 5.

A manner for the SMF network element to select one intermediate UPF network element based on the LAN traffic steering information 5 is the same as a manner for the SMF network element to select one intermediate UPF network element based on the LAN traffic steering information 2 in the embodiment shown in FIG. 5A to FIG. 5C. For related descriptions, refer to the descriptions in the embodiment shown in FIG. 5A to FIG. 5C. Details are not described herein again.

In addition, in this embodiment of this application, N9 tunnel information that is allocated by the SMF network element to the anchor UPF network element for receiving uplink data includes an IP address 1 and a TEID 1, core network tunnel information that is allocated by the SMF network element to the intermediate UPF network element for receiving uplink data from a RAN device includes an IP address 3 and a TEID 3, and N9 tunnel information that is allocated by the SMF network element to the intermediate UPF network element for receiving downlink data from the anchor UPF network element includes an IP address 4 and a TEID 4.

S714: The SMF network element determines, based on the LAN traffic steering information 5, policy rules corresponding to the intermediate UPF network element.

For related descriptions of the policy rules corresponding to each intermediate UPF network element, refer to the descriptions in the embodiment shown in FIG. 5A to FIG. 5C. Details are not described herein again.

Optionally, in this embodiment of this application, the policy rules corresponding to the intermediate UPF network element include a first PDR and a first FAR associated with the first PDR, a second PDR, and a second FAR associated with the second PDR. For related descriptions, refer to the descriptions in step S509 in the embodiment shown in FIG. 5A to FIG. 5C. Details are not described herein again.

For example, it is assumed that the first PDR may be denoted as a PDR 3, the first FAR may be denoted as a FAR 3, the second PDR may be denoted as a PDR 4, the second FAR may be denoted as a FAR 4, the upstream network element of the intermediate UPF network element is the RAN device, and the downstream network element of the intermediate UPF network element is the anchor UPF network element. The PDR 3 and the FAR 3 associated with the PDR 3 are used to receive the uplink data from the RAN device, and steer the uplink data to the local application server for the first application in the target LAN. The PDR 4 and the FAR 4 associated with the PDR 4 are used to receive the uplink data processed by the local application server for the first application in the target LAN, and send the uplink data to the anchor UPF network element. PDI including the PDR 3 is shown in Table 7. The FAR 3 associated with the PDR 3 is shown in Table 8. PDI including the PDR 4 is shown in Table 9. The FAR 4 associated with the PDR 4 is shown in Table 10. Details are not described herein again.

In addition, in this embodiment of this application, the SMF network element may determine, based on the LAN traffic steering information 5, policy rules such as a PDR 1, a FAR 1 associated with the PDR 1, a PDR 2, and a FAR 2 associated with the PDR 2 corresponding to the anchor UPF network element. The PDR 1 and the FAR 1 associated with the PDR 1 are used to receive uplink data from the intermediate UPF network element, and send the uplink data to the DN. The PDR 2 and the FAR 2 associated with the PDR 2 are used to receive downlink data from the DN, and send the downlink data to the intermediate UPF network element. PDI including the PDR 1 is shown in Table 1. The FAR 1 associated with the PDR 1 is shown in Table 2. PDI including the PDR 2 is shown in Table 3. The FAR 2 associated with the PDR 2 is shown in Table 13. Details are not described herein again.

S715: The SMF network element sends an N4 session establishment request message 1 to the intermediate UPF network element. Correspondingly, the intermediate UPF network element receives the N4 session establishment request message 1 from the SMF network element. The N4 session establishment request message 1 includes the policy rules such as the PDR 3, the FAR 3 associated with the PDR 3, the PDR 4, and the FAR 4 associated with the PDR 4 corresponding to the intermediate UPF network element.

Optionally, in this embodiment of this application, the intermediate UPF network element may determine a corresponding traffic steering policy based on the traffic steering policy information in the FAR 3, and then process uplink data of the first application by using the traffic steering policy. This is not specifically limited in this embodiment of this application.

S716: The intermediate UPF network element sends an N4 session establishment response message 1 to the SMF network element. Correspondingly, the SMF network element receives the N4 session establishment response message 1 from the intermediate UPF network element.

S717: The SMF network element sends an N4 session establishment request message 2 to the anchor UPF network element. Correspondingly, the anchor UPF network element receives the N4 session establishment request message 2 from the SMF network element. The N4 session establishment request message 2 includes the policy rules such as the PDR 1, the FAR 1 associated with the PDR 1, the PDR 2, and the FAR 2 associated with the PDR 2 corresponding to the anchor UPF network element.

S718: The anchor UPF network element sends an N4 session establishment response message 2 to the SMF network element. Correspondingly, the SMF network element receives the N4 session establishment response message 2 from the anchor UPF network element.

S719: The SMF network element sends an N1N2 message transfer request message to an AMF network element. Correspondingly, the AMF network element receives the N1N2 message transfer request message from the SMF network element. The N1N2 message transfer request message includes the core network tunnel information that is used by the intermediate UPF network element to receive the uplink data from the RAN device.

S720: The AMF network element sends an N1N2 message transfer response message to the SMF network element. Correspondingly, the SMF network element receives the N1N2 message transfer response message from the AMF network element.

S721: The AMF network element sends an N2 request message to the RAN device. Correspondingly, the RAN device receives the N2 request message from the AMF network element. The N2 request message includes the core network tunnel information that is used by the intermediate UPF network element to receive the uplink data from the RAN device.

S722: The RAN device interacts with the terminal device to establish a wireless connection.

S723: The RAN device sends an N2 response message to the AMF network element. Correspondingly, the AMF network element receives the N2 response message from the RAN device. The N2 response message includes RAN tunnel information allocated by the RAN device, and the RAN tunnel information includes an IP address 2 and a TEID 2 that are used by the RAN device to receive downlink data.

S724: The AMF network element sends an update SM context request message to the SMF network element. Correspondingly, the SMF network element receives the update SM context request message from the AMF network element. The update SM context request message includes the RAN tunnel information.

S725: The SMF network element sends an N4 session modification request message to the intermediate UPF network element. Correspondingly, the intermediate UPF network element receives the N4 session modification request message from the SMF network element. The N4 session modification request message includes a PDR 5 and a FAR 5 associated with the PDR 5. The PDR 5 and the FAR 5 associated with the PDR 5 are used to receive the downlink data from the anchor UPF network element, and send the downlink data to the RAN device. PDI including the PDR 5 is shown in Table 11. The FAR 5 associated with the PDR 5 is shown in Table 12. Details are not described herein again.

S726: After storing the PDR 5 and the FAR 5 associated with the PDR 5, the intermediate UPF network element sends an N4 session modification response message to the SMF network element. Correspondingly, the SMF network element receives the N4 session modification response message from the intermediate UPF network element.

S727: The SMF network element sends an update SM context response message to the AMF network element. Correspondingly, the AMF network element receives the update SM context response message from the SMF network element.

S728 and S729: Steps S728 and S729 are the same as steps S518 and S519 in the embodiment shown in FIG. 5A to FIG. 5C. For related descriptions, refer to the descriptions in the embodiment shown in FIG. 5A to FIG. 5C. Details are not described herein again.

Based on the policy control method provided in this embodiment of this application, a proper intermediate UPF network element can be selected, so that the intermediate UPF network element steers uplink data of the first application to a local application server for the first application in a target LAN, and sends uplink data processed by the local application server for the first application in the target LAN to a downstream network element of the intermediate UPF network element.

The actions of the SMF network element, the intermediate UPF network element, the PCF network element, or the AF network element in steps S701 to S729 may be performed by the processor 401 in the communication device 400 in FIG. 4 by invoking the application program code stored in the memory 403. This is not limited in this embodiment of this application.

It may be understood that the communication system shown in FIG. 2 is also used in a 5G network shown in FIG. 15. In a scenario in which an application server for a first application in a central DN requests to steer, for a group of terminal devices or all terminal devices, a service flow accessed by each terminal device to one local application server for processing and then send a processed service flow to the application server for the first application in the central DN, assuming that an SMF network element selects one intermediate UPF network element, a policy control method provided in an embodiment of this application is similar to the method shown in FIG. 7A to FIG. 7D. For example, differences are as follows:

First, the intermediate UPF network element selected by the SMF network element has a traffic steering function. In addition, the SMF network element further selects a new anchor UPF network element (referred to as an anchor UPF network element 2 below), and the anchor UPF network element 2 has a function of steering a data flow from the intermediate UPF network element to a local LAN.

Optionally, a manner for the SMF network element to select the anchor UPF network element 2 is similar to a manner for the SMF network element to select the intermediate UPF network element in the embodiment shown in FIG. 7A to FIG. 7D.

Second, the SMF network element determines policy rules corresponding to the intermediate UPF network element and policy rules corresponding to the anchor UPF network element 2.

The policy rules corresponding to the intermediate UPF network element are used to send, to the anchor UPF network element 2, uplink data of the first application sent by an upstream network element of the intermediate UPF network element, and used to send uplink data that is from the anchor UPF network element 2 and that is processed by a local application server for the first application in a target LAN to a downstream network element of the intermediate UPF network element.

The policy rules corresponding to the anchor UPF network element 2 are used to steer uplink data from the intermediate UPF network element to the local application server for the first application in the target LAN, and used to send uplink data processed by the local application server for the first application in the target LAN to the intermediate UPF network element.

Further, the SMF network element sends the policy rules corresponding to the intermediate UPF network element to the intermediate UPF network element, and sends the policy rules corresponding to the anchor UPF network element 2 to the anchor UPF network element 2.

Based on the policy control method provided in this embodiment of this application, a proper intermediate UPF network element and an anchor UPF network element communicating with the intermediate UPF network element can be selected, so that the anchor UPF network element steers uplink data of the first application to a local application server for the first application in a target LAN, and sends uplink data processed by the local application server for the first application in the target LAN to the intermediate UPF network element, and the intermediate UPF network element sends the processed uplink data to a downstream network element of the intermediate UPF network element.

Alternatively, for example, the communication system shown in FIG. 2 is used in the 5G network shown in FIG. 3, and an SMF network element selects a plurality of intermediate UPF network elements. FIG. 8A to FIG. 8D show a policy control method for a service flow in an uplink direction according to an embodiment of this application. The method describes an application server for a first application in a DN requests to steer, for a group of terminal devices or all terminal devices, a service flow accessed by each terminal device to a plurality of local application servers for processing and then send a processed service flow to the application server for the first application in the DN. The method includes the following steps.

S801 to S812: Steps S801 to S812 are similar to steps S701 to S712 in the embodiment shown in FIG. 7A to FIG. 7D. For example, a difference is as follows: Each piece of steering location information in the LAN traffic steering information 3, the LAN traffic steering information 4, and the LAN traffic steering information 5 in this embodiment of this application includes information about target terminal devices, data description information of the first application, sequence indication information of a plurality of levels of local application servers for the first application, one or more pieces of application location information corresponding to a local application server at each level, and traffic steering policy information corresponding to each piece of application location information. Optionally, each piece of steering location information may further include one or more of a spatial validity condition, a temporal validity condition, a corresponding DNAI, direction information of a service flow of the first application, and notification information. For related descriptions of the sequence indication information of the plurality of levels of local application servers for the first application, refer to the descriptions in the embodiment shown in FIG. 6A to FIG. 6C. Content of each piece of steering location information in the LAN traffic steering information 4 is similar to content of each piece of steering location information in the LAN traffic steering information 1 shown in Table 14. For example, differences are as follows the steering location information in this embodiment of this application includes the information about the target terminal devices in the embodiment shown in FIG. 7A to FIG. 7D, and the data description information in the steering location information in this embodiment of this application is the same as the data description information in the embodiment shown in FIG. 7A to FIG. 7D. Content of each piece of steering location information in the LAN traffic steering information 5 is similar to content of each piece of steering location information in the LAN traffic steering information 2 shown in Table 15. For example, a difference is as follows the data description information in the steering location information in this embodiment of this application is the same as the data description information in the embodiment shown in FIG. 7A to FIG. 7D. For other related descriptions, refer to the descriptions in the embodiment shown in FIG. 7A to FIG. 7D. Details are not described herein again.

S813: The SMF network element selects a plurality of intermediate UPF network elements based on the LAN traffic steering information 5.

A manner for the SMF network element to select the plurality of intermediate UPF network elements based on the LAN traffic steering information 5 is the same as a manner for the SMF network element to select the plurality of intermediate UPF network elements based on the LAN traffic steering information 2 in the embodiment shown in FIG. 6A to FIG. 6C. For related descriptions, refer to the descriptions in the embodiment shown in FIG. 6A to FIG. 6C. Details are not described herein again.

In addition, in this embodiment of this application, assuming that the plurality of intermediate UPF network elements include an intermediate UPF network element 1 and an intermediate UPF network element 2, core network tunnel information that is allocated by the SMF network element to the intermediate UPF network element 1 for receiving uplink data from a RAN device includes an IP address 5 and a TEID 5, N9 tunnel information that is allocated by the SMF network element to the intermediate UPF network element 1 for receiving downlink data from the intermediate UPF network element 2 includes an IP address 6 and a TEID 6, N9 tunnel information that is allocated by the SMF network element to the intermediate UPF network element 2 for receiving uplink data from the intermediate UPF network element 1 includes an IP address 7 and a TEID 7, N9 tunnel information that is allocated by the SMF network element to the intermediate UPF network element 2 for receiving downlink data from an anchor UPF network element includes an IP address 8 and a TEID 8, and N9 tunnel information that is allocated by the SMF network element to the anchor UPF network element for receiving uplink data includes an IP address 1 and a TEID 1.

S814: The SMF network element determines, based on the LAN traffic steering information 5, policy rules corresponding to each intermediate UPF network element.

For related descriptions of the policy rules corresponding to each intermediate UPF network element, refer to the descriptions in the embodiment shown in FIG. 5A to FIG. 5C. Details are not described herein again. For a manner for the SMF network element to determine, based on the LAN traffic steering information 5, the policy rules corresponding to each intermediate UPF network element, refer to a manner for the SMF network element to determine, based on the LAN traffic steering information 2, the policy rules corresponding to each intermediate UPF network element in the embodiment shown in FIG. 6A to FIG. 6C. Details are not described herein again.

For example, it is assumed that the plurality of intermediate UPF network elements include the intermediate UPF network element 1 and the intermediate UPF network element 2, an upstream network element of the intermediate UPF network element 1 is the RAN device, a downstream network element of the intermediate UPF network element 1 is the intermediate UPF network element 2, an upstream network element of the intermediate UPF network element 2 is the intermediate UPF network element 1, and a downstream network element of the intermediate UPF network element 2 is the anchor UPF network element. In this case, policy rules corresponding to the intermediate UPF network element 1 may include a PDR 6, a FAR 6 associated with the PDR 6, a PDR 7, and a FAR 7 associated with the PDR 7, and policy rules corresponding to the intermediate UPF network element 2 may include a PDR 8, a FAR 8 associated with the PDR 8, a PDR 9, and a FAR 9 associated with the PDR 9. The PDR 6 and the FAR 6 associated with the PDR 6 are used to steer, to a local application server for the first application in a target LAN corresponding to the intermediate UPF network element 1, uplink data of the first application sent by the RAN device. The PDR 7 and the FAR 7 associated with the PDR 7 are used to send uplink data processed by the local application server for the first application in the target LAN corresponding to the intermediate UPF network element 1 to the intermediate UPF network element 2. The PDR 8 and the FAR 8 associated with the PDR 8 are used to steer, to a local application server for the first application in a target LAN corresponding to the intermediate UPF network element 2, uplink data of the first application sent by the intermediate UPF network element 1. The PDR 9 and the FAR 9 associated with the PDR 9 are used to send uplink data processed by the local application server for the first application in the target LAN corresponding to the intermediate UPF network element 2 to the intermediate anchor UPF network element. In addition, the policy rules corresponding to the intermediate UPF network element 2 may further include a PDR 11 and a FAR 11 associated with the PDR 11. The PDR 11 and the FAR 11 associated with the PDR 11 are used to receive downlink data from the anchor UPF network element, and send the downlink data to the UPF network element 1. This is not specifically limited in this embodiment of this application. PDI including the PDR 6 is shown in Table 16. The FAR 6 associated with the PDR 6 is shown in Table 17. PDI including the PDR 7 is shown in Table 18. The FAR 7 associated with the PDR 7 is shown in Table 19. PDI including the PDR 8 is shown in Table 20. The FAR 8 associated with the PDR 8 is shown in Table 21. PDI including the PDR 9 is shown in Table 22. The FAR 9 associated with the PDR 9 is shown in Table 23. PDI including the PDR 11 is shown in Table 26. The FAR 11 associated with the PDR 11 is shown in Table 27.

In addition, in this embodiment of this application, the SMF network element may determine, based on the LAN traffic steering information 5, policy rules such as a PDR 1, a FAR 1 associated with the PDR 1, a PDR 2, and a FAR 2 associated with the PDR 2 corresponding to the anchor UPF network element. The PDR 1 and the FAR 1 associated with the PDR 1 are used to receive uplink data from the intermediate UPF network element 2, and send the uplink data to the DN. The PDR 2 and the FAR 2 associated with the PDR 2 are used to receive downlink data from the DN, and send the downlink data to the intermediate UPF network element 2. PDI including the PDR 1 is shown in Table 1. The FAR 1 associated with the PDR 1 is shown in Table 2. PDI including the PDR 2 is shown in Table 3. The FAR 2 associated with the PDR 2 is shown in Table 28. Details are not described herein again.

Assuming that the plurality of intermediate UPF network elements in this embodiment of this application include the intermediate UPF network element 1 and the intermediate UPF network element 2, the policy control method provided in this embodiment of this application further includes the following steps.

S815: The SMF network element sends an N4 session establishment request message 1 to the intermediate UPF network element 1. Correspondingly, the intermediate UPF network element 1 receives the N4 session establishment request message 1 from the SMF network element. The N4 session establishment request message 1 includes the policy rules such as the PDR 6, the FAR 6 associated with the PDR 6, the PDR 7, and the FAR 7 associated with the PDR 7 corresponding to the intermediate UPF network element 1.

Optionally, in this embodiment of this application, the intermediate UPF network element 1 may determine a corresponding traffic steering policy based on the traffic steering policy information in the FAR 6, and then process the uplink data of the first application by using the traffic steering policy. This is not specifically limited in this embodiment of this application.

S816: The intermediate UPF network element sends an N4 session establishment response message 1 to the SMF network element. Correspondingly, the SMF network element receives the N4 session establishment response message 1 from the intermediate UPF network element.

S817: The SMF network element sends an N4 session establishment request message 2 to the intermediate UPF network element 2. Correspondingly, the intermediate UPF network element 2 receives the N4 session establishment request message 2 from the SMF network element. The N4 session establishment request message 2 includes the policy rules such as the PDR 8, the FAR 8 associated with the PDR 8, the PDR 9, the FAR 9 associated with the PDR 9, the PDR 11, and the FAR 11 associated with the PDR 11 corresponding to the intermediate UPF network element 2.

Optionally, in this embodiment of this application, the intermediate UPF network element 2 may determine a corresponding traffic steering policy based on the traffic steering policy information in the FAR 8, and then process the uplink data of the first application by using the traffic steering policy. This is not specifically limited in this embodiment of this application.

S818: The intermediate UPF network element 2 sends an N4 session establishment response message 2 to the SMF network element. Correspondingly, the SMF network element receives the N4 session establishment response message 2 from the intermediate UPF network element.

S819: The SMF network element sends an N4 session establishment request message 3 to the anchor UPF network element. Correspondingly, the anchor UPF network element receives the N4 session establishment request message 3 from the SMF network element. The N4 session establishment request message 3 includes the policy rules such as the PDR 1, the FAR 1 associated with the PDR 1, the PDR 2, and the FAR 2 associated with the PDR 2 corresponding to the anchor UPF network element.

S820: The anchor UPF network element sends an N4 session establishment response message 3 to the SMF network element. Correspondingly, the SMF network element receives the N4 session establishment response message 3 from the anchor UPF network element.

S821: The SMF network element sends an N1N2 message transfer request message to an AMF network element. Correspondingly, the AMF network element receives the N1N2 message transfer request message from the SMF network element. The N1N2 message transfer request message includes the core network tunnel information that is used by the intermediate UPF network element 1 to receive the uplink data from the RAN device.

S822: The AMF network element sends an N1N2 message transfer response message to the SMF network element. Correspondingly, the SMF network element receives the N1N2 message transfer response message from the AMF network element.

S823: The AMF network element sends an N2 request message to the RAN device. Correspondingly, the RAN device receives the N2 request message from the AMF network element. The N2 request message includes the core network tunnel information that is used by the intermediate UPF network element 1 to receive the uplink data from the RAN device.

S824 to S826: Steps S824 to S826 are the same as steps S722 to S724 in the embodiment shown in FIG. 7A to FIG. 7D. For related descriptions, refer to the descriptions in the embodiment shown in FIG. 7A to FIG. 7D. Details are not described herein again.

S827: The SMF network element sends an N4 session modification request message to the intermediate UPF network element 1. Correspondingly, the intermediate UPF network element 1 receives the N4 session modification request message from the SMF network element. The N4 session modification request message includes a PDR 10 and a FAR 10 associated with the PDR 10. The PDR 10 and the FAR 10 associated with the PDR 10 are used to receive the downlink data from the intermediate UPF network element 2 and send the downlink data to the RAN device. PDI including the PDR 10 is shown in Table 24. The FAR 10 associated with the PDR 10 is shown in Table 25. Details are not described herein again.

S828: After storing the PDR 10 and the FAR 10 associated with the PDR 10, the intermediate UPF network element 1 sends an N4 session modification response message to the SMF network element. Correspondingly, the SMF network element receives the N4 session modification response message from the intermediate UPF network element.

S829: The SMF network element sends an update SM context response (update SM context response) message to the AMF network element. Correspondingly, the AMF network element receives the update SM context response message from the SMF network element.

S830 to S833: Steps S830 to S833 are the same as steps S620 to S623 in the embodiment shown in FIG. 6A to FIG. 6C. For related descriptions, refer to the descriptions in the embodiment shown in FIG. 6A to FIG. 6C. Details are not described herein again.

Based on the policy control method provided in this embodiment of this application, a proper intermediate UPF network element can be selected, so that the intermediate UPF network element steers uplink data of the first application to a local application server for the first application in a target LAN, and sends uplink data processed by the local application server for the first application in the target LAN to a downstream network element of the intermediate UPF network element.

The actions of the SMF network element, the intermediate UPF network element 1, the intermediate UPF network element 2, the PCF network element, or the AF network element in steps S801 to S833 may be performed by the processor 401 in the communication device 400 in FIG. 4 by invoking the application program code stored in the memory 403. This is not limited in this embodiment of this application.

It may be understood that the communication system shown in FIG. 2 is also used in a 5G network shown in FIG. 15. In a scenario in which an application server for a first application in a central DN requests to steer, for a group of terminal devices or all terminal devices, a service flow accessed by each terminal device to a plurality of local application servers for processing and then send a processed service flow to the application server for the first application in the central DN, assuming that an SMF network element selects a plurality of intermediate UPF network elements that include an intermediate UPF network element 1 and an intermediate UPF network element 2, a policy control method provided in an embodiment of this application is similar to the method shown in FIG. 8A to FIG. 8D. For example, differences are as follows:

First, the intermediate UPF network element 1 and the intermediate UPF network element 2 that are selected by the SMF network element each have a traffic steering function. In addition, the SMF network element further selects anchor UPF network elements 2. In this scenario, the anchor UPF network elements 2 include an anchor UPF network element 21 communicating with the intermediate UPF network element 1 and an anchor UPF network element 22 communicating with the intermediate UPF network element 2. The anchor UPF network element 21 has a function of steering a data flow from the intermediate UPF network element 1 to a local LAN to which the anchor UPF network element 21 belongs. The anchor UPF network element 22 has a function of steering a data flow from the intermediate UPF network element 2 to a local LAN to which the anchor UPF network element 22 belongs.

Optionally, a manner for the SMF network element to select the anchor UPF network element 21 and the anchor UPF network element 22 is similar to a manner for the SMF network element to select the intermediate UPF network element 1 and the intermediate UPF network element 2 in the embodiment shown in FIG. 8A to FIG. 8D.

Second, the SMF network element determines policy rules corresponding to each intermediate UPF network element and policy rules corresponding to the anchor UPF network elements 2.

For example, based on the foregoing example, policy rules corresponding to the intermediate UPF network element 1 are used to send, to the anchor UPF network element 21, uplink data of the first application sent by an upstream network element of the intermediate UPF network element 1, and used to send uplink data that is from the anchor UPF network element 21 and that is processed by a local application server for the first application in a target LAN to a downstream network element of the intermediate UPF network element 1, for example, the intermediate UPF network element 2.

Policy rules corresponding to the anchor UPF network element 21 are used to steer uplink data from the intermediate UPF network element 1 to the local application server for the first application in the target LAN, and used to send uplink data processed by the local application server for the first application in the target LAN to the intermediate UPF network element 1.

Policy rules corresponding to the intermediate UPF network element 2 are used to send, to the anchor UPF network element 22, uplink data of the first application sent by an upstream network element of the intermediate UPF network element 2, and used to send uplink data that is from the anchor UPF network element 22 and that is processed by a local application server for the first application in a target LAN to a downstream network element of the intermediate UPF network element 2.

Policy rules corresponding to the anchor UPF network element 22 are used to steer uplink data from the intermediate UPF network element 2 to the local application server for the first application in the target LAN, and used to send uplink data processed by the local application server for the first application in the target LAN to the intermediate UPF network element 2.

Further, the SMF network element sends corresponding policy rules to each intermediate UPF network element in a plurality of intermediate user plane network elements. For example, the SMF network element sends the policy rules corresponding to the intermediate UPF network element 1 to the intermediate UPF network element 1, and sends the policy rules corresponding to the intermediate UPF network element 2 to the intermediate UPF network element 2. The SMF network element further sends policy rules corresponding to each of a plurality of anchor UPF network elements to each anchor UPF network element. For example, the SMF network element sends the policy rules corresponding to the anchor UPF network element 21 to the anchor UPF network element 21, and sends the policy rules corresponding to the anchor UPF network element 22 to the anchor UPF network element 22.

Based on the policy control method provided in this embodiment of this application, a proper intermediate UPF network element and an anchor UPF network element communicating with the intermediate UPF network element can be selected, so that the anchor UPF network element steers uplink data of the first application to a local application server for the first application in a target LAN, and sends uplink data processed by the local application server for the first application in the target LAN to the intermediate UPF network element, and the intermediate UPF network element sends the processed uplink data to a downstream network element of the intermediate UPF network element.

Figure 9A:
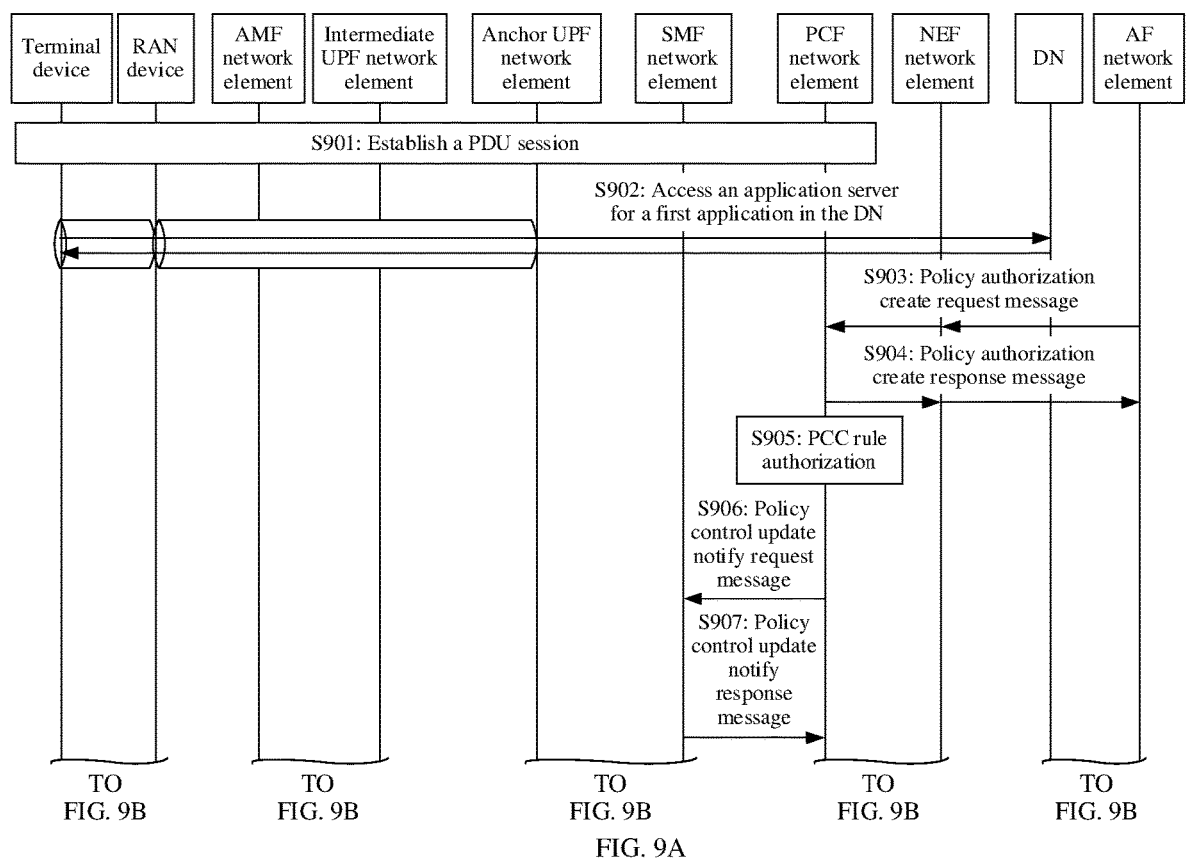
FIG. 9A to FIG. 9C are a schematic flowchart 5 of a policy control method according to an embodiment of this application.
Figure 9B:
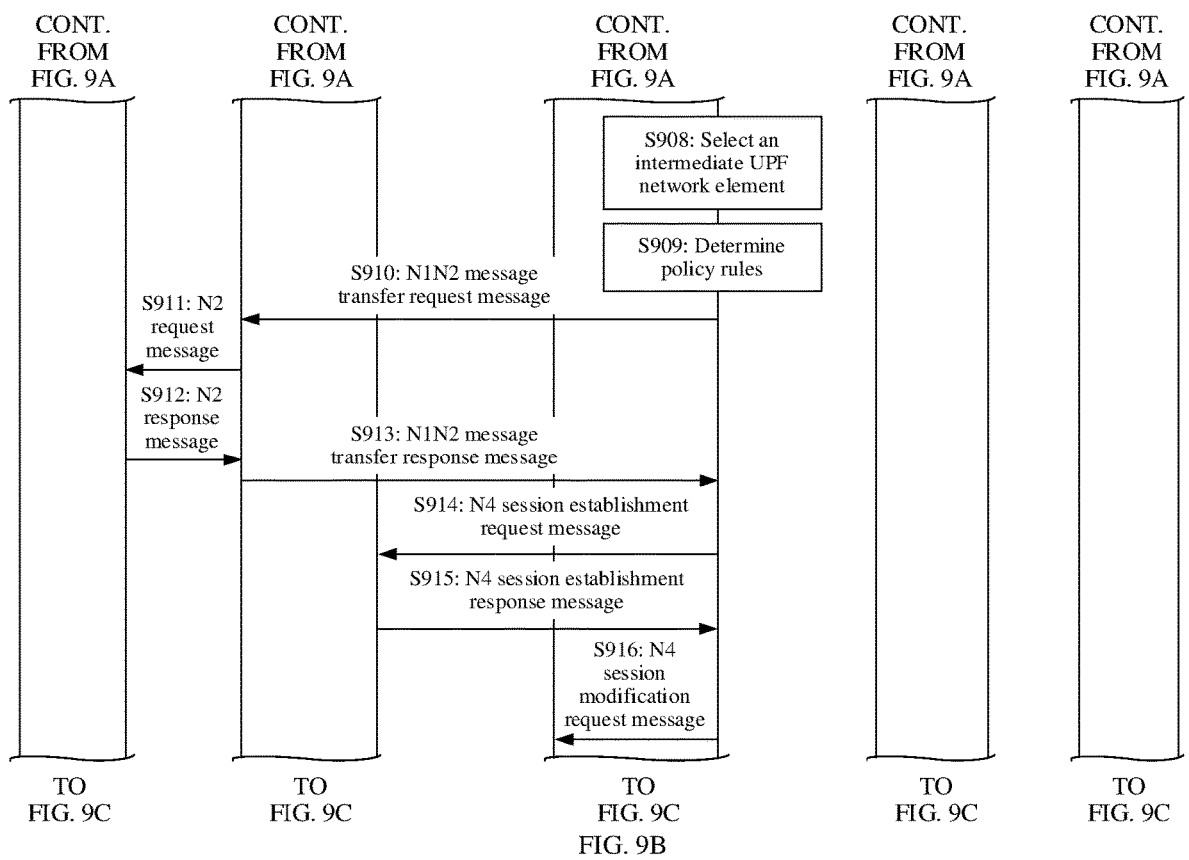
Figure 9C:
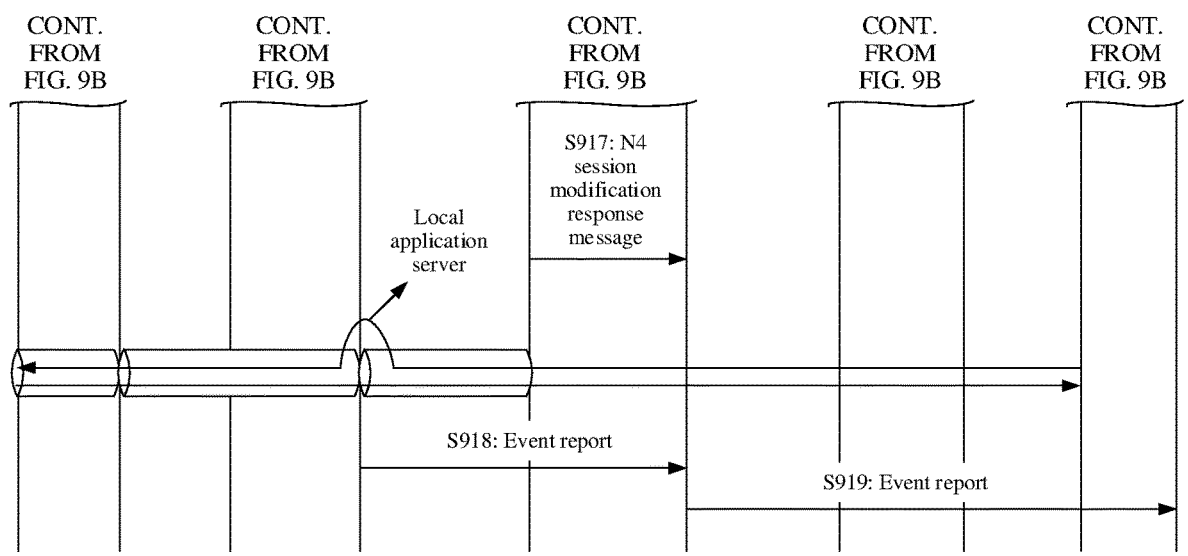

For example, the communication system shown in FIG. 2 is used in the 5G network shown in FIG. 3, and an SMF network element selects one intermediate UPF network element. FIG. 9A to FIG. 9C show a policy control method according to an embodiment of this application. The method describes: In a process in which a terminal device accesses an application server for a first application in a DN, the application server requests to steer a service flow in a downlink direction to one local application server for processing and then send a processed service flow to the terminal device. The method includes the following steps.

S901 to S908: Steps S901 to S908 are similar to steps S501 to S508 in the embodiment shown in FIG. 5A to FIG. 5C. For example, a difference is as follows: In this embodiment of this application, the direction information in the steering location information indicates a direction of a service flow to which traffic steering policy information is applied, and the direction information herein indicates a downlink direction. Certainly, if the data description information of the first application can uniquely indicate a service flow in a downlink direction, this parameter may not be carried.

S909: The SMF network element determines, based on the LAN traffic steering information 2, policy rules corresponding to the intermediate UPF network element.

For related descriptions of the policy rules corresponding to the intermediate UPF network element, refer to the descriptions in the embodiment shown in FIG. 5A to FIG. 5C. Details are not described herein again.

Optionally, in this embodiment of this application, the SMF network element may determine a downlink data flow based on data description information or direction information in steering location information or first steering location information, that is, determine that downlink data processed by a local application server for the first application in a target LAN needs to be sent to a downstream network element of each intermediate UPF network element.

For example, it is assumed that a first PDR may be denoted as a PDR 12, a first FAR may be denoted as a FAR 12, a second PDR may be denoted as a PDR 13, a second FAR may be denoted as a FAR 13, an upstream network element of the intermediate UPF network element is an anchor UPF network element, and a downstream network element of the intermediate UPF network element is a RAN device. The PDR 12 and the FAR 12 associated with the PDR 12 are used to receive downlink data from the anchor UPF network element, and steer the downlink data to the local application server for the first application in the target LAN. The PDR 13 and the FAR 13 associated with the PDR 13 are used to receive downlink data processed by the local application server for the first application in the target LAN, and send the downlink data to the RAN device. In addition, the policy rules corresponding to the intermediate UPF network element may further include a PDR 14 and a FAR 14 associated with the PDR 14. The PDR 14 and the FAR 14 associated with the PDR 14 are used to receive uplink data from the RAN device and send the uplink data to the anchor UPF network element. This is not specifically limited in this embodiment of this application. PDI including the PDR 12 is shown in Table 29. The FAR 12 associated with the PDR 12 is shown in Table 30. PDI including the PDR 13 is shown in Table 31. The FAR 13 associated with the PDR 13 is shown in Table 32. PDI including the PDR 14 is shown in Table 33. The FAR 14 associated with the PDR 14 is shown in Table 34.

TABLE 29

| Parameter | Value | Description |
|---|---|---|
| Source interface | Core, indicating a downlink data direction | This parameter is mandatory. |
| Local F-TEID | Including an IP address 4 and a TEID 4 | This parameter is conditionally mandatory, and is not carried when a traffic endpoint ID is included. |
| IP address of the terminal device | addr | This parameter is conditionally mandatory, and is not carried when a traffic endpoint ID is included. |
| Traffic endpoint ID | Identifying a traffic endpoint, and including the IP address 4, the TEID 4, and the IP address addr allocated to the terminal device | This parameter is optional, and is carried when PDI optimization is supported. |
| SDF filter | IP packet filter generated when the terminal device accesses the first application | This parameter is determined based on data identification information |
| Application ID | Application identifier corresponding to the first application accessed by the terminal device | This parameter is determined based on data identification information |

TABLE 29-continued

| Parameter | Value | Description |
|---|---|---|
| Ethernet packet filter | Ethernet packet filter generated when the terminal device accesses the first application | This parameter is determined based on data identification information |

TABLE 30

| Parameter | Value |
|---|---|
| Apply action | Forwarding a data packet |
| Forwarding parameters | A destination interface is a LAN or an intermediate LAN. A forwarding policy includes traffic steering policy information, for example, a traffic steering profile ID. The forwarding parameter indicates that the data packet is processed by using a local policy corresponding to the traffic steering profile ID and then sent to the destination interface. |

TABLE 31

| Parameter | Value | Description |
|---|---|---|
| Source interface | LAN or intermediate LAN, indicating that data is from a LAN to which the intermediate UPF belongs | This parameter is mandatory. |
| IP address of the terminal device | addr | This parameter is conditionally mandatory, and is not carried when a traffic endpoint ID is included. |
| Traffic endpoint ID | Identifying a traffic endpoint, and including the IP address addr allocated to the terminal device | This parameter is optional, and is carried when PDI optimization is supported. |
| SDF filter | IP packet filter generated when the terminal device accesses the first application | This parameter is determined based on data identification information |
| Application ID | Application identifier corresponding to the first application accessed by the terminal device | This parameter is determined based on data identification information |
| Ethernet packet filter | Ethernet packet filter generated when the terminal device accesses the first application | This parameter is determined based on data identification information |

TABLE 32

| Parameter | Value |
|---|---|
| Apply action | Forwarding a data packet |
| Forwarding parameters | A destination interface is access, "outer header creation" includes an F-TEID, and the F-TEID includes an IP address 2 and a TEID 2. The forwarding parameter indicates that the data packet is encapsulated by using a GTP-U packet header and then sent to the RAN device. |

TABLE 33

| Parameter | Value | Description |
| --- | --- | --- |
| Source interface | Access, indicating an uplink data direction | This parameter is mandatory. |
| Local F-TEID | Including an IP address 3 and a TEID 3 | This parameter is conditionally mandatory, and is not carried when a traffic endpoint ID is included. |
| IP address of the terminal device | addr | This parameter is conditionally mandatory, and is not carried when a traffic endpoint ID is included. |
| Traffic endpoint ID | Identifying a traffic endpoint, and including an IP address 3, a TEID 3, and an IP address addr allocated to the terminal device | This parameter is optional, and is carried when PDI optimization is supported. |
| SDF filter | IP packet filter generated when the terminal device accesses the first application | This parameter is optional. |
| Application ID | Application identifier corresponding to the first application accessed by the terminal device | This parameter is optional. |
| Ethernet packet filter | Ethernet packet filter generated when the terminal device accesses the first application | This parameter is optional. |

TABLE 34

| Apply action | Forwarding a data packet |
| --- | --- |
| Forwarding parameters | A destination interface is access, "outer header creation" information includes an F-TEID, and the F-TEID includes an IP address 1 and a TEID 1. The forwarding parameter indicates that the data packet is encapsulated by using a GTP-U and then sent to the anchor UPF network element. |

S910 to S913: Steps S910 to S913 are the same as steps S510 to S513 in the embodiment shown in FIG. 5A to FIG. 5C. For related descriptions, refer to the descriptions in the embodiment shown in FIG. 5A to FIG. 5C. Details are not described herein again.

S914: The SMF network element sends an N4 session establishment request message to the intermediate UPF network element. Correspondingly, the intermediate UPF network element receives the N4 session establishment request message from the SMF network element. The N4 session establishment request message includes the policy rules such as the PDR 12, the FAR 12 associated with the PDR 12, the PDR 13, the FAR 13 associated with the PDR 13, the PDR 14, and the FAR 14 associated with the PDR 14 corresponding to the intermediate UPF network element.

Optionally, in this embodiment of this application, the intermediate UPF network element may determine a corresponding traffic steering policy based on the traffic steering policy information in the FAR 12, and then process downlink data of the first application by using the traffic steering policy. This is not specifically limited in this embodiment of this application.

It should be noted that, in this embodiment of this application, step S910 and step S914 are not performed in a necessary sequence. Step S910 may be performed before step S914, step S914 may be performed before step S910, or step S910 and step S914 may be simultaneously performed. This is not specifically limited in this embodiment of this application.

S915 to S919: Steps S915 to S919 are the same as steps S515 to S519 in the embodiment shown in FIG. 5A to FIG. 5C. For related descriptions, refer to the descriptions in the embodiment shown in FIG. 5A to FIG. 5C. Details are not described herein again.

Based on the policy control method provided in this embodiment of this application, a proper intermediate UPF network element can be selected, so that the intermediate UPF network element steers downlink data of the first application to a local application server for the first application in a target LAN, and sends downlink data processed by the local application server for the first application in the target LAN to a downstream network element of the intermediate UPF network element.

The actions of the SMF network element, the intermediate UPF network element, the PCF network element, or the AF network element in steps S901 to S919 may be performed by the processor 401 in the communication device 400 in FIG. 4 by invoking the application program code stored in the memory 403. This is not limited in this embodiment of this application.

It may be understood that the communication system shown in FIG. 2 is also used in a 5G network shown in FIG. 15. In a scenario in which a terminal device accesses an application server for a first application in a central DN, the application server requests to steer a service flow in a downlink direction to one local application server for processing and then send a processed service flow to the terminal device, assuming that an SMF network element selects one intermediate UPF network element, a policy control method provided in an embodiment of this application is similar to the method shown in FIG. 9A to FIG. 9C. For example, differences are as follows:

First, the intermediate UPF network element selected by the SMF network element has a traffic steering function. In addition, the SMF network element further selects a new anchor UPF network element (referred to as an anchor UPF network element 2 below), and the anchor UPF network element 2 has a function of steering a data flow from the intermediate UPF network element to a local LAN.

Optionally, a manner for the SMF network element to select the anchor UPF network element 2 is similar to a manner for the SMF network element to select the intermediate UPF network element in the embodiment shown in FIG. 9A to FIG. 9C.

Second, the SMF network element determines policy rules corresponding to the intermediate UPF network element and policy rules corresponding to the anchor UPF network element 2.

The policy rules corresponding to the intermediate UPF network element are used to send, to the anchor UPF network element 2, downlink data of the first application sent by an upstream network element of the intermediate UPF network element, and used to send downlink data that is from the anchor UPF network element 2 and that is processed by a local application server for the first application in a target LAN to a downstream network element of the intermediate UPF network element.

The policy rules corresponding to the anchor UPF network element 2 are used to steer downlink data from the intermediate UPF network element to the local application server for the first application in the target LAN, and used to send downlink data processed by the local application server for the first application in the target LAN to the intermediate UPF network element.

Further, the SMF network element sends the policy rules corresponding to the intermediate UPF network element to the intermediate UPF network element, and sends the policy rules corresponding to the anchor UPF network element 2 to the anchor UPF network element 2.

Based on the policy control method provided in this embodiment of this application, a proper intermediate UPF network element and an anchor UPF network element communicating with the intermediate UPF network element can be selected, so that the anchor UPF network element steers downlink data of the first application to a local application server for the first application in a target LAN, and sends downlink data processed by the local application server for the first application in the target LAN to the intermediate UPF network element, and the intermediate UPF network element sends the downlink data to a downstream network element of the intermediate UPF network element.

Figure 10A:
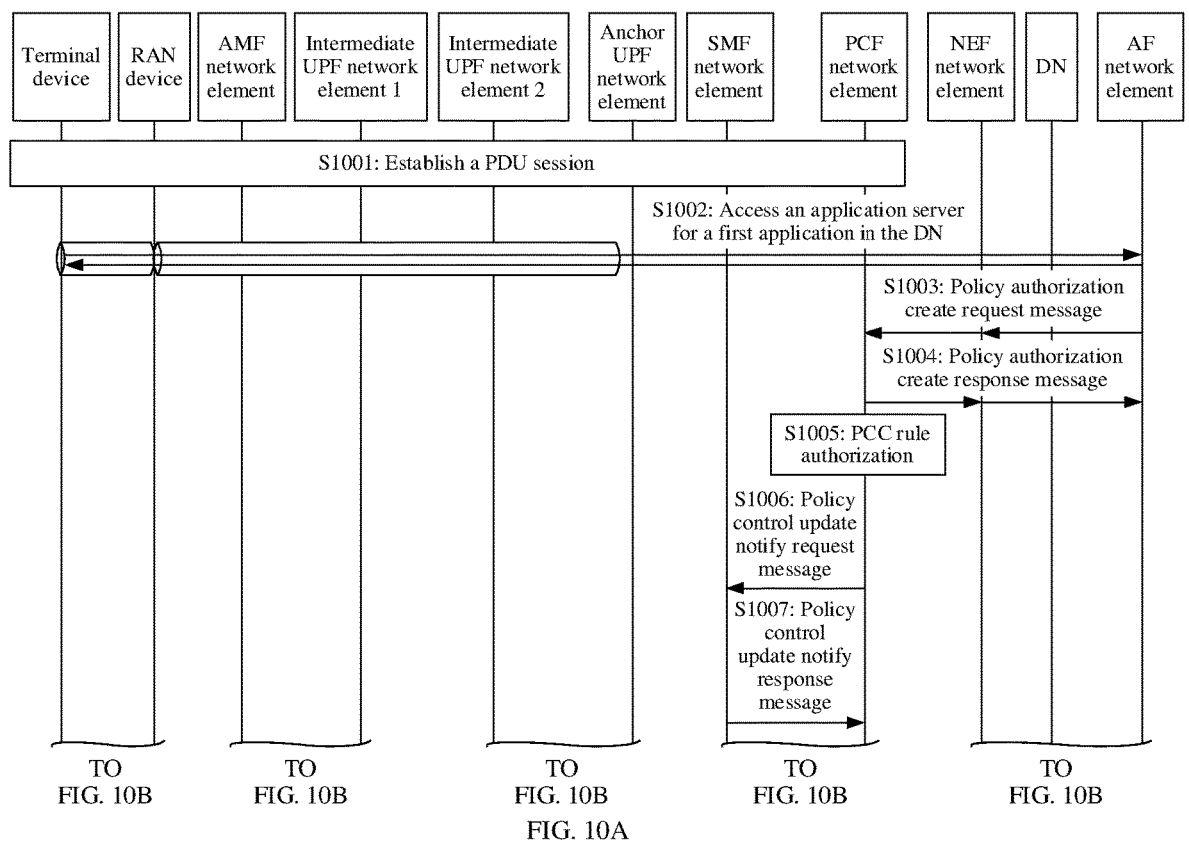
FIG. 10A to FIG. 10C are a schematic flowchart 6 of a policy control method according to an embodiment of this application.
Figure 10B:
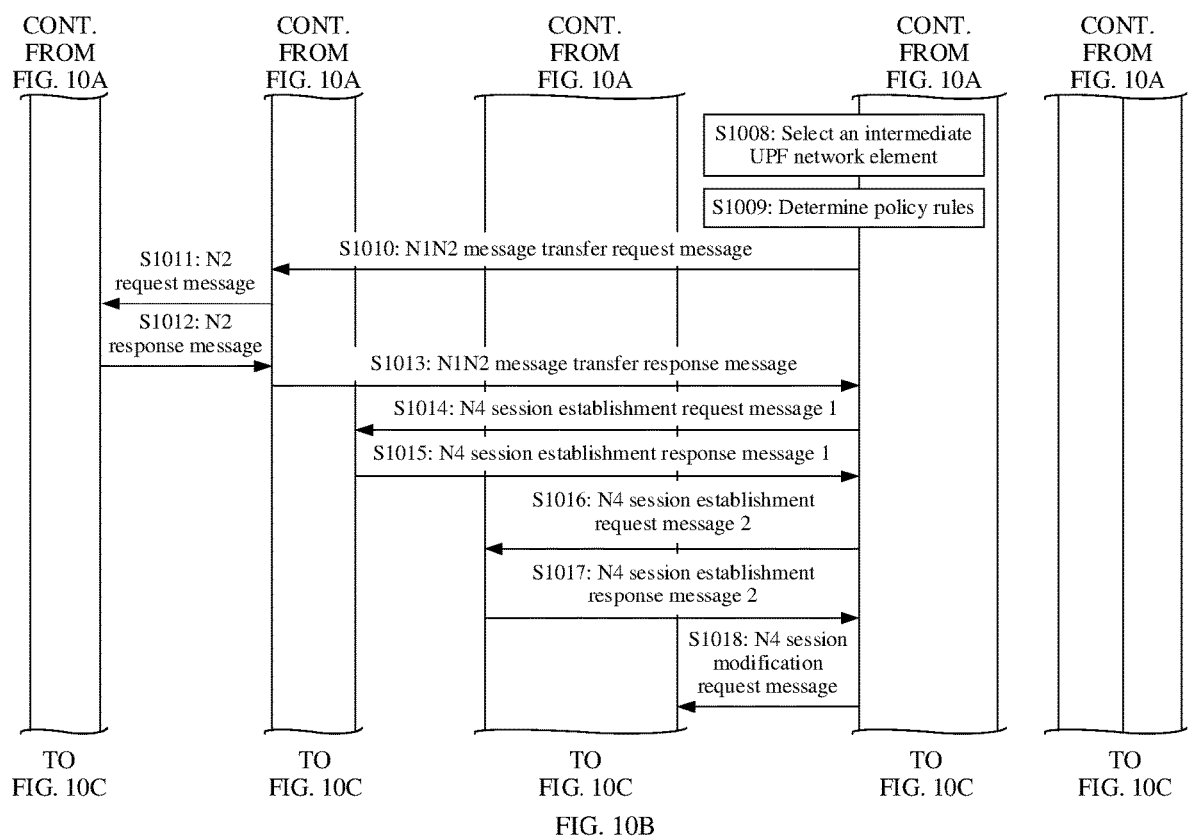
Figure 10C:
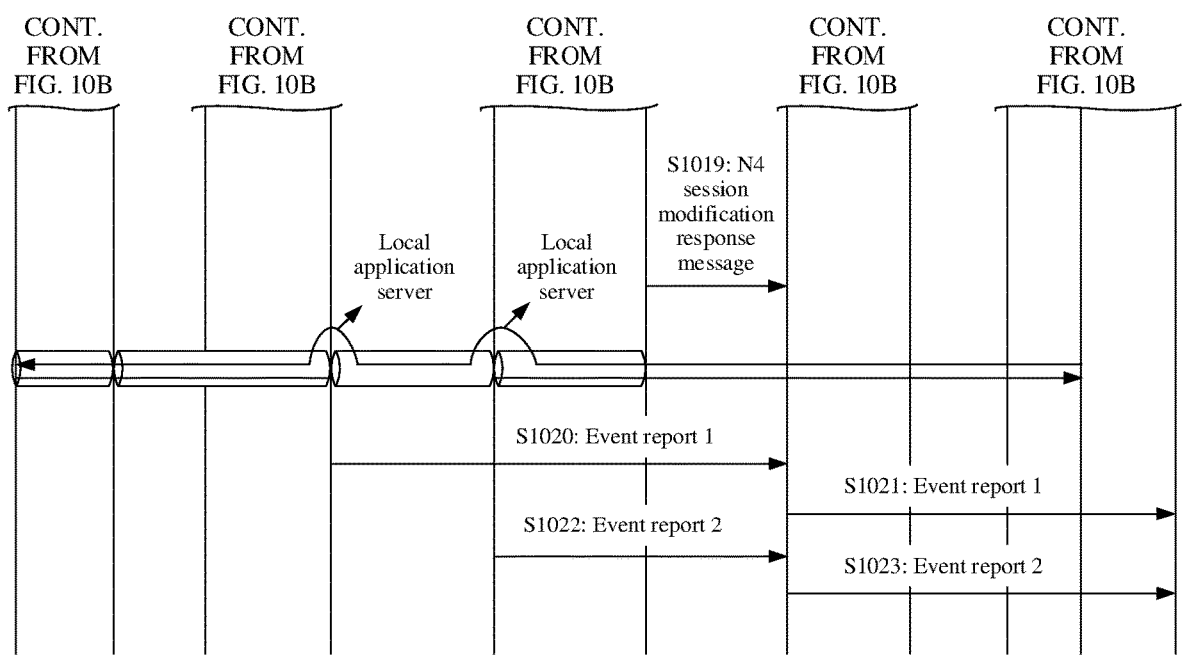
Figure 11A:
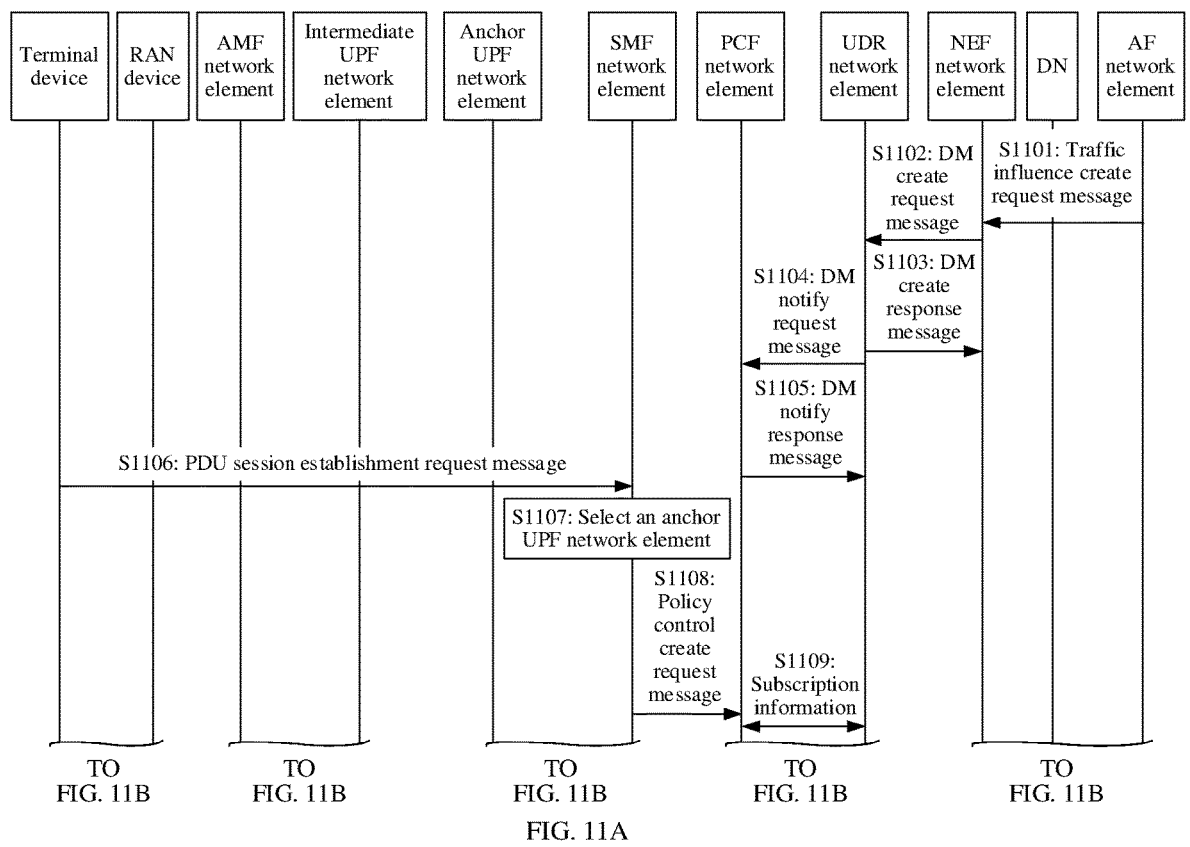
FIG. 11A to FIG. 11D are a schematic flowchart 7 of a policy control method according to an embodiment of this application.
Figure 11B:
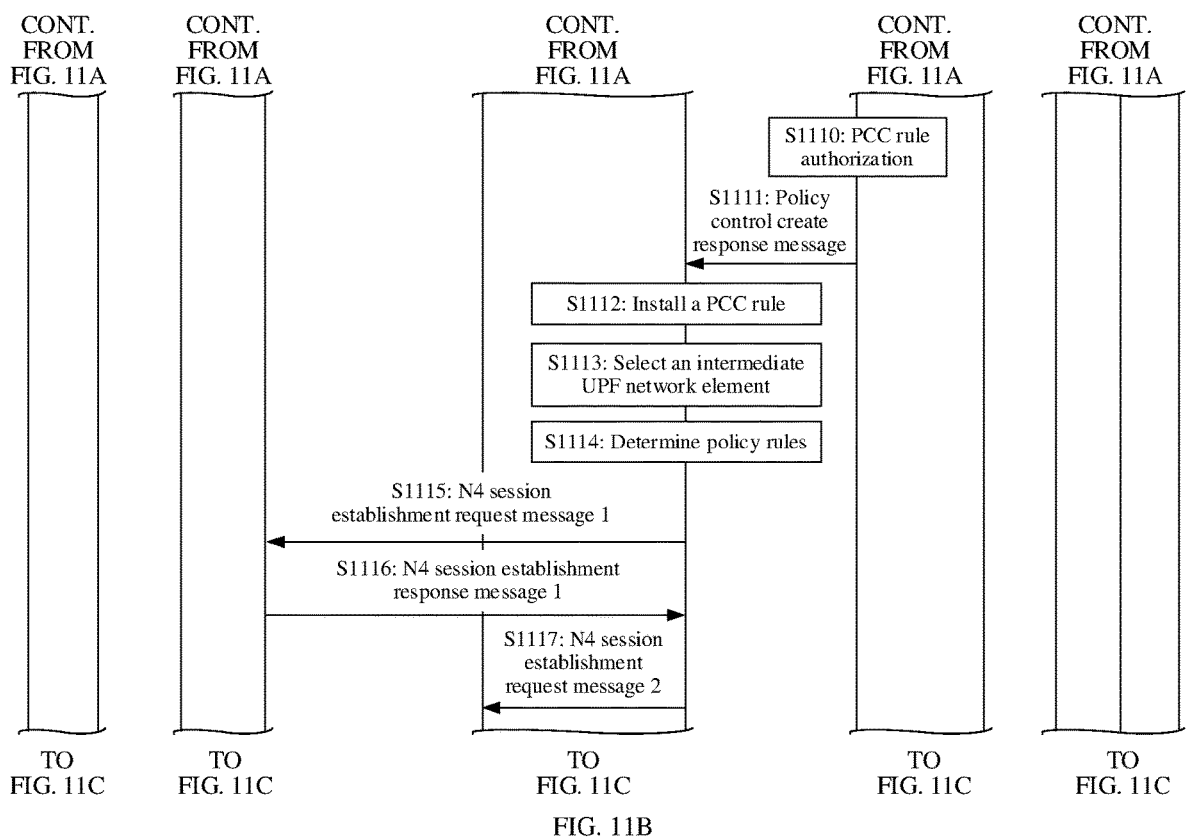
Figure 11C:
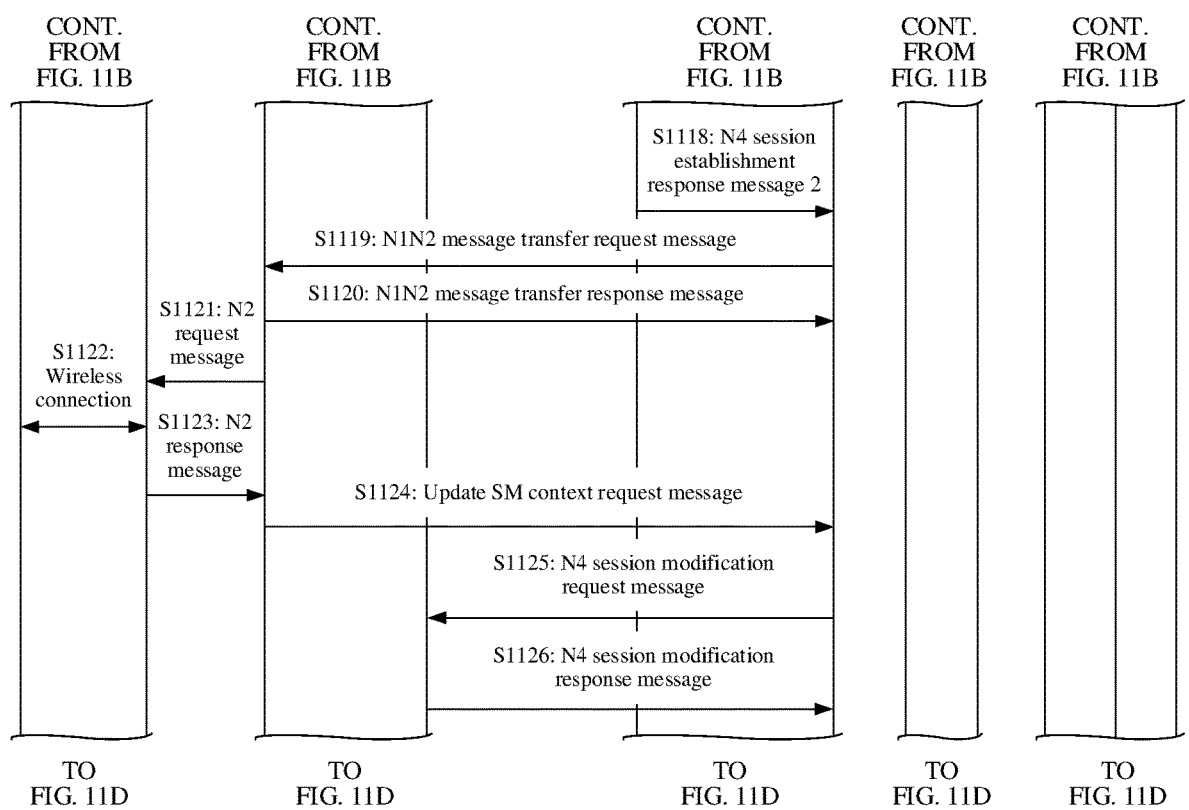
Figure 11D:
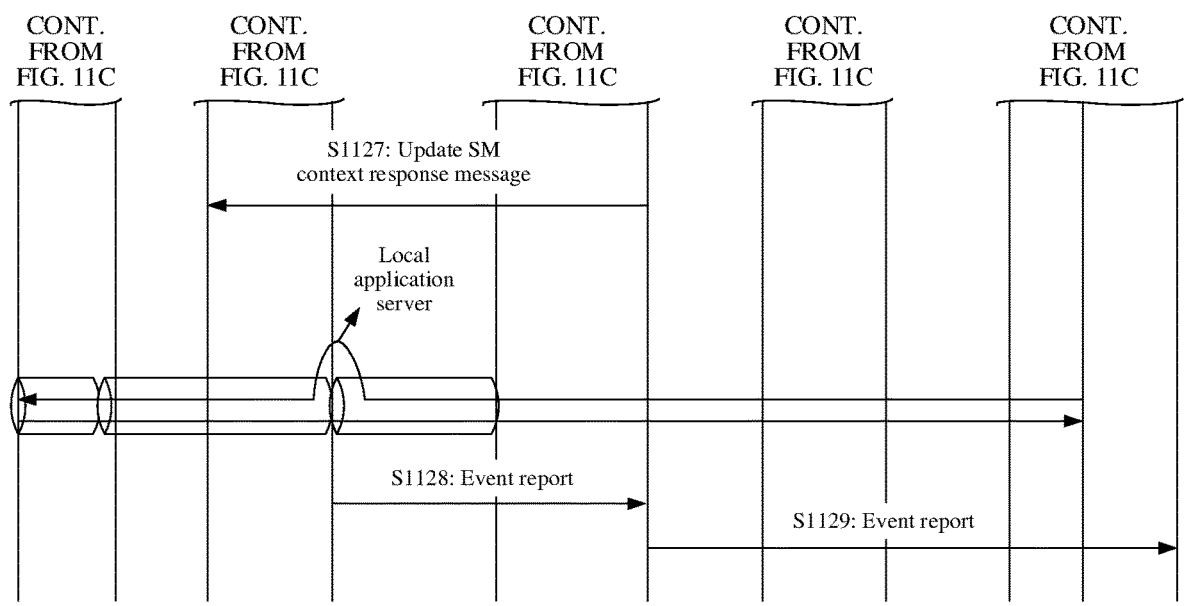
Figure 12A:
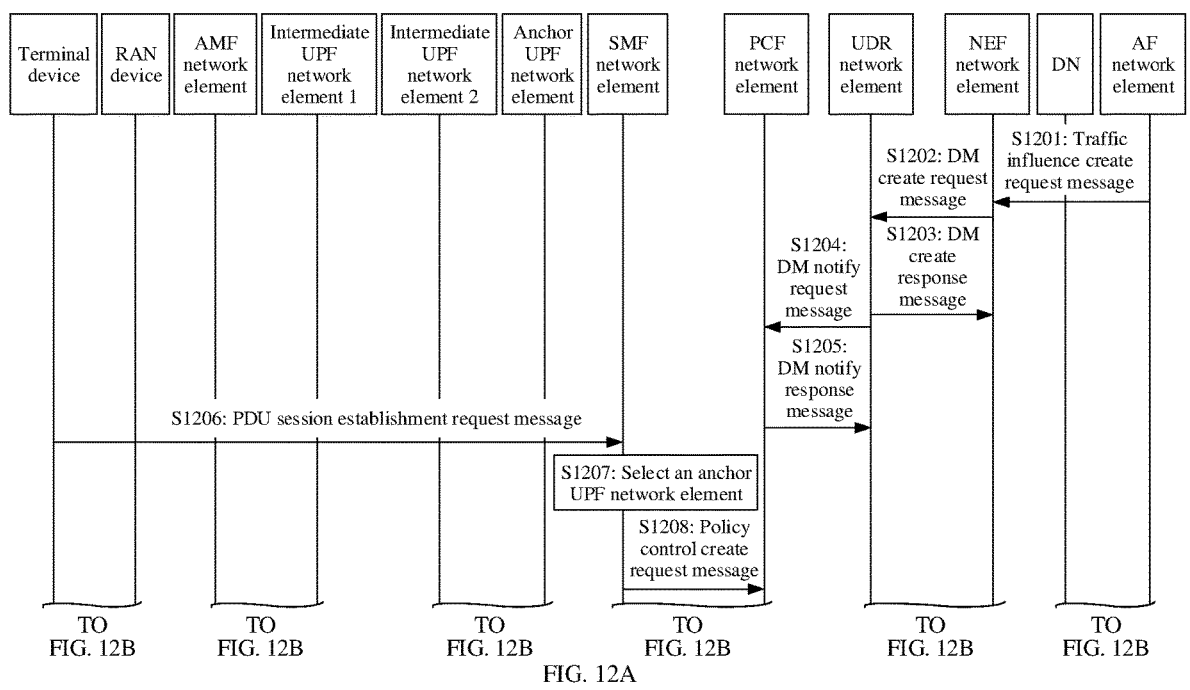
Figure 12C:
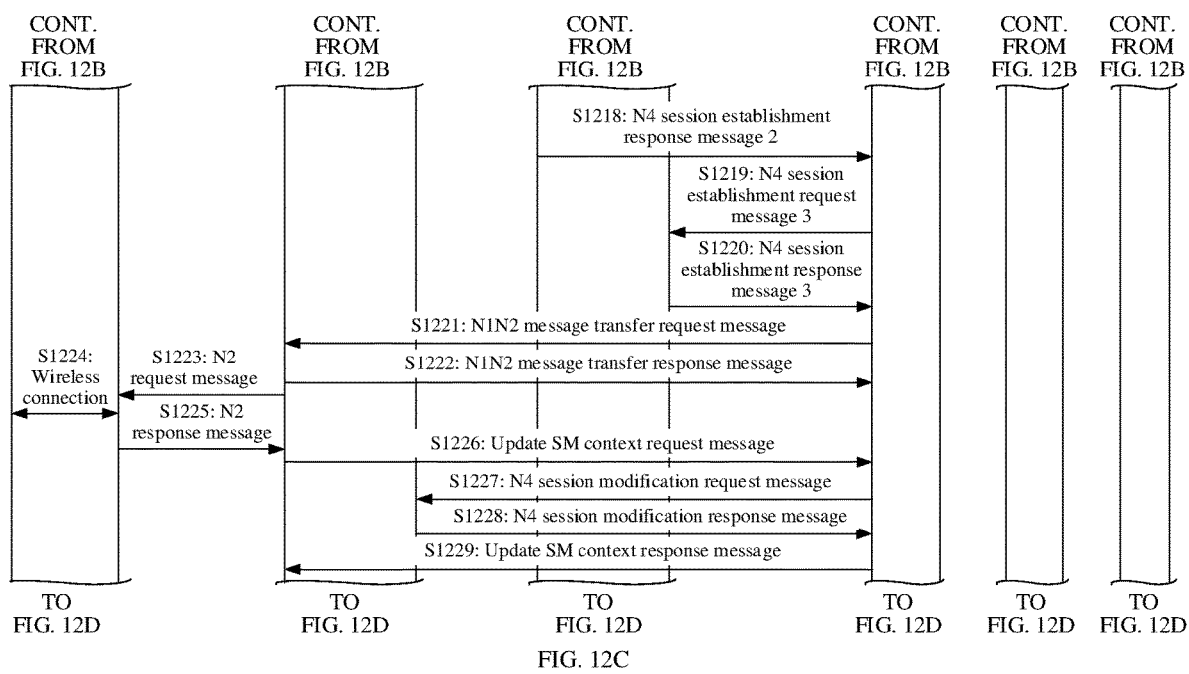
Figure 12D:
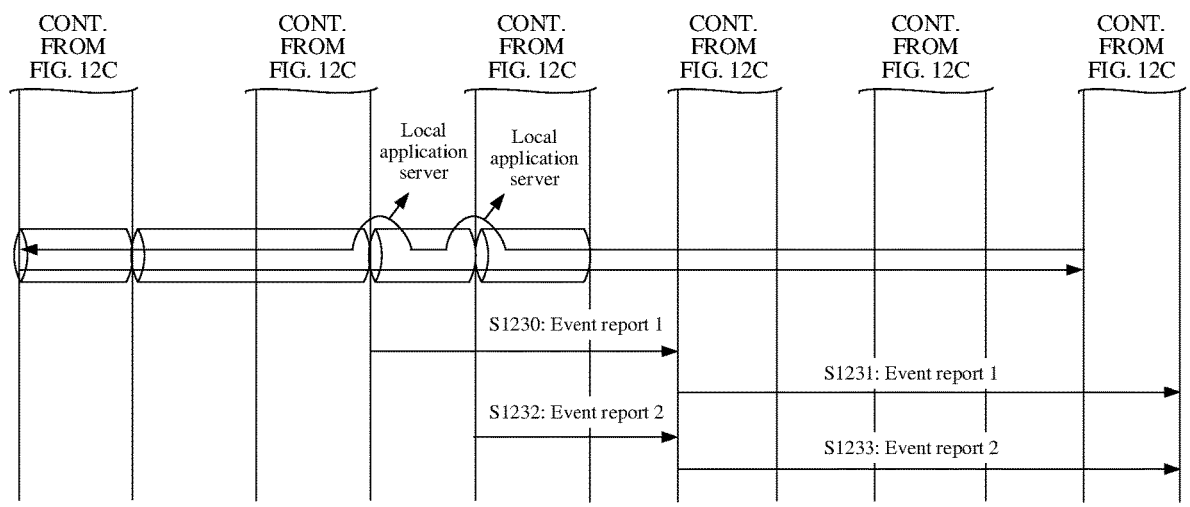

Alternatively, for example, the communication system shown in FIG. 2 is used in the 5G network shown in FIG. 3, and an SMF network element selects a plurality of intermediate UPF network elements. FIG. 10A to FIG. 10C show a policy control method according to an embodiment of this application. The method describes: In a process in which a terminal device accesses an application server for a first application in a DN, the application server requests to steer a service flow in a downlink direction to a plurality of local application servers for processing and then send a processed service flow to the terminal device. The method includes the following steps.

S1001 to S1008: Steps S1001 to S1008 are similar to steps S601 to S609 in the embodiment shown in FIG. 6A to FIG. 6C. For example, a difference is as follows: In this embodiment of this application, the direction information in the steering location information indicates a direction of a service flow to which traffic steering policy information is applied, and the direction information herein indicates a downlink direction. Certainly, if the data description information of the first application can uniquely indicate a service flow in a downlink direction, this parameter may not be carried. For other related descriptions, refer to the descriptions in the embodiment shown in FIG. 6A to FIG. 6C. Details are not described herein again.

S1009: The SMF network element determines, based on the LAN traffic steering information 2, policy rules corresponding to each intermediate UPF network element.

For related descriptions of the policy rules corresponding to each intermediate UPF network element, refer to the descriptions in the embodiment shown in FIG. 5A to FIG. 5C. Details are not described herein again. For a manner for the SMF network element to determine, based on the LAN traffic steering information 2, the policy rules corresponding to each intermediate UPF network element, refer to the descriptions in the embodiment shown in FIG. 6A to FIG. 6C. Details are not described herein again.

For example, it is assumed that the plurality of intermediate UPF network elements include an intermediate UPF network element 1 and an intermediate UPF network element 2, a downstream network element of the intermediate UPF network element 1 is a RAN device, an upstream network element of the intermediate UPF network element 1 is the intermediate UPF network element 2, a downstream network element of the intermediate UPF network element 2 is the intermediate UPF network element 1, and an upstream network element of the intermediate UPF network element 2 is the anchor UPF network element. In this case, policy rules corresponding to the intermediate UPF network element 2 may include a PDR 15, a FAR 15 associated with the PDR 15, a PDR 16, and a FAR 16 associated with the PDR 16, and policy rules corresponding to the intermediate UPF network element 1 may include a PDR 17, a FAR 17 associated with the PDR 17, a PDR 18, and a FAR 18 associated with the PDR 18. The PDR 15 and the FAR 15 associated with the PDR 15 are used to steer, to a local application server for the first application in a target LAN corresponding to the intermediate UPF network element 2, downlink data of the first application sent by the anchor UPF network element. The PDR 16 and the FAR 7 associated with the PDR 16 are used to send downlink data processed by the local application server for the first application in the target LAN corresponding to the intermediate UPF network element 2 to the intermediate UPF network element 1. The PDR 17 and the FAR 17 associated with the PDR 17 are used to steer, to a local application server for the first application in a target LAN corresponding to the intermediate UPF network element 1, downlink data of the first application sent by the intermediate UPF network element 2. The PDR 18 and the FAR 18 associated with the PDR 18 are used to send downlink data processed by the local application server for the first application in the target LAN corresponding to the intermediate UPF network element 1 to the RAN device. In addition, the policy rules corresponding to the intermediate UPF network element 1 may further include a PDR 19 and a FAR 19 associated with the PDR 19. The PDR 19 and the FAR 19 associated with the PDR 19 are used to receive uplink data from the RAN device, and send the uplink data to the intermediate UPF network element 2. The policy rules corresponding to the intermediate UPF network element 2 may further include a PDR 20 and a FAR 20 associated with the PDR 20. The PDR 20 and the FAR 20 associated with the PDR 20 are used to receive uplink data from the intermediate UPF network element 1, and send the uplink data to the anchor UPF network element. This is not specifically limited in this embodiment of this application. PDI including the PDR 15 is shown in Table 35. The FAR 15 associated with the PDR 15 is shown in Table 36. PDI including the PDR 16 is shown in Table 37. The FAR 16 associated with the PDR 16 is shown in Table 38. PDI including the PDR 17 is shown in Table 39. The FAR 17 associated with the PDR 17 is shown in Table 40. PDI including the PDR 18 is shown in Table 41. The FAR 18 associated with the PDR 18 is shown in Table 42. PDI including the PDR 19 is shown in Table 43. The FAR 19 associated with the PDR 19 is shown in Table 44. PDI including the PDR 20 is shown in Table 45. The FAR 20 associated with the PDR 20 is shown in Table 46.

TABLE 35

| Parameter | Value | Description |
|---|---|---|
| Source interface | Core, indicating a downlink data direction | This parameter is mandatory. |
| Local F-TEID | Including an IP address 8 and a TEID 8 | This parameter is conditionally mandatory, and is not carried when a traffic endpoint ID is included. |
| IP address of the terminal device | addr | This parameter is conditionally mandatory, and is not carried when a traffic endpoint ID is included. |
| Traffic endpoint ID | Identifying a traffic endpoint, and including the IP address 8, the TEID 8, and the IP address addr allocated to the terminal device | This parameter is optional, and is carried when PDI optimization is supported. |
| SDF filter | IP packet filter generated when the terminal device accesses the first application | This parameter is determined based on data identification information |
| Application ID | Application identifier corresponding to the first application accessed by the terminal device | This parameter is determined based on data identification information |
| Ethernet packet filter | Ethernet packet filter generated when the terminal device accesses the first application | This parameter is determined based on data identification information |

TABLE 36

| Parameter | Value |
|---|---|
| Apply action | Forwarding a data packet |
| Forwarding parameters | A destination interface is a LAN or an intermediate LAN. A forwarding policy includes traffic steering policy information, for example, a traffic steering profile ID. The forwarding parameter indicates that the data packet is processed by using a local policy corresponding to the traffic steering profile ID and then sent to the destination interface. |

TABLE 37

| Parameter | Value | Description |
|---|---|---|
| Source interface | LAN or intermediate LAN, indicating that data is from a LAN to which the intermediate UPF belongs | This parameter is mandatory. |
| IP address of the terminal device | addr | This parameter is conditionally mandatory, and is not carried when a traffic endpoint ID is included. |
| Traffic endpoint ID | Identifying a traffic endpoint, and including the IP address addr allocated to the terminal device | This parameter is optional, and is carried when PDI optimization is supported. |
| SDF filter | IP packet filter generated when the terminal device accesses the first application | This parameter is determined based on data identification information |
| Application ID | Application identifier corresponding to the first application accessed by the terminal device | This parameter is determined based on data identification information |
| Ethernet packet filter | Ethernet packet filter generated when the terminal device accesses the first application | This parameter is determined based on data identification information |

TABLE 38

| Parameter | Value |
| --- | --- |
| Apply action | Forwarding a data packet |
| Forwarding parameters | A destination interface is core, "outer header creation" includes an F-TEID, and the F-TEID includes an IP address 6 and a TEID 6. The forwarding parameter indicates that the data packet is encapsulated by using a GTP-U packet header and then sent to the intermediate UPF network element 1. |

TABLE 39

| Parameter | Value | Description |
| --- | --- | --- |
| Source interface | Core, indicating a downlink data direction | This parameter is mandatory. |
| Local F-TEID | Including an IP address 6 and a TEID 6 | This parameter is conditionally mandatory, and is not carried when a traffic endpoint ID is included. |
| IP address of the terminal device | addr | This parameter is conditionally mandatory, and is not carried when a traffic endpoint ID is included. |
| Traffic endpoint ID | Identifying a traffic endpoint, and including the IP address 6, the TEID 6, and the IP address addr allocated to the terminal device | This parameter is optional, and is carried when PDI optimization is supported. |
| Service data flow (SDF) filter | IP packet filter generated when the terminal device accesses the first application | This parameter is determined based on data identification information |
| Application identifier (application ID) | Application identifier corresponding to the first application accessed by the terminal device | This parameter is determined based on data identification information |
| Ethernet packet filter | Ethernet packet filter generated when the terminal device accesses the first application | This parameter is determined based on data identification information |

TABLE 40

| Parameter | Value |
| --- | --- |
| Apply action | Forwarding a data packet |
| Forwarding parameters | A destination interface is a LAN or an intermediate LAN. A forwarding policy includes traffic steering policy information, for example, a traffic steering profile ID. The forwarding parameter indicates that the data packet is processed by using a local policy corresponding to the traffic steering profile ID and then sent to the destination interface. |

TABLE 41

| Parameter | Value | Description |
| --- | --- | --- |
| Source interface | LAN or intermediate LAN, indicating that data is from a LAN to which the intermediate UPF belongs | This parameter is mandatory. |
| IP address of the terminal device | addr | This parameter is conditionally mandatory, and is not carried when a traffic endpoint ID is included. |
| Traffic endpoint ID | Identifying a traffic endpoint, and including the IP address addr allocated to the terminal device | This parameter is optional, and is carried when PDI optimization is supported. |
| SDF filter | IP packet filter generated when the terminal device accesses the first application | This parameter is determined based on data identification information |
| Application ID | Application identifier corresponding to the first application accessed by the terminal device | This parameter is determined based on data identification information |
| Ethernet packet filter | Ethernet packet filter generated when the terminal device accesses the first application | This parameter is determined based on data identification information |

TABLE 42

| Parameter | Value |
| --- | --- |
| Apply action | Forwarding a data packet |
| Forwarding parameters | A destination interface is access, "outer header creation" includes an F-TEID, and the F-TEID includes an IP address 2 and a TEID 2. The forwarding parameter indicates that the data packet is encapsulated by using a GTP-U packet header and then sent to the RAN device. |

TABLE 43

| Parameter | Value | Description |
| --- | --- | --- |
| Source interface | Access, indicating an uplink data direction | This parameter is mandatory. |
| Local F-TEID | Including an IP address 5 and a TEID 5 | This parameter is conditionally mandatory, and is not carried when a traffic endpoint ID is included. |
| IP address of the terminal device | addr | This parameter is conditionally mandatory, and is not carried when a traffic endpoint ID is included. |
| Traffic endpoint ID | Identifying a traffic endpoint, and including the IP address 5, the TEID 5, and the IP address addr allocated to the terminal device | This parameter is optional, and is carried when PDI optimization is supported. |
| SDF filter | IP packet filter generated when the terminal device accesses the first application | This parameter is optional. |
| Application ID | Application identifier corresponding to the first application accessed by the terminal device | This parameter is optional. |
| Ethernet packet filter | Ethernet packet filter generated when the terminal device accesses the first application | This parameter is optional. |

TABLE 44

| Parameter | Value |
| --- | --- |
| Apply action | Forwarding a data packet |
| Forwarding parameters | A destination interface is core, "outer header creation" includes an F-TEID, and the F-TEID includes an IP address 7 and a TEID 7. The forwarding parameter indicates that the data packet is encapsulated by using a GTP-U and then sent to the intermediate UPF network element 2. |

TABLE 45

| Parameter | Value | Description |
| --- | --- | --- |
| Source interface | Access, indicating an uplink data direction | This parameter is mandatory. |
| Local F-TEID | Including an IP address 7 and a TEID 7 | This parameter is conditionally mandatory, and is not carried when a traffic endpoint ID is included. |
| IP address of the terminal device | addr | This parameter is conditionally mandatory, and is not carried when a traffic endpoint ID is included. |
| Traffic endpoint ID | Identifying a traffic endpoint, and including the IP address 7, the TEID 7, and the IP address addr allocated to the terminal device | This parameter is optional, and is carried when PDI optimization is supported. |
| SDF filter | IP packet filter generated when the terminal device accesses the first application | This parameter is optional. |
| Application ID | Application identifier corresponding to the first application accessed by the terminal device | This parameter is optional. |
| Ethernet packet filter | Ethernet packet filter generated when the terminal device accesses the first application | This parameter is optional. |

TABLE 46

| Apply action | Forwarding a data packet |
|---|---|
| Forwarding parameters | A destination interface is core, "outer header creation" information includes an F-TEID, and the F-TEID includes an IP address 1 and a TEID 1. The forwarding parameter indicates that the data packet is encapsulated by using a GTP-U and then sent to the anchor UPF network element. |

Assuming that the plurality of intermediate UPF network elements in this embodiment of this application include the intermediate UPF network element 1 and the intermediate UPF network element 2, the policy control method provided in this embodiment of this application further includes the following steps.

S1010 to S1013: Steps S1010 to S1013 are the same as steps S610 to S613 in the embodiment shown in FIG. 6A to FIG. 6C. For related descriptions, refer to the descriptions in the embodiment shown in FIG. 6A to FIG. 6C. Details are not described herein again.

S1014: The SMF network element sends an N4 session establishment request message 1 to the intermediate UPF network element 1. Correspondingly, the intermediate UPF network element 1 receives the N4 session establishment request message 1 from the SMF network element. The N4 session establishment request message 1 includes the policy rules such as the PDR 17, the FAR 17 associated with the PDR 17, the PDR 18, the FAR 18 associated with the PDR 18, the PDR 19, and the FAR 19 associated with the PDR 19 corresponding to the intermediate UPF network element 1.

Optionally, in this embodiment of this application, the intermediate UPF network element 1 may determine a corresponding traffic steering policy based on the traffic steering policy information in the FAR 17, and then process downlink data of the first application by using the traffic steering policy. This is not specifically limited in this embodiment of this application.

S1015: The intermediate UPF network element 1 sends an N4 session establishment response message 1 to the SMF network element. Correspondingly, the SMF network element receives the N4 session establishment response message 1 from the intermediate UPF network element 1.

S1016: The SMF network element sends an N4 session establishment request message 2 to the intermediate UPF network element 2. Correspondingly, the intermediate UPF network element 2 receives the N4 session establishment request message 2 from the SMF network element. The N4 session establishment request message 2 includes the policy rules such as the PDR 15, the FAR 15 associated with the PDR 15, the PDR 16, the FAR 16 associated with the PDR 16, the PDR 20, and the FAR 20 associated with the PDR 20 corresponding to the intermediate UPF network element 2.

Optionally, in this embodiment of this application, the intermediate UPF network element 2 may determine a corresponding traffic steering policy based on the traffic steering policy information in the FAR 15, and then process downlink data of the first application by using the traffic steering policy. This is not specifically limited in this embodiment of this application.

S1017: The intermediate UPF network element 2 sends an N4 session establishment response message 2 to the SMF network element. Correspondingly, the SMF network element receives the N4 session establishment response message 2 from the intermediate UPF network element.

It should be noted that, in this embodiment of this application, step S1010, step S1014, and step S1016 are not performed in a necessary sequence. Any one of the steps may be performed first, and then remaining one or two steps are performed, any two of the steps may be performed first, and then remaining one step is performed, or the three steps may be simultaneously performed. This is not specifically limited in this embodiment of this application.

S1018 to S1023: Steps S1018 to S1023 are the same as steps S618 to S623 in the embodiment shown in FIG. 6A to FIG. 6C. For related descriptions, refer to the descriptions in the embodiment shown in FIG. 6A to FIG. 6C. Details are not described herein again.

Based on the policy control method provided in this embodiment of this application, a proper intermediate UPF network element can be selected, so that the intermediate UPF network element steers downlink data of the first application to a local application server for the first application in a target LAN, and sends downlink data processed by the local application server for the first application in the target LAN to a downstream network element of the intermediate UPF network element.

The actions of the SMF network element, the intermediate UPF network element 1, the intermediate UPF network element 2, the PCF network element, or the AF network element in steps 1001 to S1023 may be performed by the processor 401 in the communication device 400 in FIG. 4 by invoking the application program code stored in the memory 403. This is not limited in this embodiment of this application.

It may be understood that the communication system shown in FIG. 2 is also used in a 5G network shown in FIG. 15. In a scenario in which a terminal device accesses an application server for a first application in a central DN, the application server requests to steer a service flow in a downlink direction to a plurality of local application servers for processing and then send a processed service flow to the terminal device, assuming that an SMF network element selects a plurality of intermediate UPF network elements that include an intermediate UPF network element 1 and an intermediate UPF network element 2, a policy control method provided in an embodiment of this application is similar to the method shown in FIG. 10A to FIG. 10C. For example, differences are as follows:

First, the intermediate UPF network element 1 and the intermediate UPF network element 2 that are selected by the SMF network element each have a traffic steering function. In addition, the SMF network element further selects anchor UPF network elements 2. In this scenario, the anchor UPF network elements 2 include an anchor UPF network element 21 communicating with the intermediate UPF network element 1 and an anchor UPF network element 22 communicating with the intermediate UPF network element 2. The anchor UPF network element 21 has a function of steering a data flow from the intermediate UPF network element 1 to a local LAN to which the anchor UPF network element 21 belongs. The anchor UPF network element 22 has a function of steering a data flow from the intermediate UPF network element 2 to a local LAN to which the anchor UPF network element 22 belongs.

Optionally, a manner for the SMF network element to select the anchor UPF network element 21 and the anchor UPF network element 22 is similar to a manner for the SMF network element to select the intermediate UPF network element 1 and the intermediate UPF network element 2 in the embodiment shown in FIG. 10A to FIG. 10C.

Second, the SMF network element determines policy rules corresponding to each intermediate UPF network element and policy rules corresponding to the anchor UPF network elements 2.

For example, based on the foregoing example, policy rules corresponding to the intermediate UPF network element 2 are used to send, to the anchor UPF network element 22, downlink data of the first application sent by an upstream network element of the intermediate UPF network element 2, and used to send downlink data that is from the anchor UPF network element 22 and that is processed by a local application server for the first application in a target LAN to a downstream network element of the intermediate UPF network element 2, for example, the intermediate UPF network element 1.

Policy rules corresponding to the anchor UPF network element 22 are used to steer downlink data from the intermediate UPF network element 2 to the local application server for the first application in the target LAN, and used to send downlink data processed by the local application server for the first application in the target LAN to the intermediate UPF network element 2.

Policy rules corresponding to the intermediate UPF network element 1 are used to send, to the anchor UPF network element 21, downlink data of the first application sent by an upstream network element of the intermediate UPF network element 1, and used to send downlink data that is from the anchor UPF network element 21 and that is processed by a local application server for the first application in a target LAN to a downstream network element of the intermediate UPF network element 1, for example, the terminal device.

Policy rules corresponding to the anchor UPF network element 21 are used to steer downlink data from the intermediate UPF network element 1 to the local application server for the first application in the target LAN, and used to send downlink data processed by the local application server for the first application in the target LAN to the intermediate UPF network element 1.

Further, the SMF network element sends corresponding policy rules to each intermediate UPF network element in a plurality of intermediate user plane network elements. For example, the SMF network element sends the policy rules corresponding to the intermediate UPF network element 1 to the intermediate UPF network element 1, and sends the policy rules corresponding to the intermediate UPF network element 2 to the intermediate UPF network element 2. The SMF network element further sends policy rules corresponding to each of a plurality of anchor UPF network elements to each anchor UPF network element. For example, the SMF network element sends the policy rules corresponding to the anchor UPF network element 21 to the anchor UPF network element 21, and sends the policy rules corresponding to the anchor UPF network element 22 to the anchor UPF network element 22.

Based on the policy control method provided in this embodiment of this application, a proper intermediate UPF network element and an anchor UPF network element communicating with the intermediate UPF network element can be selected, so that the anchor UPF network element steers downlink data of the first application to a local application server for the first application in a target LAN, and sends downlink data processed by the local application server for the first application in the target LAN to the intermediate UPF network element, and the intermediate UPF network element sends the downlink data to a downstream network element of the intermediate UPF network element.

Alternatively, for example, the communication system shown in FIG. 2 is used in the 5G network shown in FIG. 3, and an SMF network element selects one intermediate UPF network element. FIG. 11A to FIG. 11D show a policy control method for a service flow in a downlink direction according to an embodiment of this application. The method describes an application server for a first application in a DN requests to steer, for a group of terminal devices or all terminal devices, a service flow accessed by each terminal device to one local application server for processing and then send a processed service flow to the terminal device. The method includes the following steps.

S1101 to S1113: Steps S1101 to S1113 are similar to steps S701 to S713 in the embodiment shown in FIG. 7A to FIG. 7D. For example, a difference is as follows: In this embodiment of this application, the direction information in the steering location information indicates a direction of a service flow to which traffic steering policy information is applied, and the direction information herein indicates a downlink direction. Certainly, if the data description information of the first application can uniquely indicate a service flow in a downlink direction, this parameter may not be carried. For other related descriptions, refer to the descriptions in the embodiment shown in FIG. 7A to FIG. 7D. Details are not described herein again.

S1114: The SMF network element determines, based on the LAN traffic steering information 5, policy rules corresponding to the intermediate UPF network element, where the policy rules are used to steer uplink data of the first application sent by an upstream network element of the intermediate UPF network element to a local application server for the first application in a target LAN. For related descriptions of the upstream network element, refer to the descriptions in the part for the communication system. Details are not described herein again.

Optionally, in this embodiment of this application, the SMF network element may determine a downlink data flow based on data description information or direction information in steering location information or first steering location information, that is, determine that downlink data processed by the local application server for the first application in the target LAN needs to be sent to a downstream network element of the intermediate UPF network element.

Optionally, in this embodiment of this application, the policy rules corresponding to the intermediate UPF network element include a first PDR and a first FAR associated with the first PDR. For related descriptions of the first PDR and the first FAR, refer to the descriptions in the embodiment shown in FIG. 5A to FIG. 5C. Details are not described herein again.

For example, it is assumed that the first PDR may be denoted as a PDR 12, the first FAR may be denoted as a FAR 12, the upstream network element of the intermediate UPF network element is the anchor UPF network element, and the downstream network element of the intermediate UPF network element is a RAN device. The PDR 12 and the FAR 12 associated with the PDR 12 are used to receive downlink data from the anchor UPF network element, and steer the downlink data to the local application server for the first application in the target LAN. PDI including the PDR 12 is shown in Table 29. The FAR 12 associated with the PDR 12 is shown in Table 30. Details are not described herein again.

In addition, the policy rules corresponding to the intermediate UPF network element may further include a PDR 14 and a FAR 14 associated with the PDR 14. The PDR 14 and the FAR 14 associated with the PDR 14 are used to receive uplink data from the RAN device and send the uplink data to the anchor UPF network element. This is not specifically limited in this embodiment of this application. PDI including the PDR 14 is shown in Table 33. The FAR 14 associated with the PDR 14 is shown in Table 34. Details are not described herein again.

In addition, in this embodiment of this application, the SMF network element may determine, based on the LAN traffic steering information 5, policy rules such as a PDR 1, a FAR 1 associated with the PDR 1, a PDR 2, and a FAR 2 associated with the PDR 2 corresponding to the anchor UPF network element. The PDR 1 and the FAR 1 associated with the PDR 1 are used to receive uplink data from the intermediate UPF network element, and send the uplink data to the DN. The PDR 2 and the FAR 2 associated with the PDR 2 are used to receive downlink data from the DN, and send the downlink data to the intermediate UPF network element. PDI including the PDR 1 is shown in Table 1. The FAR 1 associated with the PDR 1 is shown in Table 2. PDI including the PDR 2 is shown in Table 3. The FAR 2 associated with the PDR 2 is shown in Table 13. Details are not described herein again.

S1115: The SMF network element sends an N4 session establishment request message 1 to the intermediate UPF network element. Correspondingly, the intermediate UPF network element receives the N4 session establishment request message 1 from the SMF network element. The N4 session establishment request message 1 includes the policy rules such as the PDR 12, the FAR 12 associated with the PDR 12, the PDR 14, and the FAR 14 associated with the PDR 14 corresponding to the intermediate UPF network element.

Optionally, in this embodiment of this application, the intermediate UPF network element may determine a corresponding traffic steering policy based on the traffic steering policy information in the FAR 12, and then process downlink data of the first application by using the traffic steering policy. This is not specifically limited in this embodiment of this application.

S1116: The intermediate UPF network element sends an N4 session establishment response message 1 to the SMF network element. Correspondingly, the SMF network element receives the N4 session establishment response message 1 from the intermediate UPF network element.

S1117: The SMF network element sends an N4 session establishment request message 2 to the anchor UPF network element. Correspondingly, the anchor UPF network element receives the N4 session establishment request message 2 from the SMF network element. The N4 session establishment request message 2 includes the policy rules such as the PDR 1, the FAR 1 associated with the PDR 1, the PDR 2, and the FAR 2 associated with the PDR 2 corresponding to the anchor UPF network element.

S1118: The anchor UPF network element sends an N4 session establishment response message 2 to the SMF network element. Correspondingly, the SMF network element receives the N4 session establishment response message 2 from the anchor UPF network element.

S1119 to S1124: Steps S1119 to S1124 are the same as steps S719 to S724 in the embodiment shown in FIG. 7A to FIG. 7D. For related descriptions, refer to the descriptions in the embodiment shown in FIG. 7A to FIG. 7D. Details are not described herein again.

S1125: The SMF network element sends an N4 session modification request message to the intermediate UPF network element. Correspondingly, the intermediate UPF network element receives the N4 session modification request message from the SMF network element. The N4 session modification request message includes a PDR 13 and a FAR 13 associated with the PDR 13. The PDR 13 and the FAR 13 associated with the PDR 13 are used to receive downlink data processed by the local application server for the first application in the target LAN, and send the downlink data to the RAN device. PDI including the PDR 13 is shown in Table 31. The FAR 13 associated with the PDR 13 is shown in Table 32. Details are not described herein again.

S1126: After storing the PDR 13 and the FAR 13 associated with the PDR 13, the intermediate UPF network element sends an N4 session modification response message to the SMF network element. Correspondingly, the SMF network element receives the N4 session modification response message from the intermediate UPF network element.

S1127 to S1129: Steps S1127 to S1129 are the same as steps S727 to S729 in the embodiment shown in FIG. 7A to FIG. 7D. For related descriptions, refer to the descriptions in the embodiment shown in FIG. 7A to FIG. 7D. Details are not described herein again.

Based on the policy control method provided in this embodiment of this application, a proper intermediate UPF network element can be selected, so that the intermediate UPF network element steers downlink data of the first application to a local application server for the first application in a target LAN, and sends downlink data processed by the local application server for the first application in the target LAN to a downstream network element of the intermediate UPF network element.

The actions of the SMF network element, the intermediate UPF network element, the PCF network element, or the AF network element in steps S1101 to S1129 may be performed by the processor 401 in the communication device 400 in FIG. 4 by invoking the application program code stored in the memory 403. This is not limited in this embodiment of this application.

It may be understood that the communication system shown in FIG. 2 is also used in a 5G network shown in FIG. 15. In a scenario in which an application server for a first application in a central DN requests to steer, for a group of terminal devices or all terminal devices, a service flow accessed by each terminal device to one local application server for processing and then send a processed service flow to the terminal device, assuming that an SMF network element selects one intermediate UPF network element, a policy control method provided in an embodiment of this application is similar to the method shown in FIG. 11A to FIG. 11D. For example, differences are as follows:

First, the intermediate UPF network element selected by the SMF network element has a traffic steering function. In addition, the SMF network element further selects a new anchor UPF network element (referred to as an anchor UPF network element 2 below), and the anchor UPF network element 2 has a function of steering a data flow from the intermediate UPF network element to a local LAN.

Optionally, a manner for the SMF network element to select the anchor UPF network element 2 is similar to a manner for the SMF network element to select the intermediate UPF network element in the embodiment shown in FIG. 11A to FIG. 11D.

Second, the SMF network element determines policy rules corresponding to the intermediate UPF network element and policy rules corresponding to the anchor UPF network element 2.

The policy rules corresponding to the intermediate UPF network element are used to send, to the anchor UPF network element 2, downlink data of the first application sent by an upstream network element of the intermediate UPF network element, and used to send downlink data that is from the anchor UPF network element 2 and that is processed by a local application server for the first application in a target LAN to a downstream network element of the intermediate UPF network element.

The policy rules corresponding to the anchor UPF network element 2 are used to steer downlink data from the intermediate UPF network element to the local application server for the first application in the target LAN, and used to send downlink data processed by the local application server for the first application in the target LAN to the intermediate UPF network element.

Further, the SMF network element sends the policy rules corresponding to the intermediate UPF network element to the intermediate UPF network element, and sends the policy rules corresponding to the anchor UPF network element 2 to the anchor UPF network element 2.

Based on the policy control method provided in this embodiment of this application, a proper intermediate UPF network element and an anchor UPF network element communicating with the intermediate UPF network element can be selected, so that the anchor UPF network element steers downlink data of the first application to a local application server for the first application in a target LAN, and sends downlink data processed by the local application server for the first application in the target LAN to the intermediate UPF network element, and the intermediate UPF network element sends the downlink data to a downstream network element of the intermediate UPF network element.

Alternatively, for example, the communication system shown in FIG. 2 is used in the 5G network shown in FIG. 3, and an SMF network element selects a plurality of intermediate UPF network elements. FIG. 12A to FIG. 12D show a policy control method for a service flow in a downlink direction according to an embodiment of this application. The method describes an application server for a first application in a DN requests to steer, for a group of terminal devices or all terminal devices, a service flow accessed by each terminal device to a plurality of local application servers for processing and then send a processed service flow to the terminal device. The method includes the following steps.

S1201 to S1213: Steps S1201 to S1213 are similar to steps S8*oi* to S813 in the embodiment shown in FIG. 8A to FIG. 8D. For example, a difference is as follows: In this embodiment of this application, the direction information in the steering location information indicates a direction of a service flow to which traffic steering policy information is applied, and the direction information herein indicates a downlink direction. Certainly, if the data description information of the first application can uniquely indicate a service flow in a downlink direction, this parameter may not be carried. For other related descriptions, refer to the descriptions in the embodiment shown in FIG. 8A to FIG. 8D. Details are not described herein again.

S1214: The SMF network element determines, based on the LAN traffic steering information 5, policy rules corresponding to each intermediate UPF network element.

For related descriptions of the policy rules corresponding to each intermediate UPF network element, refer to the descriptions in the embodiment shown in FIG. 11A to FIG. 11D. Details are not described herein again. For a manner for the SMF network element to determine, based on the LAN traffic steering information 5, the policy rules corresponding to each intermediate UPF network element, refer to a manner for the SMF network element to determine, based on the LAN traffic steering information 2, the policy rules corresponding to each intermediate UPF network element in the embodiment shown in FIG. 6A to FIG. 6C. Details are not described herein again.

For example, it is assumed that the plurality of intermediate UPF network elements include an intermediate UPF network element 1 and an intermediate UPF network element 2, a downstream network element of the intermediate UPF network element 1 is a RAN device, an upstream network element of the intermediate UPF network element 1 is the intermediate UPF network element 2, a downstream network element of the intermediate UPF network element 2 is the intermediate UPF network element 1, and an upstream network element of the intermediate UPF network element 2 is the anchor UPF network element. In this case, policy rules corresponding to the intermediate UPF network element 2 may include a PDR 15, a FAR 15 associated with the PDR 15, a PDR 16, and a FAR 16 associated with the PDR 16, and Policy rules corresponding to the intermediate UPF network element 1 may include a PDR 17 and a FAR 17 associated with the PDR 17. The PDR 15 and the FAR 15 associated with the PDR 15 are used to steer, to a local application server for the first application in a target LAN corresponding to the intermediate UPF network element 2, downlink data of the first application sent by the anchor UPF network element. The PDR 16 and the FAR 7 associated with the PDR 16 are used to send downlink data processed by the local application server for the first application in the target LAN corresponding to the intermediate UPF network element 2 to the intermediate UPF network element 1. The PDR 17 and the FAR 17 associated with the PDR 17 are used to steer, to a local application server for the first application in a target LAN corresponding to the intermediate UPF network element 1, downlink data of the first application sent by the intermediate UPF network element 2. In addition, the policy rules corresponding to the intermediate UPF network element 1 may further include a PDR 19 and a FAR 19 associated with the PDR 19. The PDR 19 and the FAR 19 associated with the PDR 19 are used to receive uplink data from the RAN device, and send the uplink data to the intermediate UPF network element 2. The policy rules corresponding to the intermediate UPF network element 2 may further include a PDR 20 and a FAR 20 associated with the PDR 20. The PDR 20 and the FAR 20 associated with the PDR 20 are used to receive uplink data from the intermediate UPF network element 1, and send the uplink data to the anchor UPF network element. This is not specifically limited in this embodiment of this application. PDI including the PDR 15 is shown in Table 35. The FAR 15 associated with the PDR 15 is shown in Table 36. PDI including the PDR 16 is shown in Table 37. The FAR 16 associated with the PDR 16 is shown in Table 38. PDI including the PDR 17 is shown in Table 39. The FAR 17 associated with the PDR 17 is shown in Table 40. PDI including the PDR 19 is shown in Table 43. The FAR 19 associated with the PDR 19 is shown in Table 44. PDI including the PDR 20 is shown in Table 45. The FAR 20 associated with the PDR 20 is shown in Table 46.

In addition, in this embodiment of this application, the SMF network element may determine, based on the LAN traffic steering information 5, policy rules such as a PDR 1, a FAR 1 associated with the PDR 1, a PDR 2, and a FAR 2 associated with the PDR 2 corresponding to the anchor UPF network element. The PDR 1 and the FAR 1 associated with the PDR 1 are used to receive uplink data from the intermediate UPF network element 2, and send the uplink data to the DN. The PDR 2 and the FAR 2 associated with the PDR 2 are used to receive downlink data from the DN, and send the downlink data to the intermediate UPF network element 2. PDI including the PDR 1 is shown in Table 1. The FAR 1 associated with the PDR 1 is shown in Table 2. PDI including the PDR 2 is shown in Table 3. The FAR 2 associated with the PDR 2 is shown in Table 28. Details are not described herein again.

Assuming that the plurality of intermediate UPF network elements in this embodiment of this application include the intermediate UPF network element 1 and the intermediate UPF network element 2, the policy control method provided in this embodiment of this application further includes the following steps.

S1215: The SMF network element sends an N4 session establishment request message 1 to the intermediate UPF network element 1. Correspondingly, the intermediate UPF network element 1 receives the N4 session establishment request message 1 from the SMF network element. The N4 session establishment request message 1 includes the policy rules such as the PDR 17, the FAR 17 associated with the PDR 17, the PDR 19, and the FAR 19 associated with the PDR 19 corresponding to the intermediate UPF network element 1.

Optionally, in this embodiment of this application, the intermediate UPF network element 1 may determine a corresponding traffic steering policy based on the traffic steering policy information in the FAR 17, and then process downlink data of the first application by using the traffic steering policy. This is not specifically limited in this embodiment of this application.

S1216: The intermediate UPF network element sends an N4 session establishment response message 1 to the SMF network element. Correspondingly, the SMF network element receives the N4 session establishment response message 1 from the intermediate UPF network element.

S1217: The SMF network element sends an N4 session establishment request message 2 to the intermediate UPF network element 2. Correspondingly, the intermediate UPF network element 2 receives the N4 session establishment request message 2 from the SMF network element. The N4 session establishment request message 2 includes the policy rules such as the PDR 15, the FAR 15 associated with the PDR 15, the PDR 16, the FAR 16 associated with the PDR 16, the PDR 20, and the FAR 20 associated with the PDR 20 corresponding to the intermediate UPF network element 2.

Optionally, in this embodiment of this application, the intermediate UPF network element 2 may determine a corresponding traffic steering policy based on the traffic steering policy information in the FAR 15, and then process downlink data of the first application by using the traffic steering policy. This is not specifically limited in this embodiment of this application.

S1218: The intermediate UPF network element 2 sends an N4 session establishment response message 2 to the SMF network element. Correspondingly, the SMF network element receives the N4 session establishment response message 2 from the intermediate UPF network element.

S1219: The SMF network element sends an N4 session establishment request message 3 to the anchor UPF network element. Correspondingly, the anchor UPF network element receives the N4 session establishment request message 3 from the SMF network element. The N4 session establishment request message 3 includes the policy rules such as the PDR 1, the FAR 1 associated with the PDR 1, the PDR 2, and the FAR 2 associated with the PDR 2 corresponding to the anchor UPF network element.

S1220: The anchor UPF network element sends an N4 session establishment response message 3 to the SMF network element. Correspondingly, the SMF network element receives the N4 session establishment response message 3 from the anchor UPF network element.

S1221 to S1226: Steps S1221 to S1226 are the same as steps S821 to S826 in the embodiment shown in FIG. 8A to FIG. 8D. For related descriptions, refer to the descriptions in the embodiment shown in FIG. 8A to FIG. 8D. Details are not described herein again.

S1227: The SMF network element sends an N4 session modification request message to the intermediate UPF network element 1. Correspondingly, the intermediate UPF network element 1 receives the N4 session modification request message from the SMF network element. The N4 session modification request message includes a PDR 18 and a FAR 18 associated with the PDR 18. The PDR 18 and the FAR 18 associated with the PDR 18 are used to send, to the RAN device, downlink data processed by the local application server for the first application in the target LAN corresponding to the intermediate UPF network element 1. PDI including the PDR 18 is shown in Table 41. The FAR 18 associated with the PDR 18 is shown in Table 42. Details are not described herein again.

S1228: After storing the PDR 18 and the FAR 18 associated with the PDR 18, the intermediate UPF network element 1 sends an N4 session modification response message to the SMF network element. Correspondingly, the SMF network element receives the N4 session modification response message from the intermediate UPF network element.

S1229 to S1233: Steps S1229 to S1233 are the same as steps S829 to S833 in the embodiment shown in FIG. 8A to FIG. 8D. For related descriptions, refer to the descriptions in the embodiment shown in FIG. 8A to FIG. 8D. Details are not described herein again.

Based on the policy control method provided in this embodiment of this application, a proper intermediate UPF network element can be selected, so that the intermediate UPF network element steers downlink data of the first application to a local application server for the first application in a target LAN, and sends downlink data processed by the local application server for the first application in the target LAN to a downstream network element of the intermediate UPF network element.

The actions of the SMF network element, the intermediate UPF network element 1, the intermediate UPF network element 2, the PCF network element, or the AF network element in steps S1201 to S1233 may be performed by the processor 401 in the communication device 400 in FIG. 4 by invoking the application program code stored in the memory 403. This is not limited in this embodiment of this application.

It may be understood that the communication system shown in FIG. 2 is also used in a 5G network shown in FIG. 15. In a scenario in which an application server for a first application in a central DN requests to steer, for a group of terminal devices or all terminal devices, a service flow accessed by each terminal device to a plurality of local application servers for processing and then send a processed service flow to the terminal device, assuming that an SMF network element selects a plurality of intermediate UPF network elements that include an intermediate UPF network element 1 and an intermediate UPF network element 2, a policy control method provided in an embodiment of this application is similar to the method shown in FIG. 12A to FIG. 12D. For example, differences are as follows:

First, the intermediate UPF network element 1 and the intermediate UPF network element 2 that are selected by the SMF network element each have a traffic steering function. In addition, the SMF network element further selects anchor UPF network elements 2. In this scenario, the anchor UPF network elements 2 include an anchor UPF network element 21 communicating with the intermediate UPF network element 1 and an anchor UPF network element 22 communicating with the intermediate UPF network element 2. The anchor UPF network element 21 has a function of steering a data flow from the intermediate UPF network element 1 to a local LAN to which the anchor UPF network element 21 belongs. The anchor UPF network element 22 has a function of steering a data flow from the intermediate UPF network element 2 to a local LAN to which the anchor UPF network element 22 belongs.

Optionally, a manner for the SMF network element to select the anchor UPF network element 21 and the anchor UPF network element 22 is similar to a manner for the SMF network element to select the intermediate UPF network element 1 and the intermediate UPF network element 2 in the embodiment shown in FIG. 12A to FIG. 12D.

Second, the SMF network element determines policy rules corresponding to each intermediate UPF network element and policy rules corresponding to the anchor UPF network elements 2.

For example, based on the foregoing example, policy rules corresponding to the intermediate UPF network element 2 are used to send, to the anchor UPF network element 22, downlink data of the first application sent by an upstream network element of the intermediate UPF network element 2, and used to send downlink data that is from the anchor UPF network element 22 and that is processed by a local application server for the first application in a target LAN to a downstream network element of the intermediate UPF network element 2, for example, the intermediate UPF network element 1.

Policy rules corresponding to the anchor UPF network element 22 are used to steer downlink data from the intermediate UPF network element 2 to the local application server for the first application in the target LAN, and used to send downlink data processed by the local application server for the first application in the target LAN to the intermediate UPF network element 2.

Policy rules corresponding to the intermediate UPF network element 1 are used to send, to the anchor UPF network element 21, downlink data of the first application sent by an upstream network element of the intermediate UPF network element 1, and used to send downlink data that is from the anchor UPF network element 21 and that is processed by a local application server for the first application in a target LAN to a downstream network element of the intermediate UPF network element 1, for example, the terminal device.

Policy rules corresponding to the anchor UPF network element 21 are used to steer downlink data from the intermediate UPF network element 1 to the local application server for the first application in the target LAN, and used to send downlink data processed by the local application server for the first application in the target LAN to the intermediate UPF network element 1.

Further, the SMF network element sends corresponding policy rules to each intermediate UPF network element in a plurality of intermediate user plane network elements. For example, the SMF network element sends the policy rules corresponding to the intermediate UPF network element 1 to the intermediate UPF network element 1, and sends the policy rules corresponding to the intermediate UPF network element 2 to the intermediate UPF network element 2. The SMF network element further sends policy rules corresponding to each of a plurality of anchor UPF network elements to each anchor UPF network element. For example, the SMF network element sends the policy rules corresponding to the anchor UPF network element 21 to the anchor UPF network element 21, and sends the policy rules corresponding to the anchor UPF network element 22 to the anchor UPF network element 22.

Based on the policy control method provided in this embodiment of this application, a proper intermediate UPF network element and an anchor UPF network element communicating with the intermediate UPF network element can be selected, so that the anchor UPF network element steers downlink data of the first application to a local application server for the first application in a target LAN, and sends downlink data processed by the local application server for the first application in the target LAN to the intermediate UPF network element, and the intermediate UPF network element sends the downlink data to a downstream network element of the intermediate UPF network element.

It may be understood that, in the foregoing embodiments, the methods and/or steps implemented by the session management network element may alternatively be implemented by a component that can be used in the session management network element, and the methods and/or steps implemented by the user plane network element may alternatively be implemented by a component that can be used in the user plane network element.

The foregoing mainly describes the solutions provided in the embodiments of this application from a perspective of interaction between network elements. Correspondingly, an embodiment of this application further provides a communication apparatus. The communication apparatus may be the session management network element in the foregoing method embodiments, an apparatus including the session management network element, or a component that can be used in the session management network element. Alternatively, the communication apparatus may be the user plane network element in the foregoing method embodiments, an apparatus including the user plane network element, or a component that can be used in the user plane network element. It may be understood that, to implement the foregoing functions, the communication apparatus includes corresponding hardware structures and/or software modules for performing the functions. A person skilled in the art should be easily aware that units and algorithm steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 13:
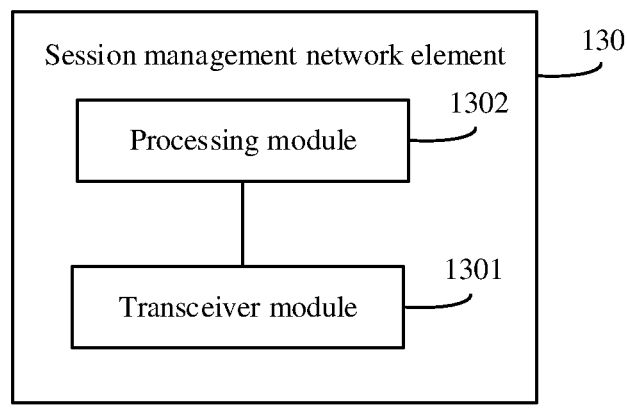
FIG. 13 is a schematic diagram of a structure of a session management network element according to an embodiment of this application.

For example, the communication apparatus is the session management network element in the foregoing method embodiments. FIG. 13 is a schematic diagram of a structure of a session management network element 130. The session management network element 130 includes a transceiver module 1301 and a processing module 1302. The transceiver module 1301 may also be referred to as a transceiver unit, and is configured to implement a transceiver function. For example, the transceiver module 1301 may be a transceiver circuit, a transceiver machine, a transceiver, or a communication interface.

In a possible implementation scenario, the transceiver module 1301 is configured to receive LAN traffic steering information corresponding to a first application from a policy control network element, the processing module 1302 is configured to select one or more user plane network elements based on the LAN traffic steering information, and determine policy rules corresponding to each of the one or more user plane network elements, where the policy rules are used to steer, to a local application server for the first application in a target LAN, data of the first application sent by an upstream network element, and used to send data processed by the local application server for the first application in the target LAN to a downstream network element, and the target LAN is a LAN corresponding to each user plane network element, and the transceiver module 1301 is further configured to send the corresponding policy rules to each user plane network element.

In a possible implementation, the LAN traffic steering information includes one piece of steering location information, and the steering location information includes one or more pieces of application location information of the first application and traffic steering policy information corresponding to each piece of application location information. The processing module 1302 is specifically configured to: select one user plane network element based on first application location information in the one or more pieces of application location information, and determine, based on traffic steering policy information corresponding to the first application location information, policy rules corresponding to the selected user plane network element.

In another possible implementation, the LAN traffic steering information includes a plurality of pieces of steering location information, and each of the plurality of pieces of steering location information includes a corresponding DNAI, one or more pieces of application location information of the first application, and traffic steering policy information corresponding to each piece of application location information. The processing module 1302 is specifically configured to: determine, based on the DNAI corresponding to each piece of steering location information, first steering location information corresponding to a first DNAI, select one user plane network element based on first application location information in one or more pieces of application location information that are of the first application and that are in the first steering location information, and determine, based on traffic steering policy information corresponding to the first application location information in the first steering location information, policy rules corresponding to the selected user plane network element.

In still another possible implementation, the LAN traffic steering information includes one piece of steering location information, and the steering location information includes sequence indication information of a plurality of levels of local application servers for the first application, one or more pieces of application location information corresponding to a local application server at each level, and traffic steering policy information corresponding to each piece of application location information. The processing module 1302 is specifically configured to: select a user plane network element at each level based on each level of first application location information, where each level of first application location information includes first application location information in the one or more pieces of application location information corresponding to the local application server at each level, and determine, based on the sequence indication information and traffic steering policy information corresponding to each level of first application location information, policy rules corresponding to the user plane network element at each level.

In still another possible implementation, the LAN traffic steering information includes a plurality of pieces of steering location information, and each of the plurality of pieces of steering location information includes a corresponding DNAI, sequence indication information of a plurality of levels of local application servers for the first application, one or more pieces of application location information corresponding to a local application server at each level, and traffic steering policy information corresponding to each piece of application location information. The processing module 1302 is specifically configured to: determine, based on the DNAI corresponding to each piece of steering location information, first steering location information corresponding to a first DNAI, select a user plane network element at each level based on the sequence indication information and each level of first application location information that are in the first steering location information, where each level of first application location information includes first application location information in one or more pieces of application location information that are in the first steering location information and that correspond to the local application server at each level, and determine, based on the sequence indication information and traffic steering policy information corresponding to each level of first application location information that are in the first steering location information, policy rules corresponding to the user plane network element at each level.

In another possible implementation scenario, the transceiver module 1301 is configured to receive LAN traffic steering information corresponding to a first application from a policy control network element, the processing module 1302 is configured to select, based on the LAN traffic steering information, one or more user plane network elements and an anchor user plane network element corresponding to each of the one or more user plane network elements, the processing module 1302 is further configured to determine policy rules corresponding to each user plane network element, where the policy rules are used to send, to an anchor user plane network element corresponding to the user plane network element, data of the first application sent by an upstream network element, and used to send data that is from the anchor user plane network element and that is processed by a local application server for the first application in a target LAN to a downstream network element, the processing module 1302 is further configured to determine policy rules corresponding to the anchor user plane network element corresponding to each user plane network element, where the policy rules are used to steer data of the first application from the user plane network element corresponding to the anchor user plane network element to the local application server for the first application in the target LAN, and used to send data processed by the local application server for the first application in the target LAN to the user plane network element corresponding to the anchor user plane network element, and the transceiver module 1301 is further configured to: send the corresponding policy rules to each user plane network element, and send the corresponding policy rules to the anchor user plane network element corresponding to each user plane network element.

All related content of the steps in the foregoing method embodiments may be cited in function descriptions of corresponding functional modules. Details are not described herein again.

In this embodiment, the session management network element 130 is presented in a form of functional modules obtained through division in an integrated manner. The "module" herein may be a specific ASIC, a circuit, a processor executing one or more software or firmware programs, a memory, an integrated logic circuit, and/or another device that can provide the foregoing function. In a simple embodiment, a person skilled in the art may figure out that the session management network element 130 may be in a form of the communication device 400 in FIG. 4.

For example, the processor 401 of the communication device 400 in FIG. 4 may invoke the computer-executable instructions stored in the memory 403, to enable the communication device 400 to perform the policy control methods in the foregoing method embodiments.

Specifically, a function/implementation process of the transceiver module 1301 and the processing module 1302 in FIG. 13 may be implemented by the processor 401 in the communication device 400 in FIG. 4 by invoking the computer-executable instructions stored in the memory 403. Alternatively, a function/implementation process of the processing module 1302 in FIG. 13 may be implemented by the processor 401 in the communication device 400 in FIG. 4 by invoking the computer-executable instructions stored in the memory 403, and a function/implementation process of the transceiver module 1301 in FIG. 13 may be implemented by using the communication interface 404 in the communication device 400 in FIG. 4.

The session management network element 130 provided in this embodiment may perform the foregoing policy control methods. Therefore, for technical effects that can be achieved by the session management network element 130, refer to the technical effects described in the foregoing method embodiments. Details are not described herein again.

Figure 14:
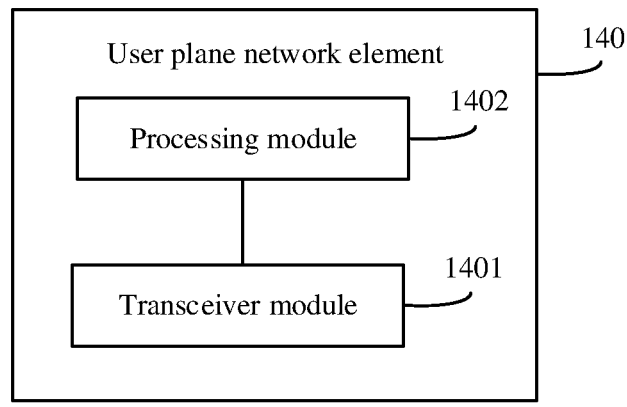
FIG. 14 is a schematic diagram of a structure of a user plane network element according to an embodiment of this application.

Alternatively, for example, the communication apparatus is the user plane network element in the foregoing method embodiments. FIG. 14 is a schematic diagram of a structure of a user plane network element 140. The user plane network element 140 includes a transceiver module 1401 and a processing module 1402. The transceiver module 1401 may also be referred to as a transceiver unit, and is configured to implement a transceiver function. For example, the transceiver module 1401 may be a transceiver circuit, a transceiver machine, a transceiver, or a communication interface.

In a possible implementation scenario, the transceiver module 1401 is configured to receive policy rules from a session management network element, and the processing module 1402 is configured to: steer, to a local application server for a first application in a target LAN according to the policy rules, data of the first application sent by an upstream network element of the user plane network element 140, and send data processed by the local application server for the first application in the target LAN to a downstream network element of the user plane network element 140 according to the policy rules, where the target LAN is a LAN corresponding to the user plane network element 140.

Optionally, the policy rules include a first PDR and a first FAR associated with the first PDR. That the processing module 1402 is configured to send data processed by the local application server for the first application in the target LAN to a downstream network element of the user plane network element 140 according to the policy rules includes the processing module 1402 is configured to: identify, according to the first PDR, the data of the first application sent by the upstream network element of the user plane network element 140, and steer the data to the local application server for the first application in the target LAN according to the first FAR, where the first FAR includes a first destination interface and a first forwarding policy, the first destination interface is a LAN, and the first forwarding policy includes traffic steering policy information.

Optionally, the policy rules include a second PDR and a second FAR associated with the second PDR. That the processing module 1402 is configured to send data processed by the local application server for the first application in the target LAN to a downstream network element of the user plane network element 140 according to the policy rules includes the processing module 1402 is configured to: identify, according to the second PDR, the data processed by the local application server for the first application in the target LAN, where the second PDR includes a second source interface, and the second source interface is a LAN, and send the data processed by the local application server for the first application in the target LAN to the downstream network element of the user plane network element 140 according to the second FAR.

In another possible implementation scenario, the transceiver module 1401 is configured to receive policy rules from a session management network element, and the processing module 1402 is configured to: send, according to the policy rules, data of a first application from an upstream network element of the user plane network element 140 to an anchor user plane network element corresponding to the user plane network element 140, and send data that is from the anchor user plane network element and that is processed by a local application server for the first application in a target LAN to a downstream network element of the user plane network element 140 according to the policy rules.

All related content of the steps in the foregoing method embodiments may be cited in function descriptions of corresponding functional modules. Details are not described herein again.

In this embodiment, the user plane network element 140 is presented in a form of functional modules obtained through division in an integrated manner. The "module" herein may be a specific ASIC, a circuit, a processor executing one or more software or firmware programs, a memory, an integrated logic circuit, and/or another device that can provide the foregoing function. In a simple embodiment, a person skilled in the art may figure out that the user plane network element 140 may be in a form of the communication device 400 in FIG. 4.

For example, the processor 401 of the communication device 400 in FIG. 4 may invoke the computer-executable instructions stored in the memory 403, to enable the communication device 400 to perform the policy control methods in the foregoing method embodiments.

Specifically, a function/implementation process of the transceiver module 1401 and the processing module 1402 in FIG. 14 may be implemented by the processor 401 in the communication device 400 in FIG. 4 by invoking the computer-executable instructions stored in the memory 403. Alternatively, a function/implementation process of the processing module 1402 in FIG. 14 may be implemented by the processor 401 in the communication device 400 in FIG. 4 by invoking the computer-executable instructions stored in the memory 403, and a function/implementation process of the transceiver module 1401 in FIG. 14 may be implemented by using the communication interface 404 in the communication device 400 in FIG. 4.

The user plane network element 140 provided in this embodiment may perform the foregoing policy control methods. Therefore, for technical effects that can be achieved by the user plane network element 140, refer to the technical effects described in the foregoing method embodiments. Details are not described herein again.

Figure 16:
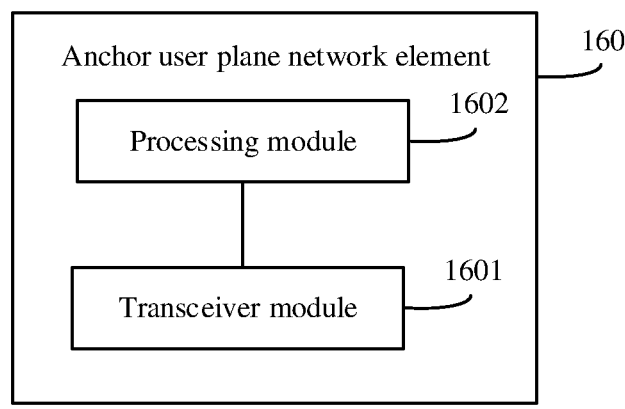
FIG. 16 is a schematic diagram of a structure of an anchor user plane network element according to an embodiment of this application.

Alternatively, for example, the communication apparatus is the anchor user plane network element in the foregoing method embodiments. FIG. 16 is a schematic diagram of a structure of an anchor user plane network element 160. The anchor user plane network element 160 includes a transceiver module 1601 and a processing module 1602. The transceiver module 1601 may also be referred to as a transceiver unit, and is configured to implement a transceiver function. For example, the transceiver module 1601 may be a transceiver circuit, a transceiver machine, a transceiver, or a communication interface.

The transceiver module 1601 is configured to receive policy rules from a session management network element. The processing module 1602 is configured to: steer data of a first application from a user plane network element corresponding to the anchor user plane network element 160 to a local application server for the first application in a target LAN according to the policy rules, and send, according to the policy rules, data processed by the local application server for the first application in the target LAN to the user plane network element corresponding to the anchor user plane network element 160.

All related content of the steps in the foregoing method embodiments may be cited in function descriptions of corresponding functional modules. Details are not described herein again.

In this embodiment, the anchor user plane network element 160 is presented in a form of functional modules obtained through division in an integrated manner. The "module" herein may be a specific ASIC, a circuit, a processor executing one or more software or firmware programs, a memory, an integrated logic circuit, and/or another device that can provide the foregoing function. In a simple embodiment, a person skilled in the art may figure out that the anchor user plane network element 160 may be in a form of the communication device 400 in FIG. 4.

For example, the processor 401 of the communication device 400 in FIG. 4 may invoke the computer-executable instructions stored in the memory 403, to enable the communication device 400 to perform the policy control methods in the foregoing method embodiments.

Specifically, a function/implementation process of the transceiver module 1601 and the processing module 1602 in FIG. 16 may be implemented by the processor 401 in the communication device 400 in FIG. 4 by invoking the computer-executable instructions stored in the memory 403. Alternatively, a function/implementation process of the processing module 1602 in FIG. 16 may be implemented by the processor 401 in the communication device 400 in FIG. 4 by invoking the computer-executable instructions stored in the memory 403, and a function/implementation process of the transceiver module 1601 in FIG. 16 may be implemented by using the communication interface 404 in the communication device 400 in FIG. 4.

The anchor user plane network element 160 provided in this embodiment may perform the foregoing policy control methods. Therefore, for technical effects that can be achieved by the anchor user plane network element 160, refer to the technical effects described in the foregoing method embodiments. Details are not described herein again.

It should be noted that one or more of the foregoing modules or units may be implemented by using software, hardware, or a combination thereof. When any one of the foregoing modules or units is implemented by using software, the software exists in a form of computer program instructions and is stored in a memory. A processor may be configured to: execute the program instructions and implement the foregoing method procedures. The processor may be built into a SoC (system-on-a-chip) or an ASIC, or may be an independent semiconductor chip. In addition to a core configured to execute software instructions to perform an operation or processing, the processor may further include a necessary hardware accelerator, such as a field programmable gate array (FPGA), a PLD (programmable logic device), or a logic circuit that implements a dedicated logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to instruct the communication apparatus to perform the method in any one of the foregoing method embodiments. Certainly, the memory may not be located in the communication apparatus. When the communication apparatus is a chip system, the chip system may include a chip, or include a chip and other discrete devices. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

Although this application is described with reference to the embodiments, in a process of implementing this application that claims protection, a person skilled in the art may understand and implement other variations of the disclosed embodiments by viewing the accompanying drawings, disclosed content, and the appended claims. In the claims, the term "comprise" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and equivalent technologies thereof.

What is claimed is:

1. A policy control method, comprising:
receiving, by a session management network element, from a policy control network element, local area network (LAN) traffic steering information corresponding to a first application, wherein the LAN traffic steering information comprises at least one piece of steering location information, wherein each piece of the at least one piece of the steering location information comprises one or more pieces of application location information of the first application, and wherein the one or more pieces of application location information of the first application are associated with an identifier associated with a LAN in which a local application server for the first application is deployed;
selecting, by the session management network element, one or more user plane network elements based on the LAN traffic steering information according to at least a portion of the one or more pieces of application location information;
determining policy rules corresponding to each user plane network element of the one or more user plane network elements based on at least traffic steering policy information corresponding to the application location information, wherein the policy rules are associated with steering, to a local application server for the first application in a target LAN, data of the first application sent by an upstream network element, wherein the policy rules are further associated with sending data processed by the local application server for the first application in the target LAN to a downstream network element, and wherein the target LAN is a LAN corresponding to each user plane network element of the one or more user plane network elements; and
sending, by the session management network element, the corresponding policy rules to each user plane network element of the one or more user plane network elements.

2. The method according to claim 1, wherein each piece of the at least one piece of the steering location information further comprises traffic steering policy information corresponding to each piece of application location information; and
wherein the selecting the one or more user plane network elements and the determining the policy rules comprise:
selecting, by the session management network element, one user plane network element based on first application location information in the one or more pieces of application location information; and
determining, by the session management network element, based on traffic steering policy information corresponding to the first application location information, policy rules corresponding to the selected user plane network element.

3. The method according to claim 2, wherein the policy rules comprise a first packet detection rule (PDR) and a first forwarding action rule (FAR) associated with the first PDR; and
wherein the policy rules being associated with steering the data of the first application sent by the upstream network element comprises:
the first PDR identifying the data of the first application sent by the upstream network element; and
the first FAR being associated with steering the data to the local application server for the first application in the target LAN, wherein the first FAR comprises a first destination interface and a first forwarding policy, wherein the first destination interface is a LAN, and wherein the first forwarding policy comprises the traffic steering policy information corresponding to the first application location information or the traffic steering policy information corresponding to each level of the first application location information.

4. The method according to claim 2, wherein the policy rules comprise a second packet detection rule (PDR) and a second forwarding action rule (FAR) associated with the second PDR; and
wherein that the policy rules being associated with sending the data processed by the local application server for the first application in the target LAN to the downstream network element comprises:
the second PDR identifying the data processed by the local application server for the first application in the target LAN, wherein the second PDR comprises a second source interface, and the second source interface is a LAN; and
the second FAR being associated with sending the data processed by the local application server for the first application in the target LAN to the downstream network element.

5. The method according to claim 2, wherein the application location information comprises at least one of a user plane access identifier representing access to the target LAN in which the local application server for the first application is deployed, an identifier of the target LAN in which the local application server for the first application is deployed, an identifier of a user plane network element that supports access to the target LAN in which the local application server for the first application is deployed, or an identifier of the local application server for the first application.

6. The method according to claim 1, wherein the LAN traffic steering information comprises a plurality of pieces of steering location information, and wherein each piece of steering location information of the plurality of pieces of steering location information comprises a corresponding data network access identifier (DNAI), one or more pieces of application location information of the first application, and traffic steering policy information corresponding to each piece of the application location information; and wherein the selecting the one or more user plane network elements based on the LAN traffic steering information, and the determining the policy rules comprises:

determining, by the session management network element, based on the DNAI corresponding to each piece of steering location information, first steering location information corresponding to a first DNAI;

selecting, by the session management network element, one user plane network element based on first application location information in one or more pieces of application location information that are of the first application and that are in the first steering location information; and determining, by the session management network element based on traffic steering policy information corresponding to the first application location information in the first steering location information, policy rules corresponding to the selected user plane network element.

7. The method according to claim 1, wherein the LAN traffic steering information comprises at least one piece of steering location information, and wherein each piece of the at least one piece of the steering location information comprises sequence indication information of a plurality of levels of local application servers for the first application, one or more pieces of application location information corresponding to a local application server at each level, and traffic steering policy information corresponding to each piece of application location information; and wherein the selecting the one or more user plane network elements based on the LAN traffic steering information, and the determining policy rules corresponding to each of the one or more user plane network elements comprises:

selecting, by the session management network element, a user plane network element at each level based on each level of first application location information, wherein each level of first application location information comprises first application location information in the one or more pieces of application location information corresponding to the local application server at each level; and determining, by the session management network element based on the sequence indication information and traffic steering policy information corresponding to each level of the first application location information, policy rules corresponding to the user plane network element at each level.

8. The method according to claim 1, wherein the LAN traffic steering information comprises a plurality of pieces of steering location information, and wherein each piece of the plurality of pieces of steering location information comprises a corresponding data network access identifier (DNAI), sequence indication information of a plurality of levels of local application servers for the first application, one or more pieces of application location information corresponding to a local application server at each level, and traffic steering policy information corresponding to each piece of application location information; and wherein the selecting, by the session management network element, the one or more user plane network elements, and the determining policy rules corresponding to each of the one or more user plane network elements comprises:

determining, by the session management network element based on the DNAI corresponding to each piece of steering location information, first steering location information corresponding to a first DNAI;

selecting, by the session management network element, a user plane network element at each level based on the sequence indication information and each level of first application location information that are in the first steering location information, wherein each level of the first application location information comprises first application location information in one or more pieces of application location information that are in the first steering location information and that correspond to the local application server at each level; and determining, by the session management network element based on the sequence indication information and further based on traffic steering policy information corresponding to each level of the first application location information that is in the first steering location information, policy rules corresponding to the user plane network element at each level.

9. The method according to claim 1, wherein the LAN traffic steering information further comprises direction indication information, and wherein the direction indication information indicates to at least one of steer at least one of uplink data of the first application to the local application server for the first application in the target LAN, or steer downlink data of the first application to the local application server for the first application in the target LAN.

10. A policy control method, comprising:

receiving, by a user plane network element of one or more pieces of application location information, policy rules from a session management network element, wherein the one or more pieces of application location information are of a first application and are associated with an identifier associated with a target local area network (LAN) in which a local application server for the first application is deployed;

steering, to the local application server for the first application in the target LAN, by the user plane network element, according to the policy rules associated with traffic steering policy information corresponding to the first application location information, data of the first application sent by an upstream network element of the user plane network element; and sending, by the user plane network element, data processed by the local application server for the first application in the target LAN to a downstream network element of the user plane network element according to the policy rules, wherein the target LAN is a LAN corresponding to the user plane network element.

11. The method according to claim 10, wherein the policy rules comprise a first packet detection rule (PDR) and a first forwarding action rule (FAR) associated with the first PDR; and wherein the steering the data of the first application sent by an upstream network element of the user plane network element comprises:
  identifying, by the user plane network element according to the first PDR, the data of the first application sent by the upstream network element of the user plane network element; and
  steering, by the user plane network element, the data to the local application server for the first application in the target LAN according to the first FAR, wherein the first FAR comprises a first destination interface and a first forwarding policy, wherein the first destination interface is a LAN, and wherein the first forwarding policy comprises traffic steering policy information.

12. The method according to claim 10, wherein the policy rules comprise a second packet detection rule (PDR) and a second forwarding action rule (FAR) associated with the second PDR; and
  wherein the sending the data processed by the local application server for the first application in the target LAN to the downstream network element of the user plane network element according to the policy rules comprises:
    identifying, by the user plane network element, according to the second PDR, the data processed by the local application server for the first application in the target LAN, wherein the second PDR comprises a second source interface, and wherein the second source interface is a LAN; and
    sending, by the user plane network element, the data processed by the local application server for the first application in the target LAN to the downstream network element of the user plane network element according to the second FAR.

13. A session management network element, comprising:
a transceiver;
a processor; and
a non-transitory computer readable medium storing a program for execution by the processor, the program including instructions to:
  receive, through the transceiver, local area network (LAN) traffic steering information corresponding to a first application from a policy control network element, wherein the LAN traffic steering information comprises at least one piece of steering location information, wherein each piece of the at least one piece of the steering location information comprises one or more pieces of application location information of the first application, and wherein the one or more pieces of application location information of the first application are associated with an identifier associated with a LAN in which a local application server for the first application is deployed;
  select one or more user plane network elements based on the LAN traffic steering information according to at least a portion of the one or more pieces of application location information;
  determine policy rules corresponding to each of the one or more user plane network elements based on at least traffic steering policy information corresponding to the application location information, wherein the policy rules are associated with steering, to a local application server for the first application in a target LAN, data of the first application sent by an upstream network element, and wherein the policy rules are further associated with sending data processed by the local application server for the first application in the target LAN to a downstream network element, and wherein the target LAN is a LAN corresponding to each user plane network element of the one or more user plane network elements; and
  cause the transceiver to send the corresponding policy rules to each user plane network element of the one or more user plane network elements.

14. The session management network element according to claim 13, wherein each piece of the at least one piece of steering location information further comprises traffic steering policy information corresponding to each piece of application location information; and
  wherein the instructions to select the one or more user plane network elements and determine the policy rules include instructions to:
    select one user plane network element based on first application location information in the one or more pieces of application location information; and
    determine, based on traffic steering policy information corresponding to the first application location information, policy rules corresponding to the selected user plane network element.

15. The session management network element according to any claim 14, wherein the policy rules comprise a first packet detection rule (PDR) and a first forwarding action rule (FAR) associated with the first PDR; and
  wherein that the policy rules being associated with steering the data of the first application sent by the upstream network element comprises:
    the first PDR identifying the data of the first application sent by the upstream network element; and
    the first FAR being associated with steering the data to the local application server for the first application in the target LAN, wherein the first FAR comprises a first destination interface and a first forwarding policy, wherein the first destination interface is a LAN, and wherein the first forwarding policy comprises the traffic steering policy information corresponding to the first application location information or to the traffic steering policy information corresponding to each level of the first application location information.

16. The session management network element according to claim 14, wherein the policy rules comprise a second packet detection rule (PDR) and a second forwarding actin rule (FAR) associated with the second PDR; and
  wherein the policy rules being associated with sending data processed by the local application server for the first application in the target LAN to the downstream network element comprises:
    the second PDR identifying the data processed by the local application server for the first application in the target LAN, wherein the second PDR comprises a second source interface, and the second source interface is a LAN; and
    the second FAR being associated with sending the data processed by the local application server for the first application in the target LAN to the downstream network element.

17. The session management network element according to claim 14, wherein the application location information comprises a user plane access identifier representing access to the target LAN in which the local application server for the first application is deployed, an identifier of the target LAN in which the local application server for the first application is deployed, an identifier of a user plane network element that supports access to the target LAN in which the local application server for the first application is deployed, or an identifier of the local application server for the first application.

18. The session management network element according to claim 13, wherein the LAN traffic steering information comprises a plurality of pieces of steering location information, and wherein each piece of the plurality of pieces of steering location information comprises a corresponding data network access identifier (DNAI), the one or more pieces of application location information of the first application, and traffic steering policy information corresponding to each piece of application location information; and wherein the instructions to select the one or more user plane network elements based on the LAN traffic steering information, and determine policy rules include instructions to:
determine, based on the DNAI corresponding to each piece of steering location information, first steering location information corresponding to a first DNAI;
select, by the session management network element, one user plane network element based on first application location information in one or more pieces of application location information that are of the first application and that are in the first steering location information; and
determine, based on traffic steering policy information corresponding to the first application location information in the first steering location information, policy rules corresponding to the selected user plane network element.

19. The session management network element according to claim 13, wherein the LAN traffic steering information comprises at least one piece of steering location information, and wherein each piece of steering location information of the at least one piece of steering location information comprises sequence indication information of a plurality of levels of local application servers for the first application, the one or more pieces of application location information corresponding to a local application server at each level, and traffic steering policy information corresponding to each piece of application location information; and wherein the program further includes instructions to:
select a user plane network element at each level based on each level of first application location information, wherein each level of the first application location information comprises first application location information in the one or more pieces of application location information corresponding to the local application server at each level; and
determine, based on the sequence indication information and traffic steering policy information corresponding to each level of the first application location information, policy rules corresponding to the user plane network element at each level.

20. The session management network element according to claim 13, wherein the LAN traffic steering information comprises a plurality of pieces of steering location information, and wherein each piece of the plurality of pieces of steering location information comprises a corresponding DNAI, sequence indication information of a plurality of levels of local application servers for the first application, one or more pieces of application location information corresponding to a local application server at each level, and traffic steering policy information corresponding to each piece of application location information; and wherein the instructions to select the one or more user plane network elements, and determine policy rules instructions include instructions to:
determine, based on the DNAI corresponding to each piece of steering location information, first steering location information corresponding to a first DNAI;
select a user plane network element at each level based on the sequence indication information and each level of first application location information that are in the first steering location information, wherein each level of first application location information comprises first application location information in one or more pieces of application location information that are in the first steering location information and that correspond to the local application server at each level; and
determine, based on the sequence indication information and traffic steering policy information corresponding to each level of first application location information that is in the first steering location information, policy rules corresponding to the user plane network element at each level.

* * * * *